US012138629B2

(12) United States Patent
Kvist et al.

(10) Patent No.: US 12,138,629 B2
(45) Date of Patent: Nov. 12, 2024

(54) MICROFLUIDIC DEVICE AND A METHOD FOR PROVISION OF DOUBLE EMULSION DROPLETS

(71) Applicant: SAMPLIX APS, Birkerød (DK)

(72) Inventors: Thomas Kvist, Roskilde (DK); Esben Bjørn Madsen, Holte (DK); Solène Cherre, Allerød (DK); Marie Just Mikkelsen, Brønshøj (DK)

(73) Assignee: SAMPLIX APS, Birkerod (DK)

( * ) Notice: Subject to any disclaimer, the term of this patent is extended or adjusted under 35 U.S.C. 154(b) by 602 days.

(21) Appl. No.: 17/426,549

(22) PCT Filed: Jan. 31, 2020

(86) PCT No.: PCT/EP2020/052400
§ 371 (c)(1),
(2) Date: Jul. 28, 2021

(87) PCT Pub. No.: WO2020/157262
PCT Pub. Date: Aug. 6, 2020

(65) Prior Publication Data
US 2022/0105516 A1 Apr. 7, 2022

(30) Foreign Application Priority Data

Jan. 31, 2019 (EP) .................................... 19154948
Apr. 11, 2019 (EP) .................................... 19168733

(51) Int. Cl.
*B01L 3/00* (2006.01)

(52) U.S. Cl.
CPC . *B01L 3/502784* (2013.01); *B01L 2200/0673* (2013.01); *B01L 2200/12* (2013.01); *B01L 2200/16* (2013.01); *B01L 2300/0867* (2013.01); *B01L 2300/087* (2013.01); *B01L 2300/165* (2013.01)

(58) Field of Classification Search
CPC .. B01F 23/41; B01F 23/4144; B01F 33/3011; B01F 33/30351; B01F 33/813; B01L 2200/0673; B01L 2200/12; B01L 2200/16; B01L 2300/0867; B01L 2300/087; B01L 2300/165; B01L 3/502784
See application file for complete search history.

(56) References Cited

U.S. PATENT DOCUMENTS 11,779,923 B2 10/2023 Kvist et al.
2012/0211084 A1 8/2012 Weitz et al.

FOREIGN PATENT DOCUMENTS

WO 2011028760 A2 3/2011
WO 2015160919 A1 10/2015

OTHER PUBLICATIONS

Applicant: Samplix APS; “A Microfluidic Device and a Method for Provision of Double Emulsion Droplets”; Canadian Application No. 3,127,163; dated Jan. 18, 2024; 3 pgs.

*Primary Examiner* — Jennifer Wecker
(74) *Attorney, Agent, or Firm* — Tarolli, Sundheim, Covell & Tummino LLP

(57) ABSTRACT

A microfluidic device, a method for manufacturing a microfluidic device, and a method for provision of double emulsion droplets using a microfluidic device. Furthermore, an assembly configured to supply pressure to the microfluidic device for provision of double emulsion droplets. Furthermore, a kit comprising a plurality of microfluidic devices and a plurality of fluids configured for use with the microfluidic device for provision of double emulsion droplets.

17 Claims, 52 Drawing Sheets

MICROFLUIDIC DEVICE AND A METHOD FOR PROVISION OF DOUBLE EMULSION DROPLETS

RELATED APPLICATIONS

The present invention is a U.S. National Stage under 35 USC 371 patent application, claiming priority to Serial No. PCT/EP2020/052400, filed on 31 Jan. 2020; which claims priority of EP 19154948.4, filed on 31 Jan. 2019 and EP 19168733.4, filed on 11 Apr. 2019, the entirety of all of which are incorporated herein by reference.

The present invention relates to a microfluidic device, a method for manufacturing a microfluidic device, and a method for provision of double emulsion droplets using a microfluidic device. Furthermore, the present invention relates to an assembly configured to supply pressure to the microfluidic device for provision of double emulsion droplets. Furthermore, the present invention relates to a kit comprising a plurality of microfluidic devices and a plurality of fluids configured for use with the microfluidic device for provision of double emulsion droplets.

Double emulsion droplets, such as comprising an aqueous inner phase and an oil-layer being suspended in an outer aqueous carrier phase, have found use in many industrial, medical, and research applications. Such applications may for instance comprise: drug delivery, delivery vehicles for cosmetics, cell encapsulation, and synthetic biology. Partitioning of cells, chemicals, or molecules into millions of smaller partitions, as may be provided using double emulsion droplets, may separate the reactions of each unit, such as by separating the reactions of each sample line, which may enable processing or analysis of each partition separately.

Double emulsion droplets may for some applications be preferred over single emulsion droplets since double emulsion droplets may have an inner phase and a carrier phase being of the same type of liquid, such as water. Having water as both the inner phase and the carrier phase may be advantageous due to the state of the equipment used for the above-mentioned applications.

Prior art microfluidic devices and methods for provision of double emulsion droplets are known from publications such as: EP 11838713; U.S. Pat. No. 9,238,206 B2; US 20170022538 A1; U.S. Pat. No. 8,802,027 B2; US 20120211084; U.S. Pat. No. 9,039,273 B2; and U.S. Pat. No. 7,772,287 B2.

The inventors of the present invention have identified potential drawbacks of the prior art devices and methods. Identified potential drawbacks may include complex and/or time-consuming operation for provision of double emulsion droplets. Identified potential drawbacks of the prior art may include risk of contamination of samples when prior art microfluidic chips are connected to fluid reservoirs via tubing and other connectors and/or when microfluidic chips of different surface properties are connected to each other in series using tubing. Identified potential drawbacks of the prior art may include loss of samples in tubing provided between different components of prior art systems. Identified potential drawbacks of the prior art may include provision of unstable air pressure due to the use of complex tubing systems for connecting components of the prior art systems. Some or all of these potential drawbacks of prior art systems may cause polydisperse droplets, which may be undesired.

One object of present invention is to provide improved and/or alternative systems and methods for provision of double emulsion droplets, such as monodisperse double emulsion droplets.

Another object of the present invention is to reduce and/or to enable reduced use of reagents and/or loss of sample during provision of double emulsion droplets, such as monodisperse double emulsion droplets.

Yet another object of the present invention is to provide devices and methods that may simplify provision of double emulsion droplets, such as monodisperse double emulsion droplets, and/or provide devices and methods which reduce requirements for personnel having significant skills in microfluidics operations.

Yet another object of the present invention is to minimize risk of contamination while producing double emulsion droplets.

SUMMARY OF INVENTION

According to a first aspect of the present invention there is provided a microfluidic device comprising: a microfluidic section comprising a plurality of microfluidic units; and a container section comprising a plurality of groups of containers comprising one group of containers for each microfluidic unit. Each microfluidic unit comprises a fluid conduit network comprising: a plurality of supply conduits comprising a primary supply conduit, a secondary supply conduit, and a tertiary supply conduit; a transfer conduit comprising a first transfer conduit part having a first affinity for water; a collection conduit comprising a first collection conduit part having a second affinity for water being different from the first affinity for water; a first fluid junction providing fluid communication between the primary supply conduit, the secondary supply conduit, and the transfer conduit; and a second fluid junction providing fluid communication between the tertiary supply conduit, the transfer conduit, and the collection conduit; wherein each first transfer conduit part extends from the corresponding first fluid junction, and wherein each first collection conduit part extends from the corresponding second fluid junction. Each group of containers comprises a plurality of containers comprising a collection container and a plurality of supply containers comprising a primary supply container, a secondary supply container, and a tertiary supply container.

For each group of containers, the following applies: the collection container is in fluid communication with the collection conduit of the corresponding microfluidic unit; the primary supply container is in fluid communication with the primary supply conduit of the corresponding microfluidic unit; the secondary supply container is in fluid communication with the secondary supply conduit of the corresponding microfluidic unit; and the tertiary supply container is in fluid communication with the tertiary supply conduit of the corresponding microfluidic unit.

According to a further aspect of the present invention there is provided an assembly comprising a receptor and a pressure distribution structure. The receptor is configured to receive and hold the microfluidic device according to the present invention. The assembly may comprise the microfluidic device or a kit as defined immediately below. The pressure distribution structure is configured to supply pressure to the microfluidic device when the microfluidic device is held by the receptor. The pressure distribution structure comprises: a plurality of container manifolds comprising a secondary container manifold and a tertiary container manifold; a plurality of line pressure regulators comprising a secondary line pressure regulator and a tertiary line pressure regulator; and a main manifold. The secondary container manifold is configured to be coupled to each secondary supply container of the microfluidic device. The tertiary container manifold is configured to be coupled to each tertiary supply container of the microfluidic device. The secondary line pressure regulator is coupled to the primary container manifold. The tertiary line pressure regulator is coupled to the tertiary container manifold. The main manifold is coupled to each container manifold via the respective line pressure regulators. According to one embodiment, the plurality of container manifolds comprise a primary container manifold configured to be coupled to each of the primary supply containers of the microfluidic device. This coupling may be via primary valves. The plurality of line pressure regulators may comprise a primary line pressure regulator.

According to a further aspect of the present invention there is provided a kit comprising: one or more of the microfluidic device according to the present invention; and a plurality of fluids configured for use with the microfluidic device according to the present invention. The plurality of fluids comprises: a sample buffer; an oil; and a continuous phase buffer. The kit comprises an enzyme and nucleotides.

According to a further aspect of the present invention there is provided a method for providing double emulsion droplets. For provision of double emulsion droplets the method comprises use of any of: the microfluidic device according to the present invention; the assembly according to the present invention; or the kit according to the present invention. The method may comprise: providing a first fluid to the primary supply container of a first group of containers; providing a second fluid to the secondary supply container of the first group of containers; providing a third fluid to the tertiary supply container of the first group of containers; and providing pressure differences between each of the respective supply containers of the first group of containers and the collection container of the first group of containers, such that the pressure within each of the individual supply containers of the first group of containers is higher than within the collection container of the first group of containers.

When the method comprises use of the kit according to the present invention, the first fluid may comprise the sample buffer, the second fluid may comprise the oil, and/or the third fluid may comprise the continuous phase buffer.

According to a further aspect of the present invention there is provided a method for manufacturing a microfluidic device according to the present invention. The method may comprise fixing the container section and the microfluidic section to each other, such that fluid communication is provided between the individual containers of each group of containers via the corresponding respective microfluidic units.

According to a further aspect of the present invention there is provided a method for manufacturing a microfluidic device according to the present invention. The method for manufacturing a microfluidic device may comprise fixing a base container structure piece and a base microfluidic piece to each other, such that fluid communication is provided between the individual containers and the corresponding respective openings of the microfluidic units.

An advantage of the present invention, such as the provision of the plurality of microfluidic units and the corresponding plurality of groups of containers of the microfluidic device, may comprise that individual and/or parallel processing of several samples may be facilitated. The first fluid, which typically comprises sample material, may therefore be denoted "sample".

An advantage of the present invention, such as the provision of the container section and the microfluidic section, e.g. forming a fixedly connected unit, may comprise that the liquids used for provision of double emulsion droplets, i.e. e.g. the first fluid, the second fluid, and the third fluid, as well as the resulting droplets may be contained within the microfluidic device. This often provides ease of use of the device and the method according to the present invention and/or provides low risk of contamination of results and/or facilitate that droplets generated according to the present invention possess improved monodisperse characteristics and/or reproduction characteristics. This may at least in part be caused by the present invention avoiding or minimizing use of complex connections with extended tubing and connecting features of varying length, as may be used by prior art solutions.

It is one advantage of the present invention that the first transfer conduit part has a first affinity for water and the first collection conduit part has a second affinity for water which is different from the first affinity for water, because it result in that double emulsion droplets are be produced within one microfluidic unit. Further, it results in more uniform and/or more monodisperse droplets. Connecting two individual microfluidic parts having different surface properties, as may be provided according to prior art solutions, may result in a flow of droplets with unequal spacing between the droplets, which may result in production of polydisperse droplets.

An advantage of the present invention, such as the assembly, such as the pressure distribution structure comprising a plurality of line pressure regulators, may comprise that pressures applied to supply containers are separately adjustable. For instance, all secondary supply containers may be provided with a first pressure and all tertiary supply containers may be provided with a third pressure. Likewise, for all primary supply containers, in particular if provided in form of a well and not an intermediate chamber. This may in turn enable or facilitate the production of droplets with specific properties such as of a specific size and/or with a specific thickness of the shell of the second fluid, such as oil, and/or or with a desired ratio of double emulsions to oil droplets without an inner first fluid, such as a sample droplet.

An advantage of the present invention, such as the kit comprising a plurality of fluids configured for use with the microfluidic device according to the present invention, may comprise that the properties of the fluids may be provided such that they are configured for the specific microfluidic device comprised in the kit, which may in turn reduce the risk of using fluids that could compromise droplet production or droplet stability.

An advantage of using a method according to the present invention for providing double emulsion droplets, wherein the method comprises use of any of: the microfluidic device according to the present invention; the assembly according to the present invention; or the kit according to the present invention; for the provision of double emulsion droplets, may comprise that simultaneous and parallel production of a plurality of droplet emulsions may be achieved which reducing use of time and/or handling. An alternative or additional advantage of using the method according to the present invention may comprise that parallel samples produced using the method may be more homogeneous, which may result in more comparable results from parallel samples. An alternative or additional advantage of using the method according to the present invention may comprise that the assembly may be used with the same pre-set, e.g. pre-programmed, settings for repetitive runs without having to adjust e.g. pressures and/or other settings, which may in turn minimise the time and handling to produce droplets and/or may enable droplet production e.g. even if the droplets cannot be monitored during production.

An advantage of the method for manufacturing according to the present invention, wherein the method comprises fixing the container section and the microfluidic section to each other, such that fluid communication is provided between the individual containers of each group of containers via the corresponding respective microfluidic units, may comprise, that the risk of leakage of liquids is alleviated. An alternative or additional advantage may comprise that any or some variations in results between parallel and/or consecutive sample production may be alleviated.

The microfluidic device and/or any method according to the present invention may be structurally and/or functionally configured according to any statement of any desire of the present disclosure.

The present invention relates to different aspects including the devices and methods described above and in the following. Each aspect may yield one or more of the benefits and advantages described in connection with one or more of the other aspects. Each aspect may have one or more embodiments with all or just some of the features corresponding to the embodiments described in connection with one or more of the other aspects and/or disclosed in the appended claims.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The above, as well as additional objects, features and advantages of the present inventive concept, will be better understood through the following illustrative and non-limiting detailed description of preferred embodiments and/or features of the present inventive concept, with reference to the appended drawings, where like reference numerals may be used for like elements. Furthermore, any reference numerals wherein the last two digits are identical, but where any one or two preceding digits are different, may indicate that those features are structurally differently illustrated, but that these features may refer to the same functional features of the present invention, cf. the list of reference numbers.

The accompanying drawings are included to provide a further understanding of the invention, and are incorporated in and constitute a part of this specification. The drawings illustrate embodiments of the invention and, together with the description, serve to explain the principles of the invention. Other and further aspects and features may be evident from reading the following detailed description of the embodiments.

The drawings illustrate the design and utility of embodiments. These drawings are not necessarily drawn to scale. In order to better appreciate how the above-recited and other advantages and objects are obtained, a more particular description of the embodiments will be rendered, which are illustrated in the accompanying drawings. These drawings may only depict typical embodiments and may therefore not be considered limiting of its scope.

Figure 1:
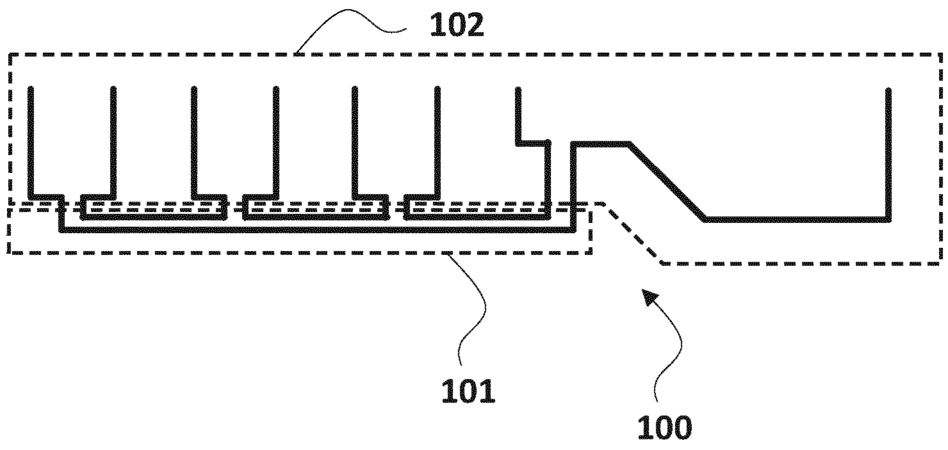

FIG. 1 schematically illustrates a cross-sectional side view of a first embodiment of a microfluidic device according to the present invention.

Figure 2:
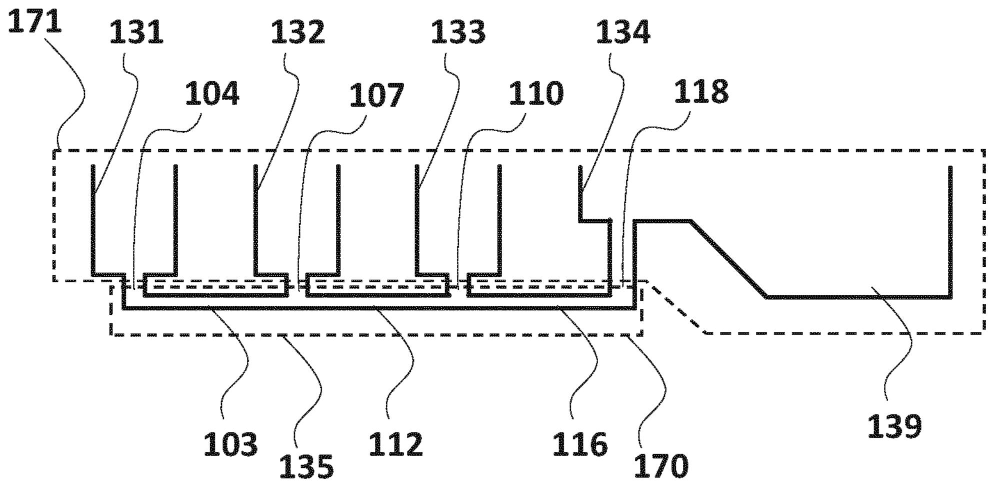

FIG. 2 schematically illustrates the embodiment of FIG. 1 without the dashed indications shown in FIG. 1.

Figure 3:
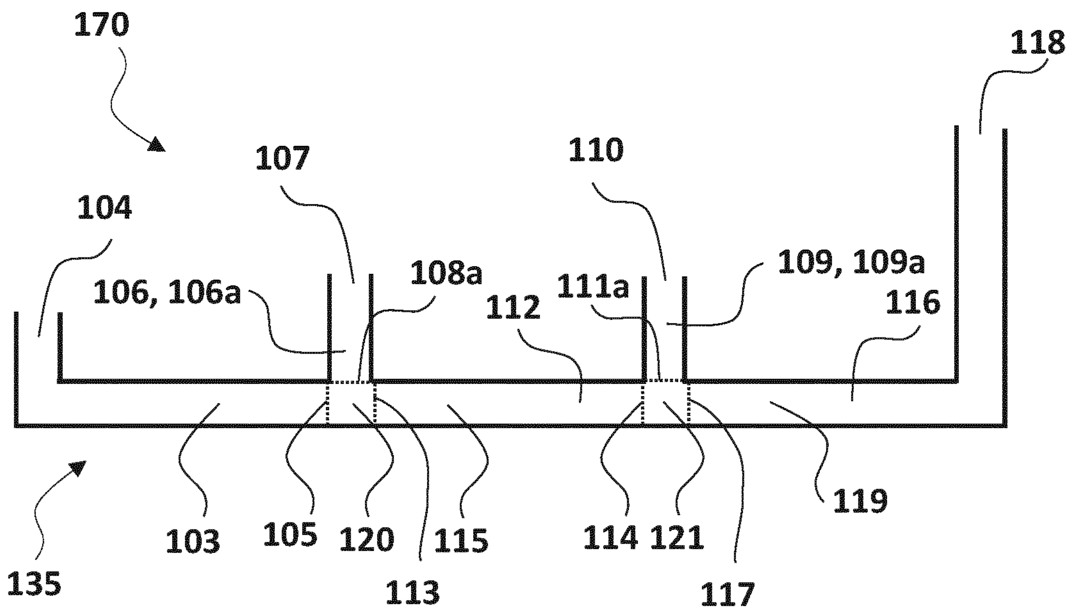
Figure 4:
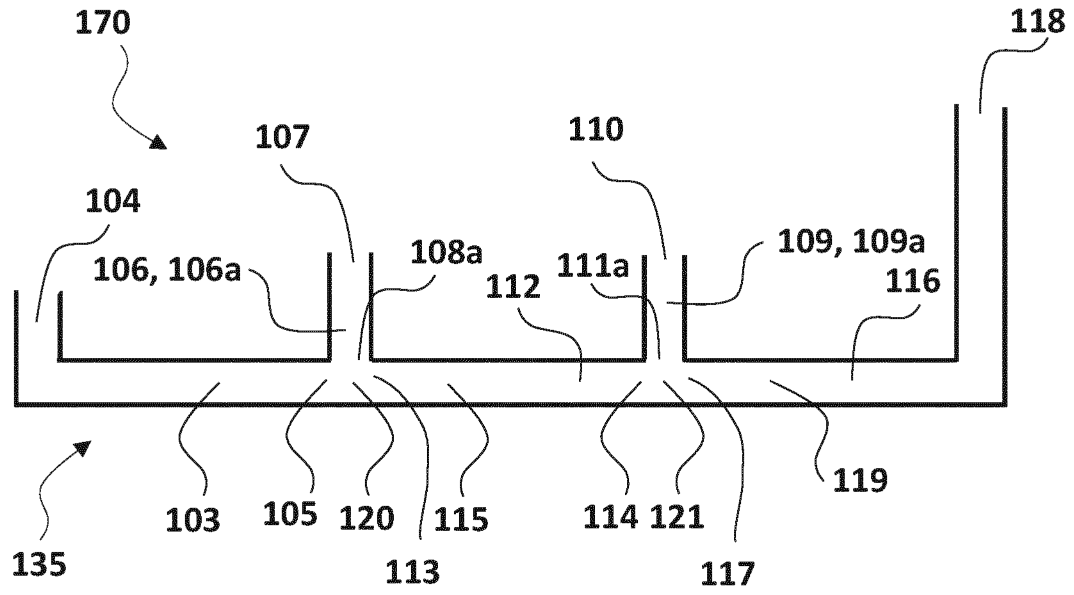

FIGS. 3 and 4 schematically illustrate the microfluidic unit of the embodiment illustrated in FIGS. 1 and 2.

Figure 5:
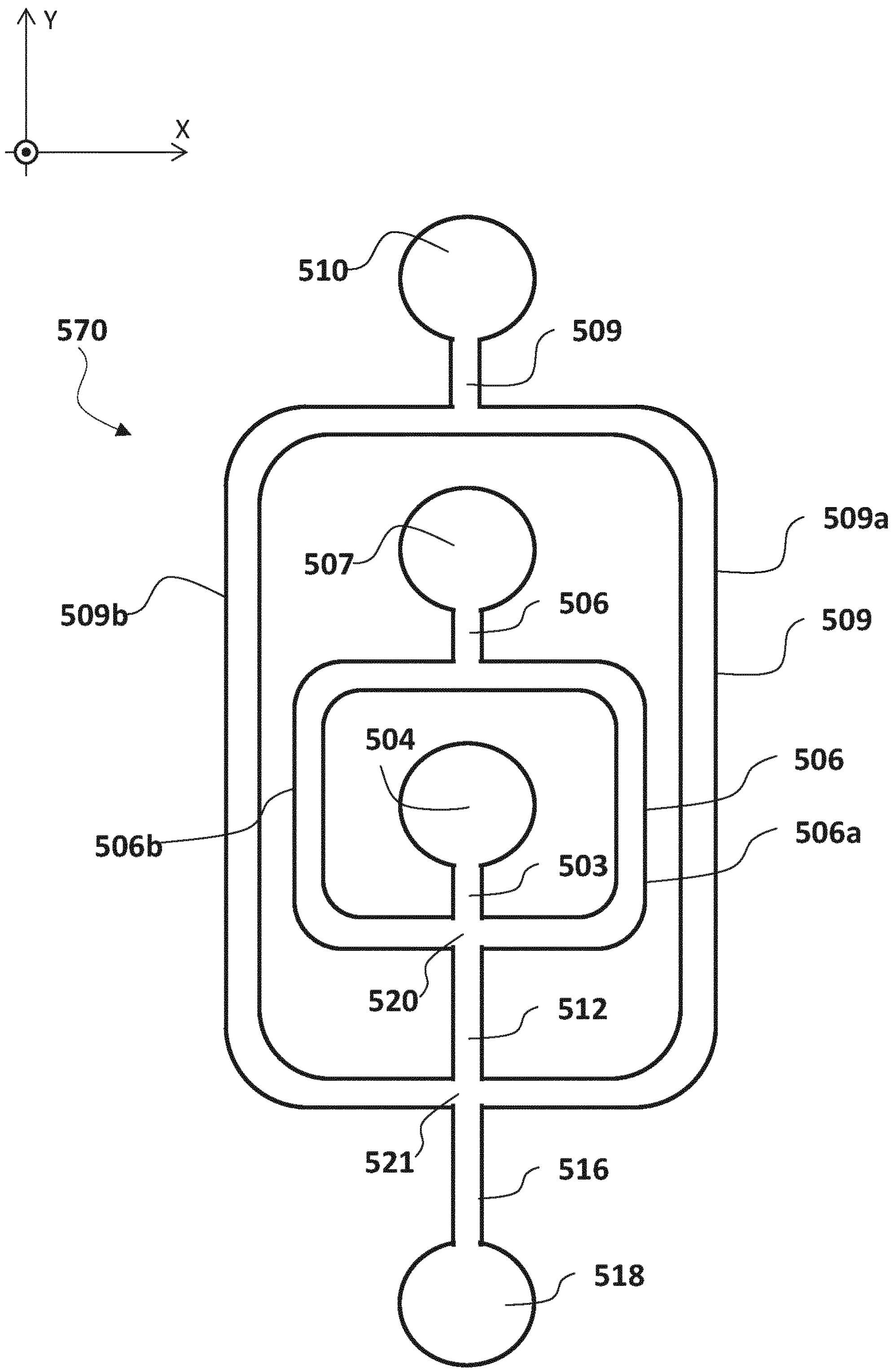

FIG. 5 schematically illustrates a cross-sectional top view of a microfluidic unit of a second embodiment of a microfluidic device according to the present invention.

Figure 6:
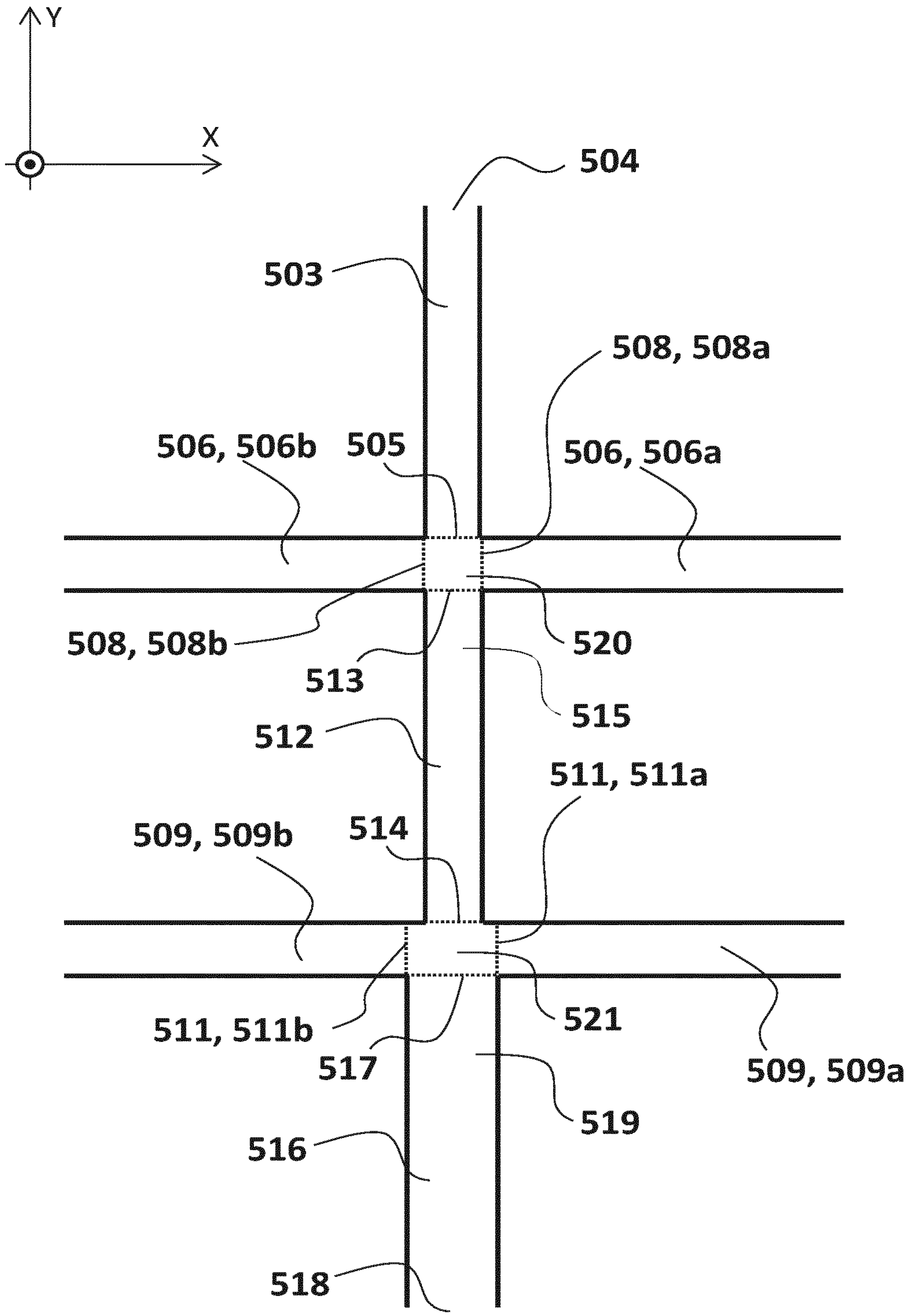

FIG. 6 schematically illustrates a part of the fluid conduit network of the second embodiment illustrated in FIG. 5.

Figure 7:
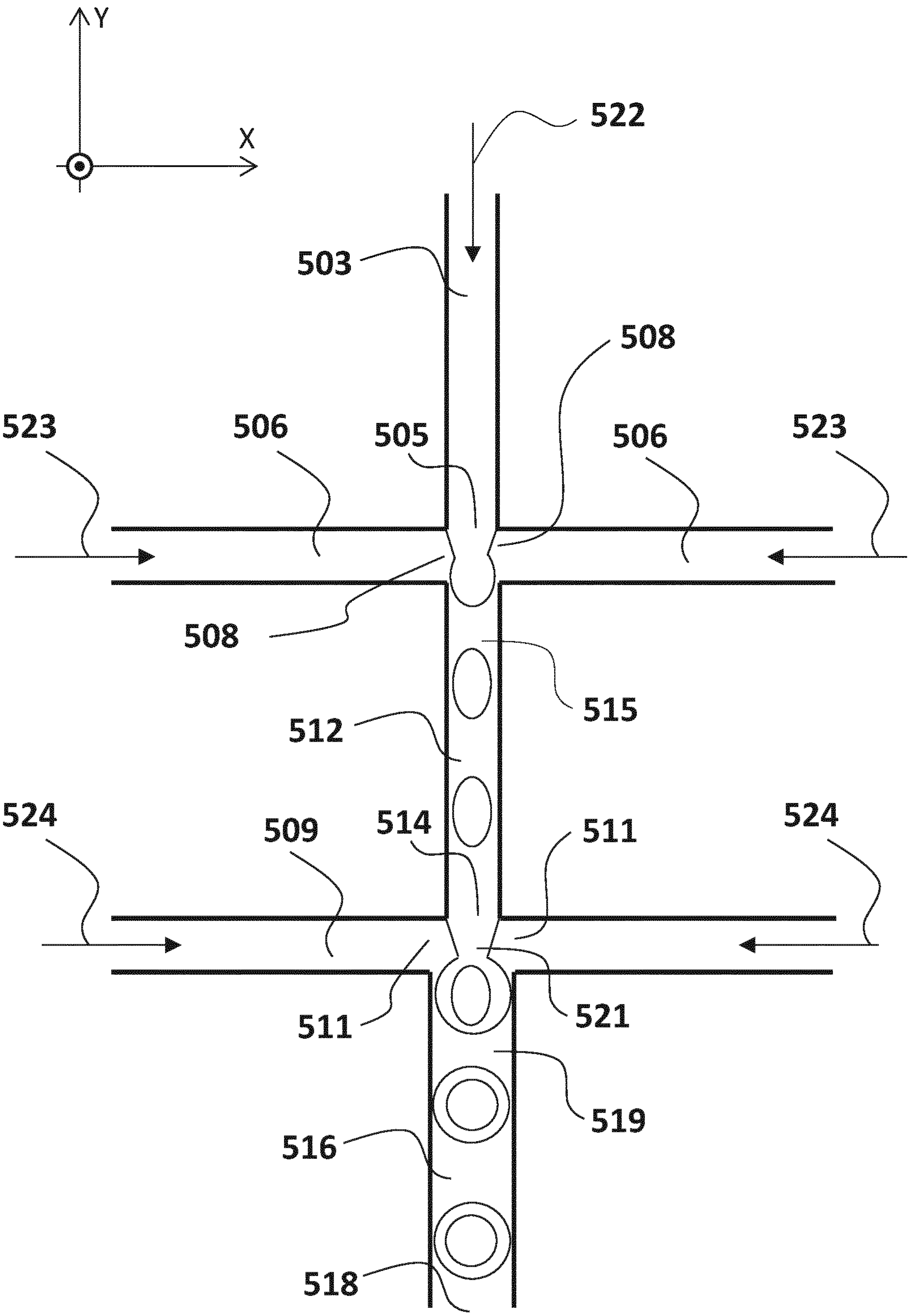

FIG. 7 schematically illustrates the part of the fluid conduit network illustrated in FIG. 6, illustrating formation of double emulsion droplets.

Figure 8:
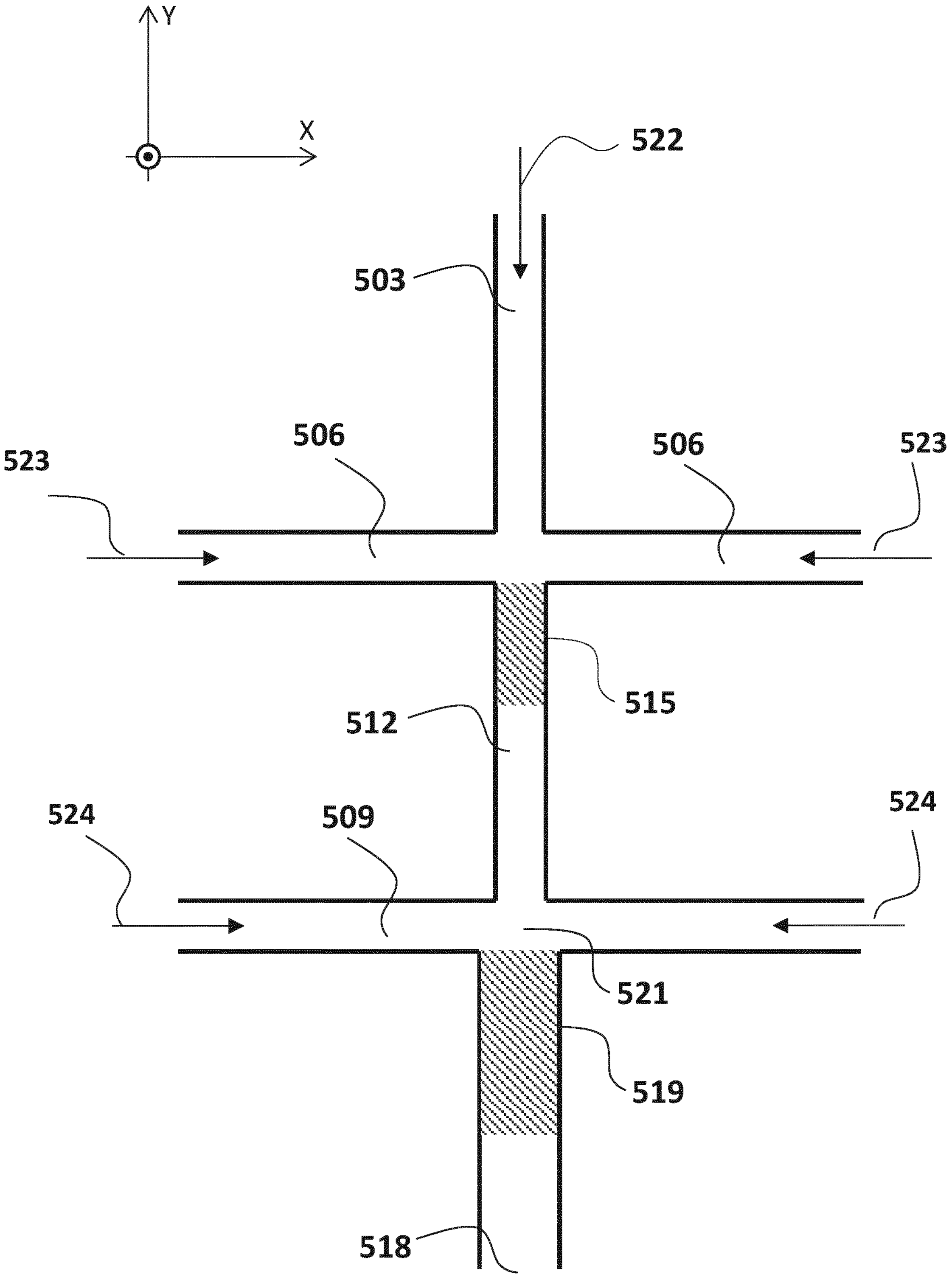

FIG. 8 schematically illustrates the part of the fluid conduit network illustrated in FIG. 6, indicating areas of the fluid conduit network where the first and second affinity for water, respectively, is required.

FIGS. 9*a*, 9*b*, 9*c*, 9*d* and FIGS. 10*a*, 10*b*, 10*c*, 10*d* schematically illustrate various examples for achieving the desired affinity for water at both the desired locations indicated in FIG. 8.

Figure 11:
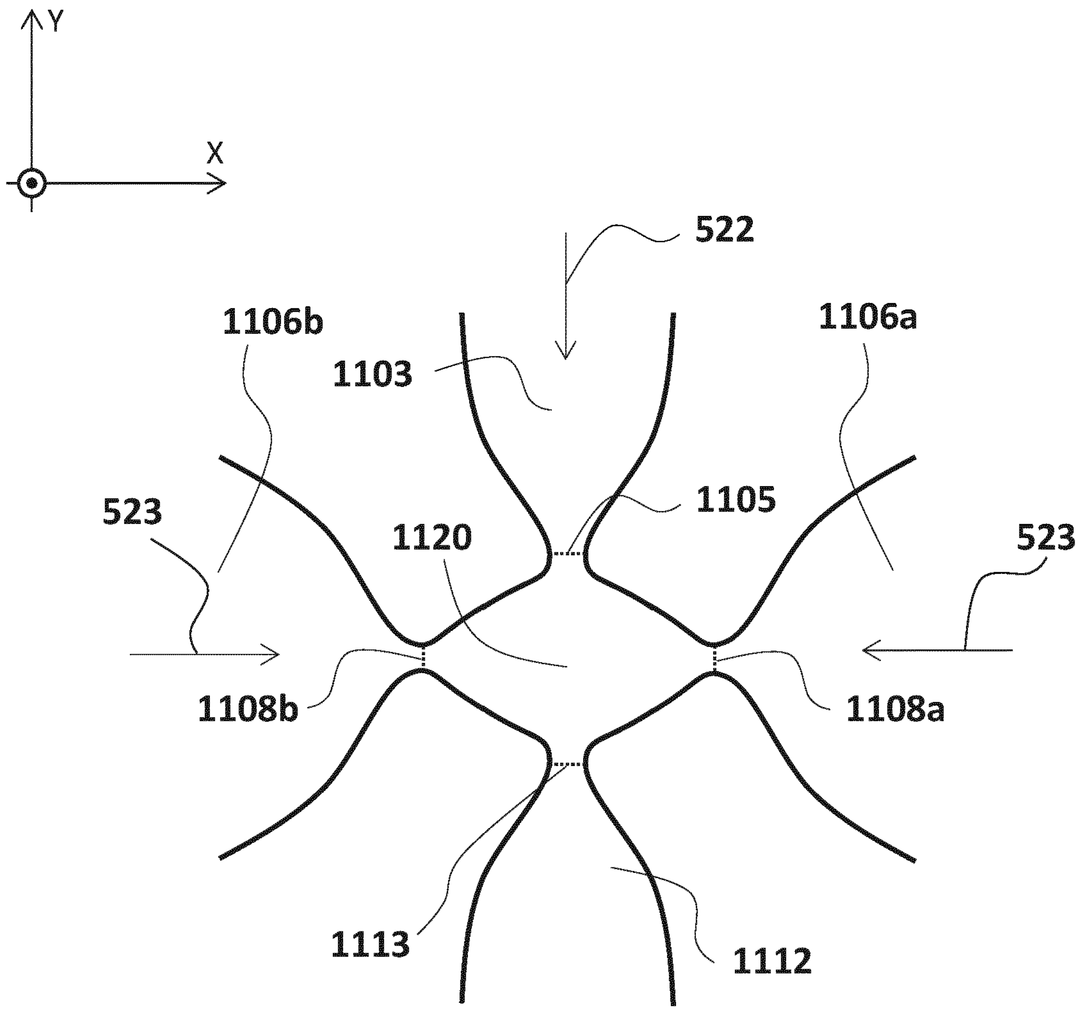

FIG. 11 schematically illustrates an example of a junction of a microfluidic device according to the present invention.

Figure 12:
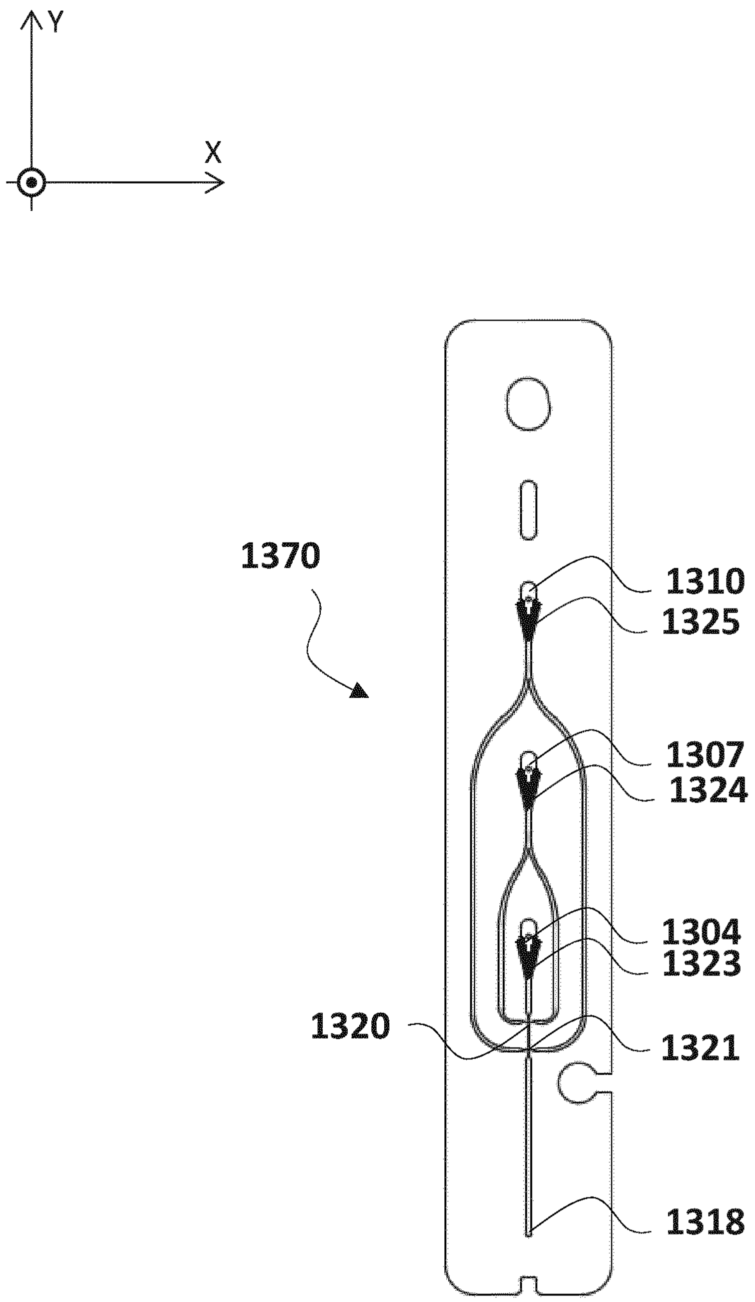

FIG. 12 schematically illustrates a cross-sectional top view of a microfluidic unit of a third embodiment of a microfluidic device according to the present invention.

Figure 13:
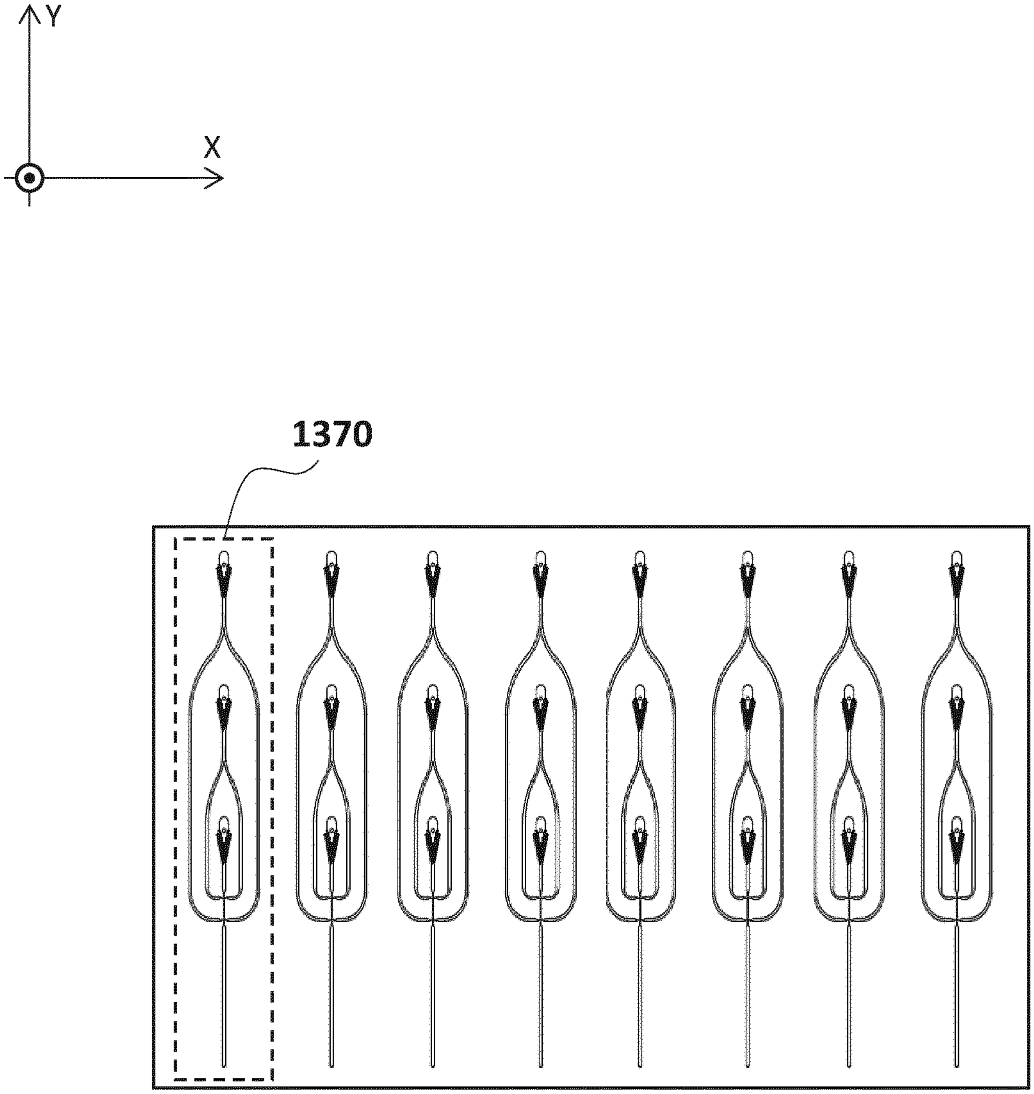

FIG. 13 schematically illustrates a cross-sectional top view of a plurality of microfluidic units of the third embodiment comprising the microfluidic unit illustrated in FIG. 12.

Figure 14:
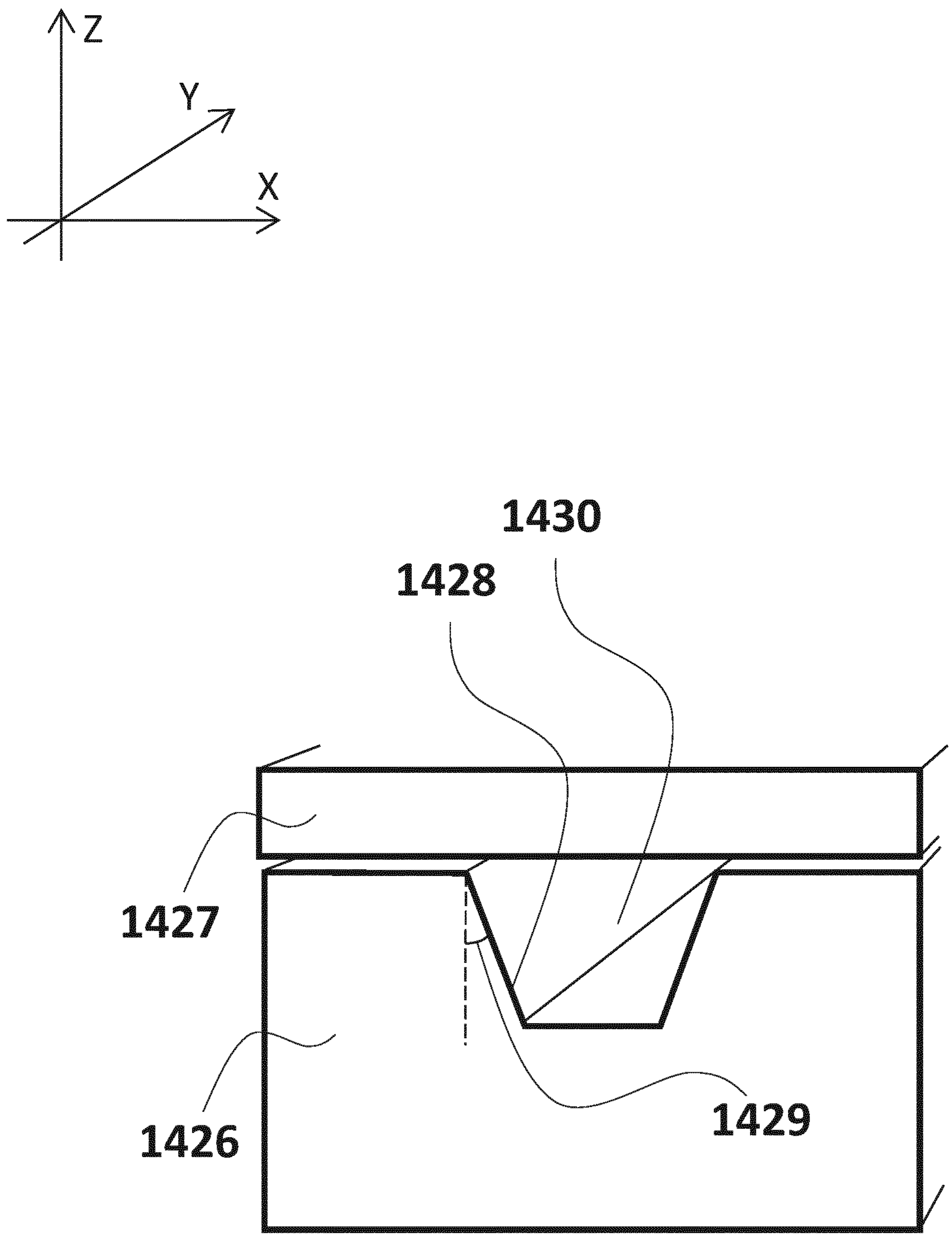

FIG. 14 schematically illustrates an isometric sectional view of a part of a conduit of a microfluidic device according to the present invention.

Figure 15:
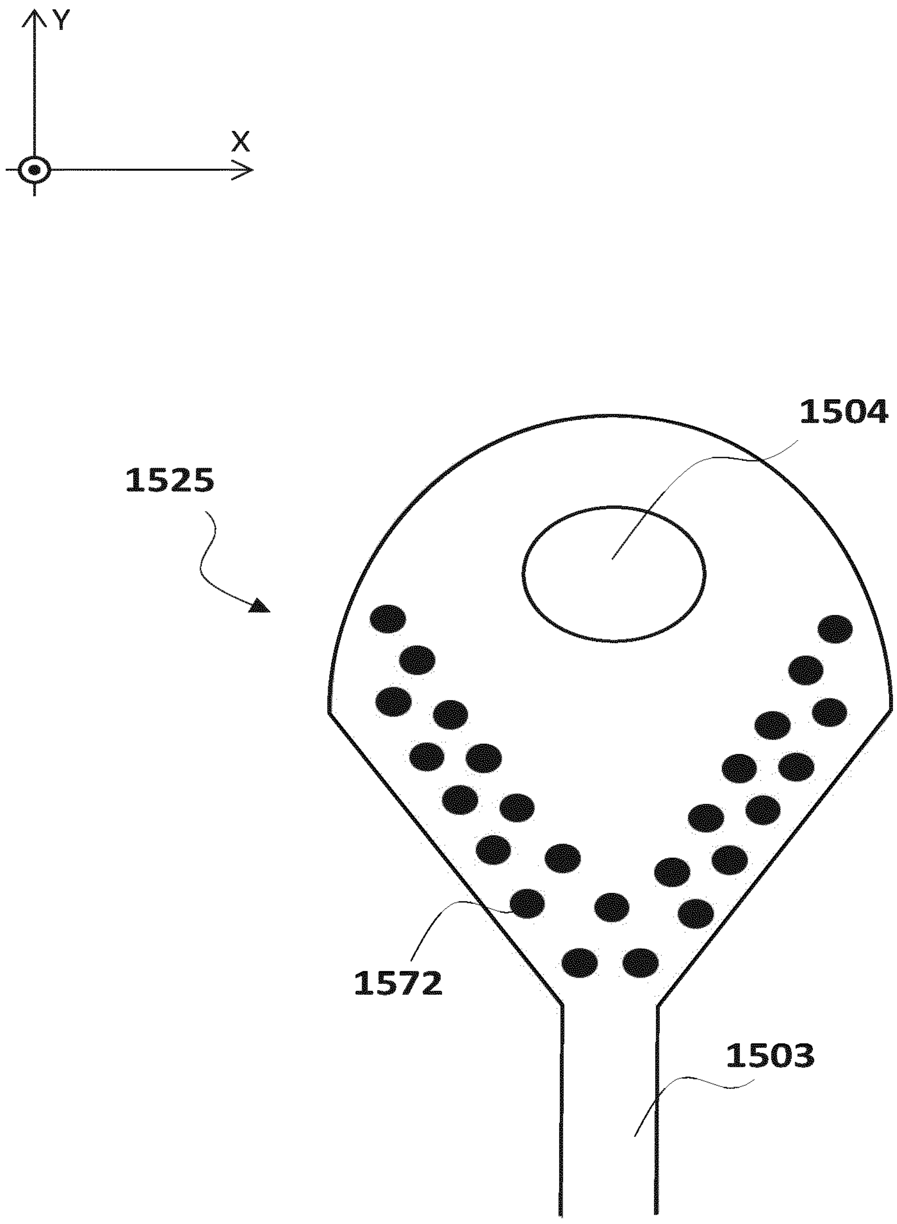

FIG. 15 schematically illustrates a cross-sectional top view of a supply inlet of a microfluidic device according to the present invention.

Figure 16:
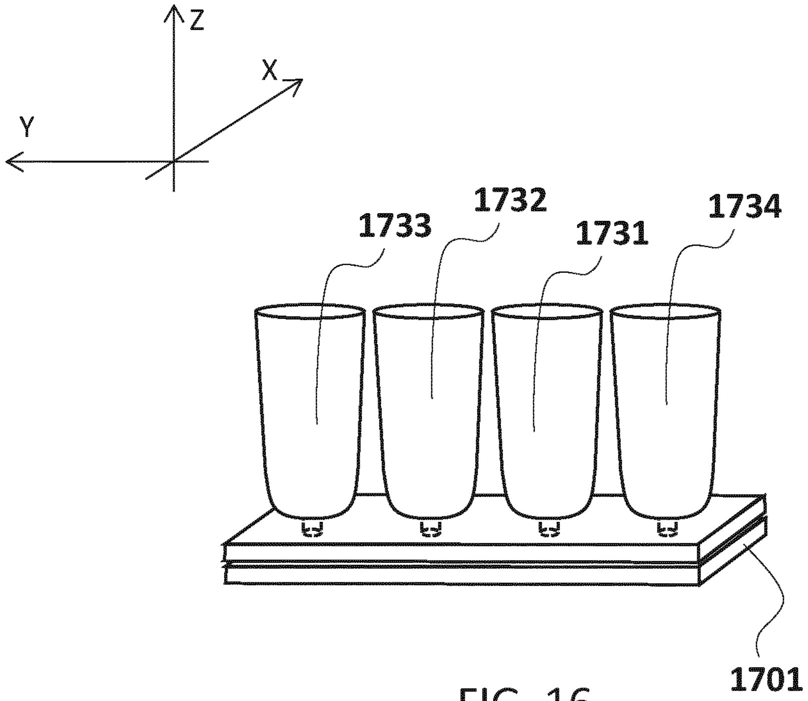

FIG. 16 schematically illustrates an isometric and simplified view of a part of a fourth embodiment of a microfluidic device according to the present invention.

Figure 17:
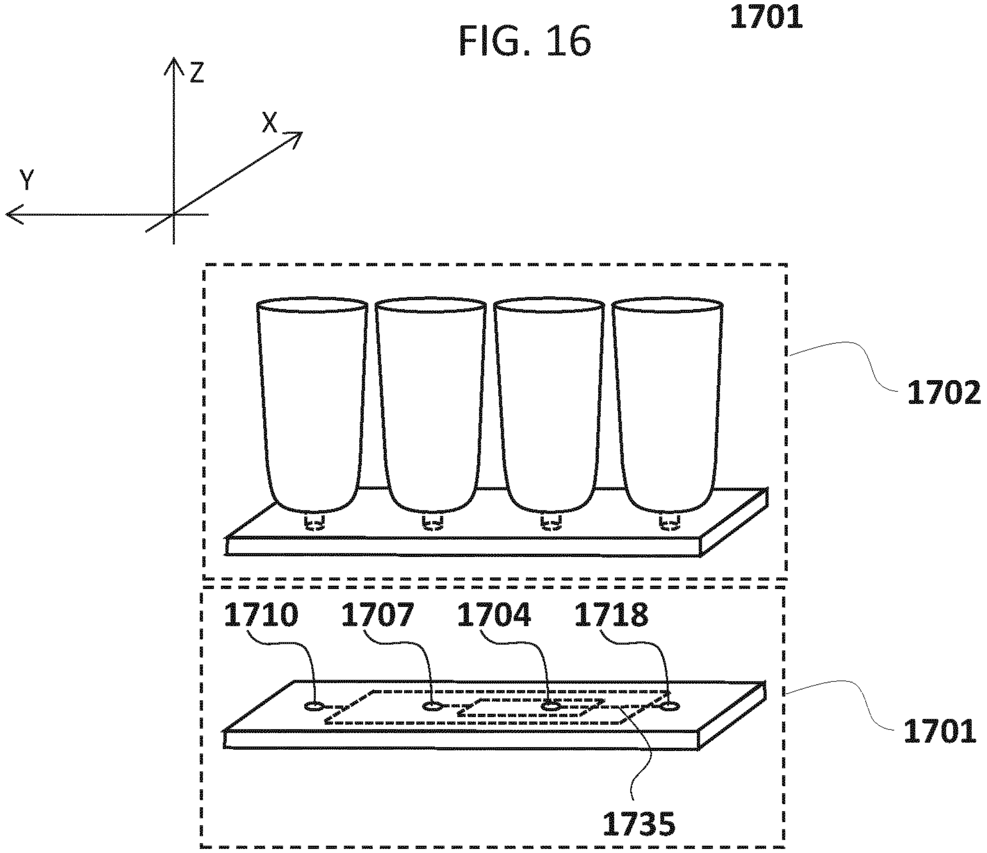

FIG. 17 schematically illustrates an exploded view of the simplified part of the fourth embodiment illustrated in FIG. 16.

Figure 18:
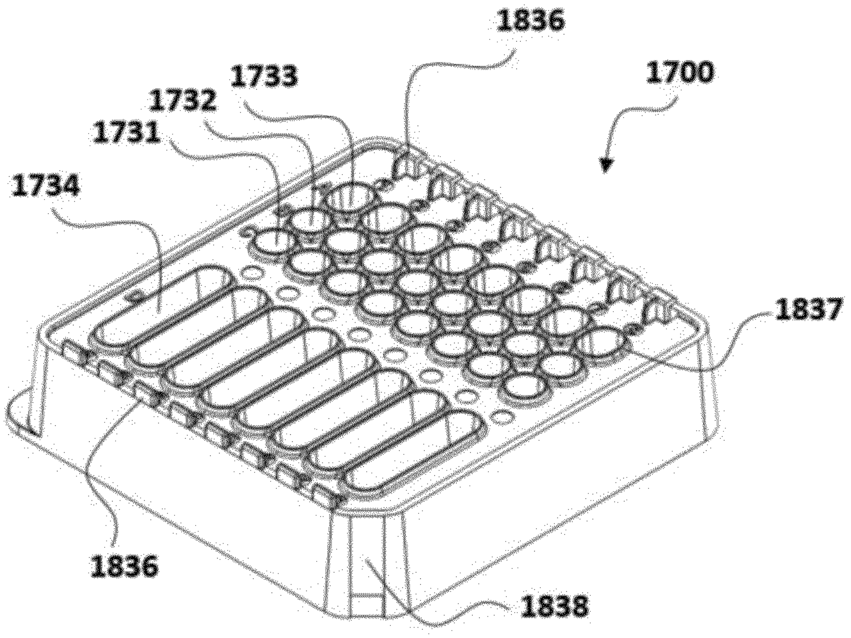

FIG. 18 schematically illustrates an isometric view of the fourth embodiment of a microfluidic device according to the present invention.

Figure 19:
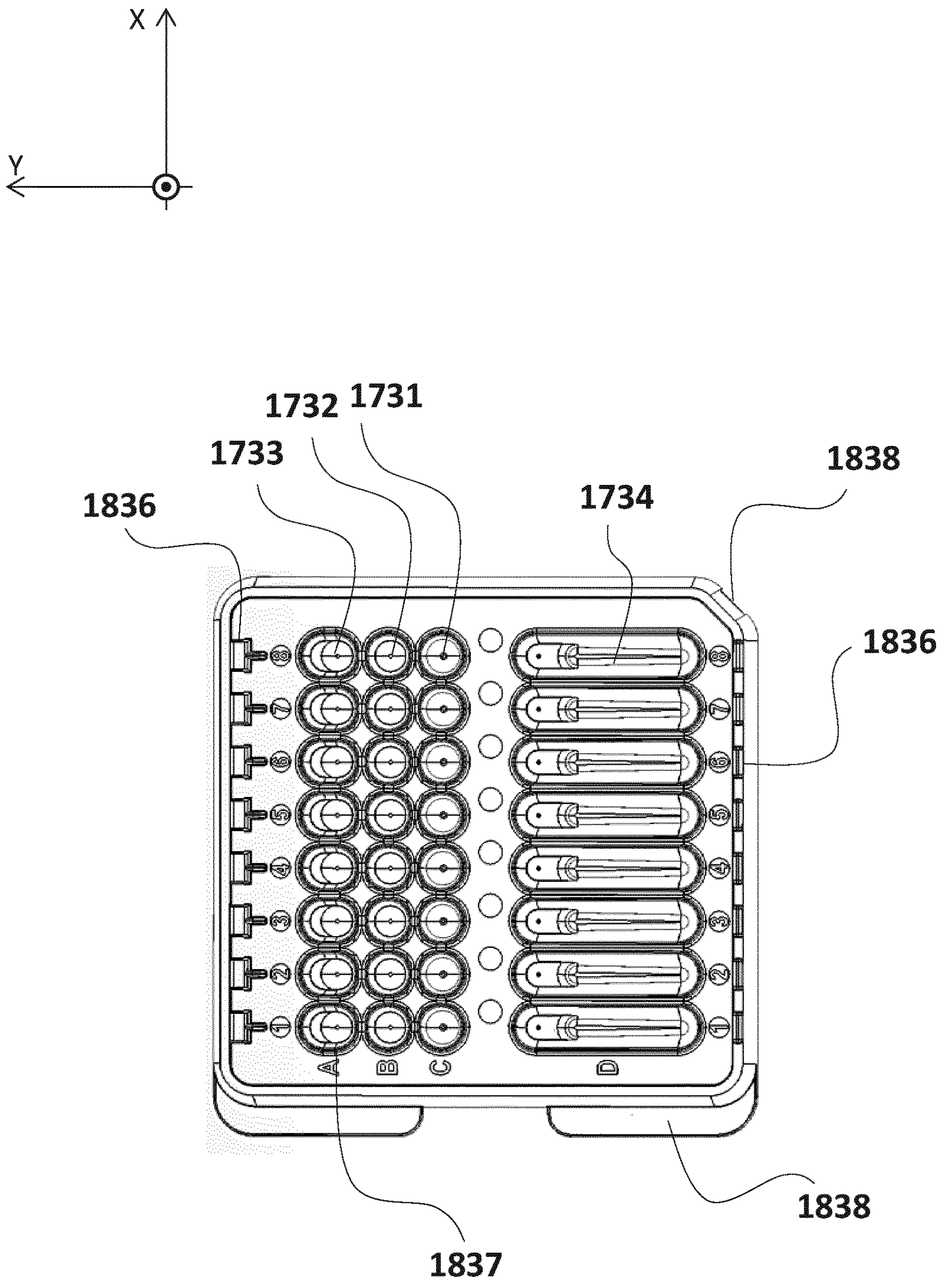

FIG. 19 schematically illustrates a top view of the fourth embodiment illustrated in FIG. 18.

Figure 20:
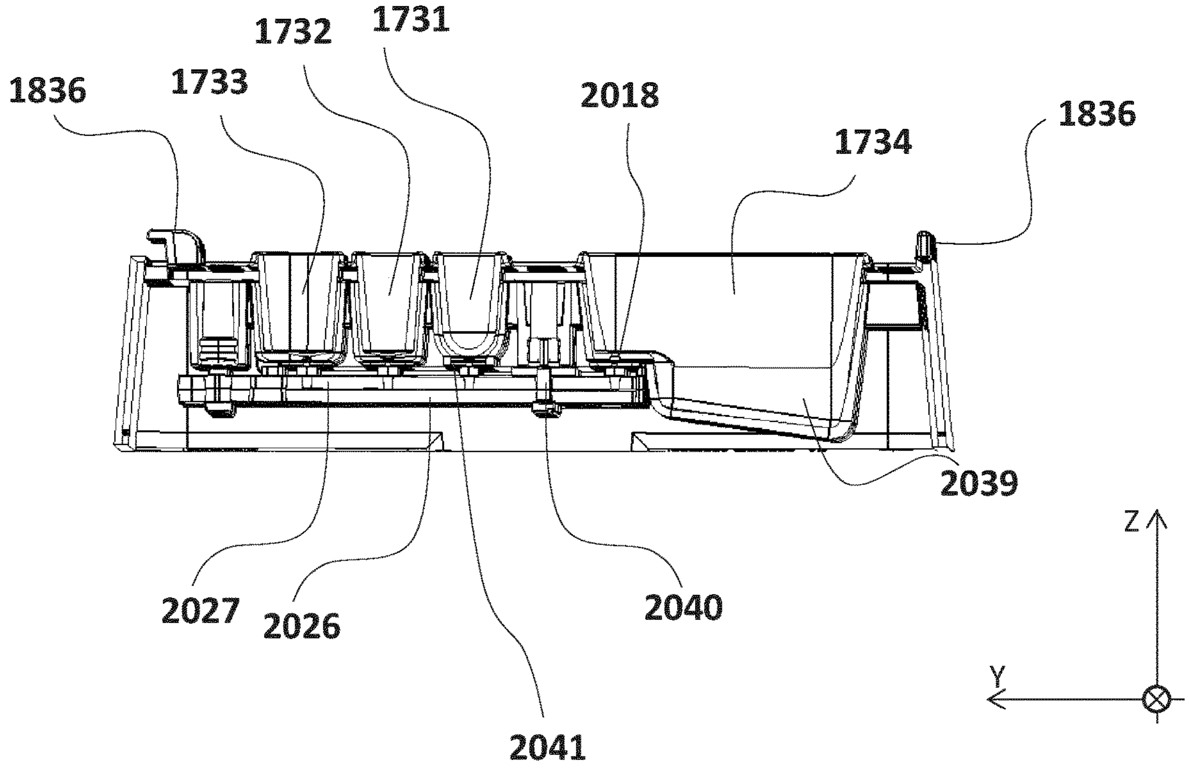

FIG. 20 schematically illustrates a cross-sectional side view of the fourth embodiment illustrated in FIGS. 18 and 19.

Figure 21:
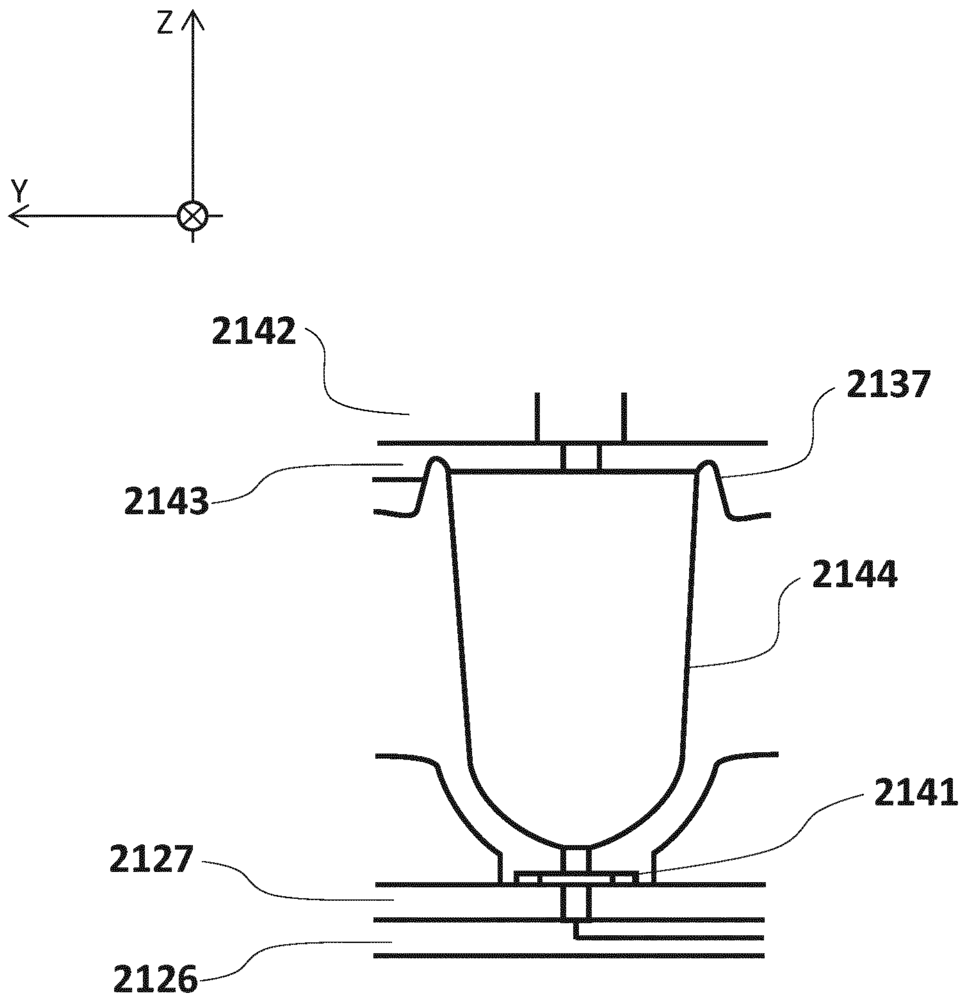

FIG. 21 schematically illustrates a cross-sectional side view of a container and a corresponding part of a microfluidic unit of a microfluidic device according to the present invention.

Figure 22:
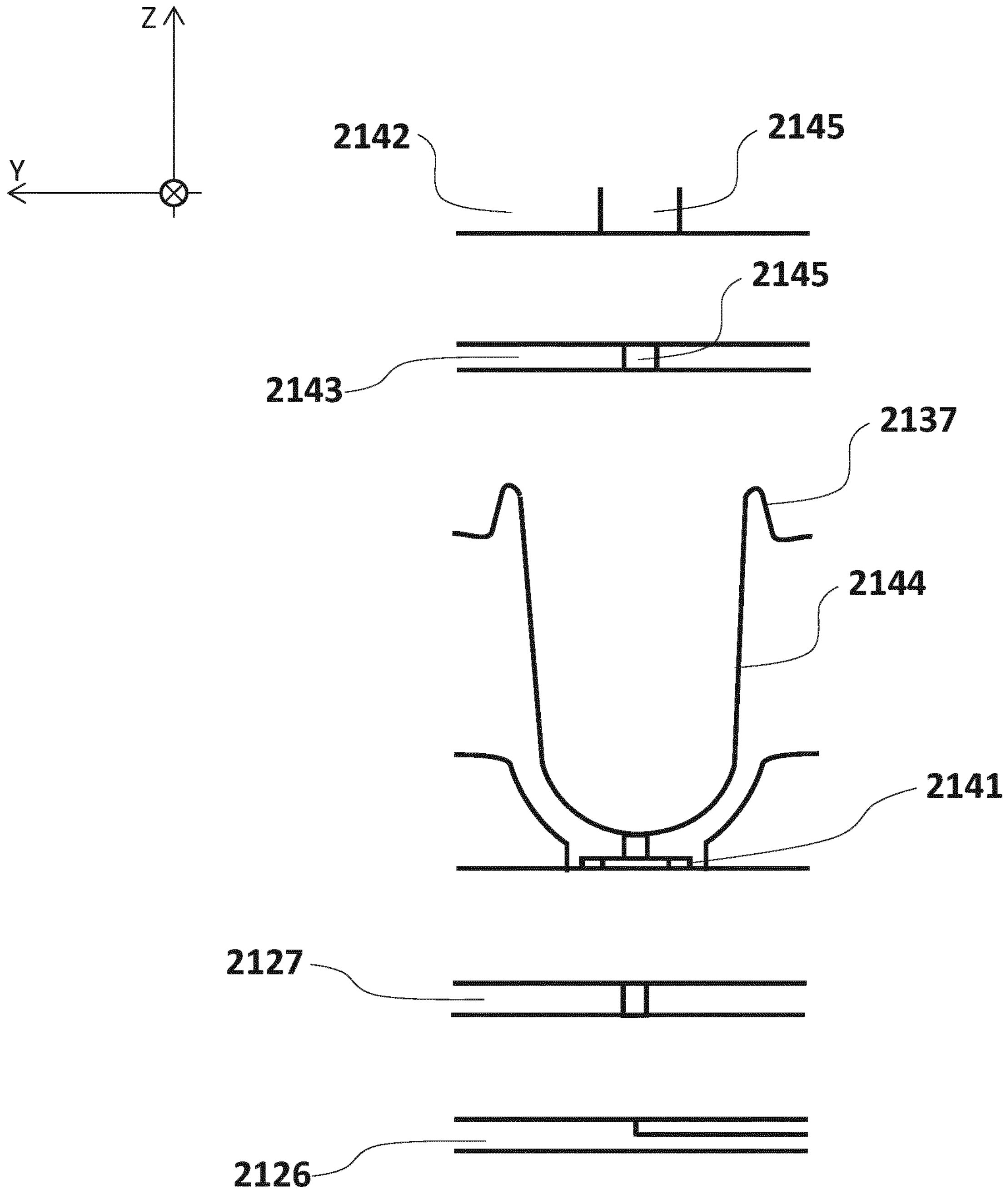

FIG. 22 schematically illustrates an exploded view of the illustration of FIG. 21.

Figure 23:
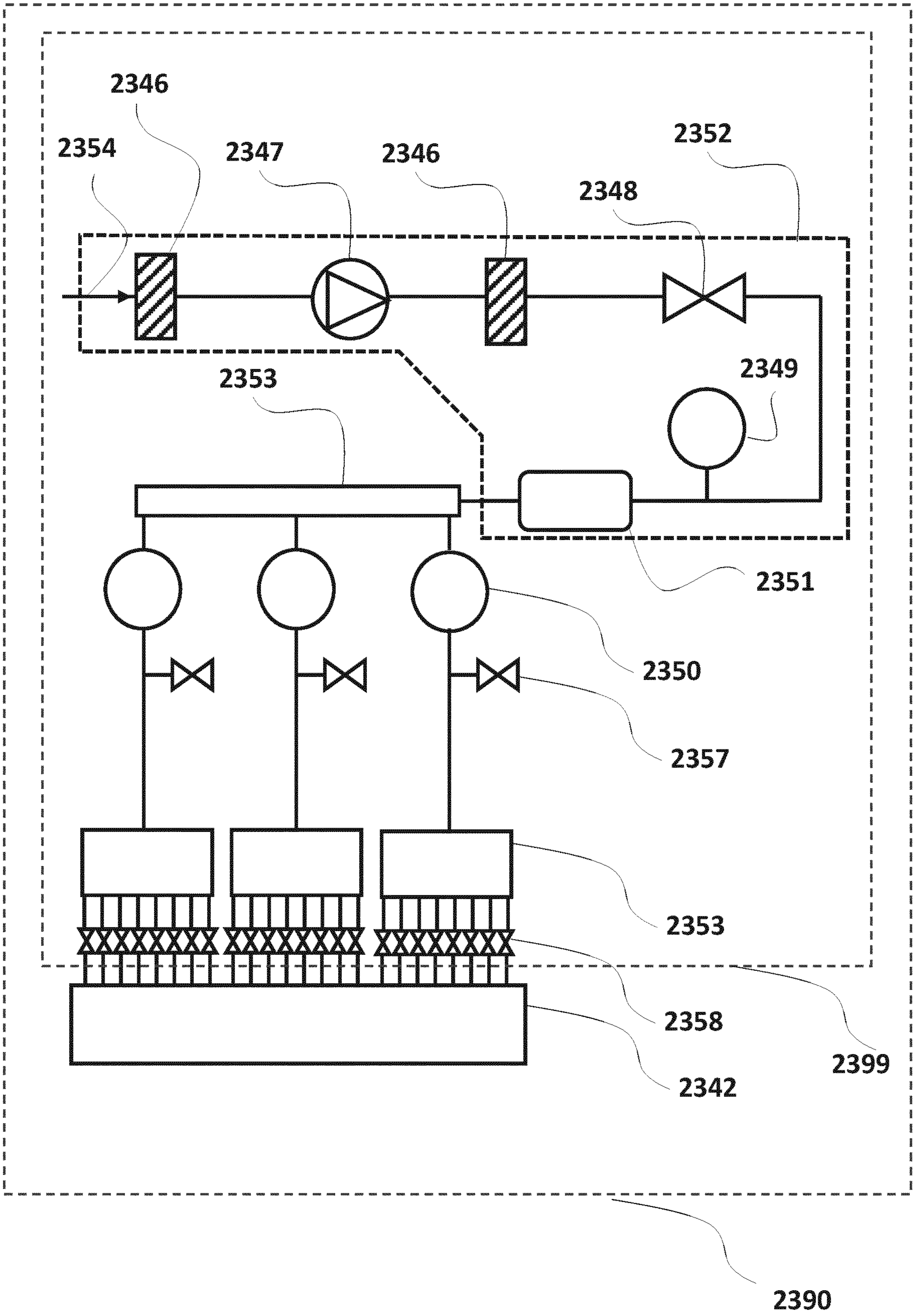

FIG. 23 schematically illustrates a first embodiment of an assembly according to the present invention.

Figure 24:
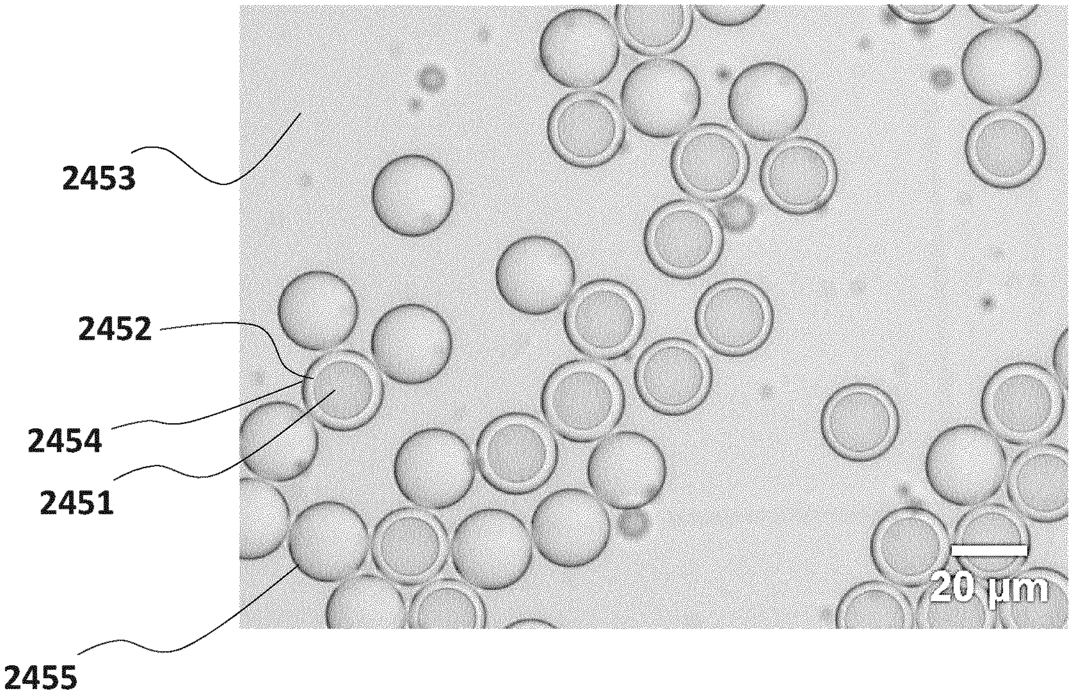

FIG. 24 shows an image of fluid from a collection container of a microfluidic device according to the present invention.

Figure 25:
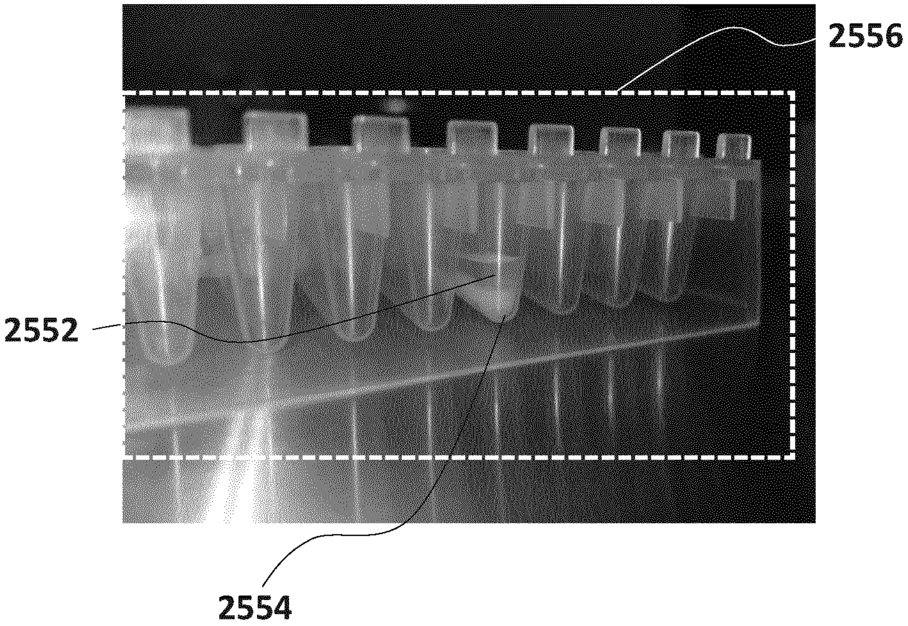

FIG. 25 shows an image of a plurality of collection containers of a microfluidic device according to the present invention.

Figure 26:
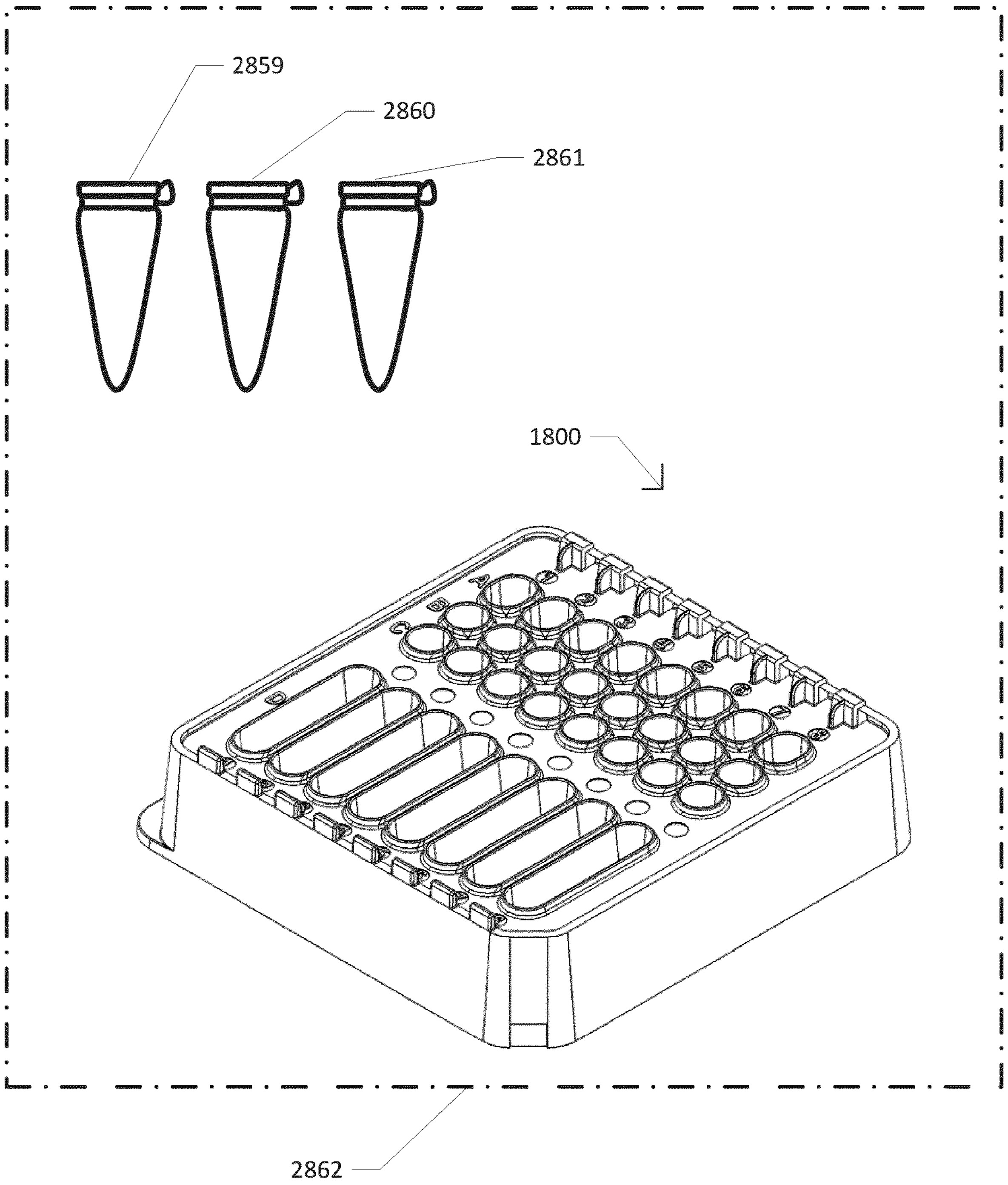
Figure 27:
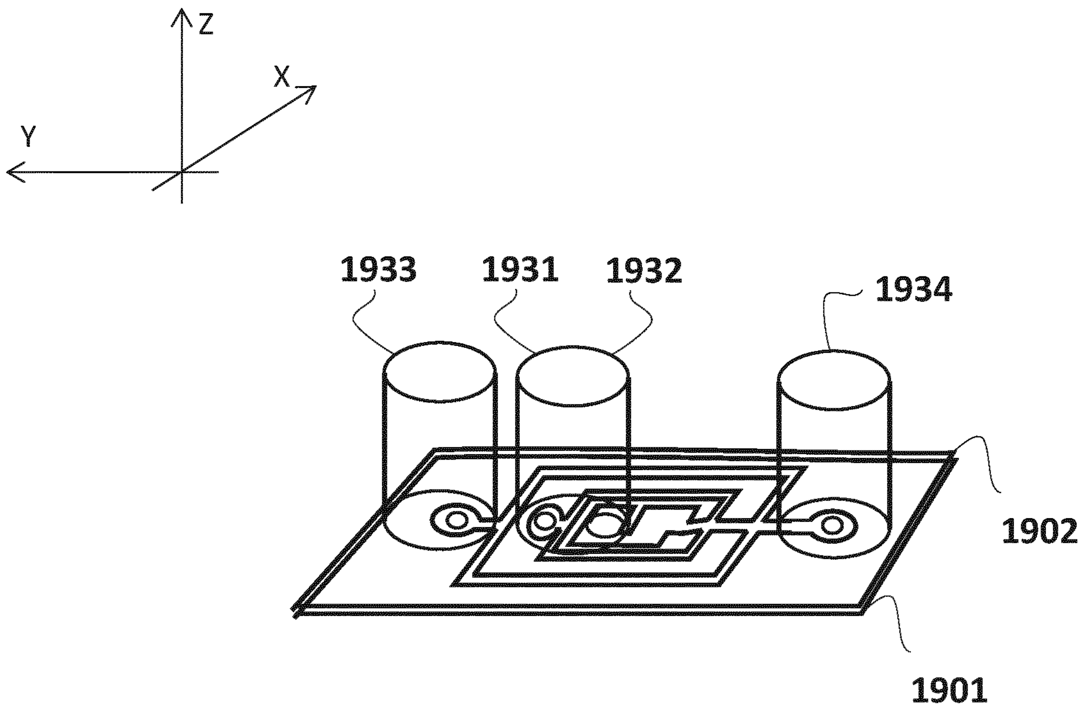

FIG. 26 schematically illustrates a first embodiment of a kit according to the present invention FIG. 27 schematically illustrates a perspective view of a part of a fifth embodiment of a microfluidic device according to the present invention.

Figure 28:
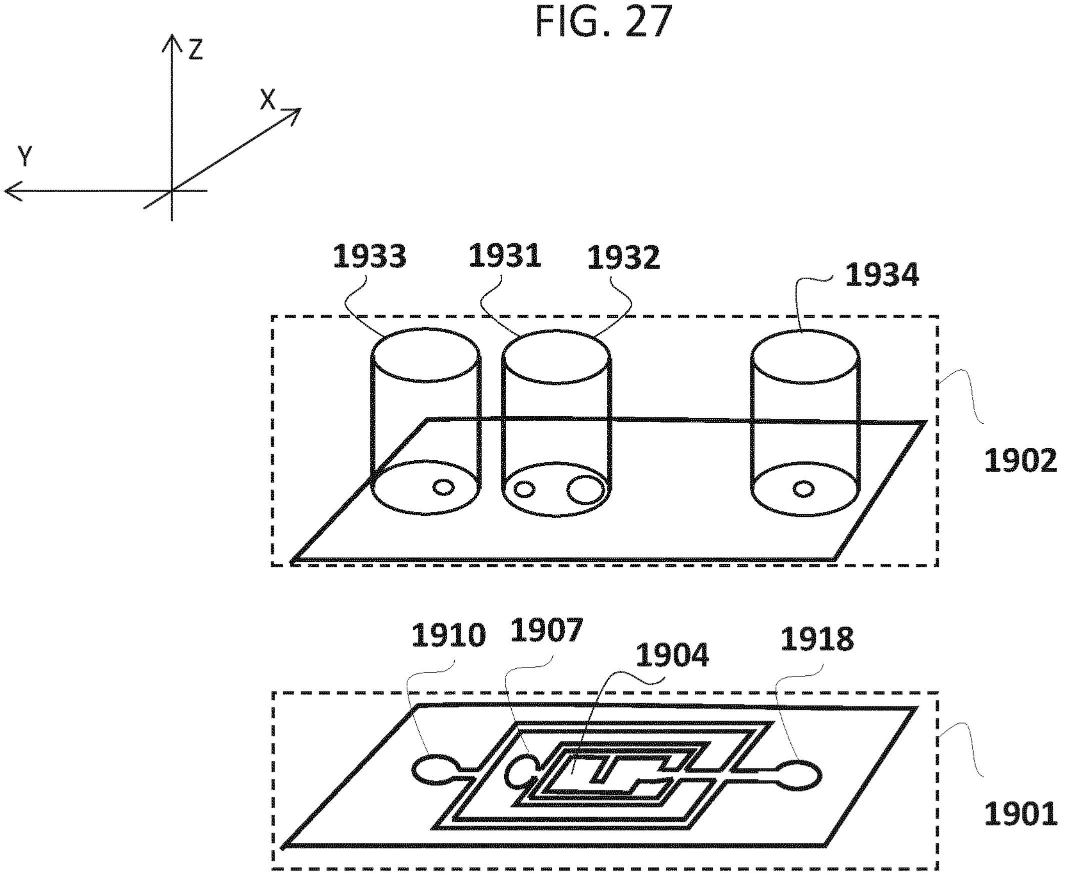

FIG. 28 schematically illustrates an exploded view of the embodiment illustrated in FIG. 27.

Figure 29:
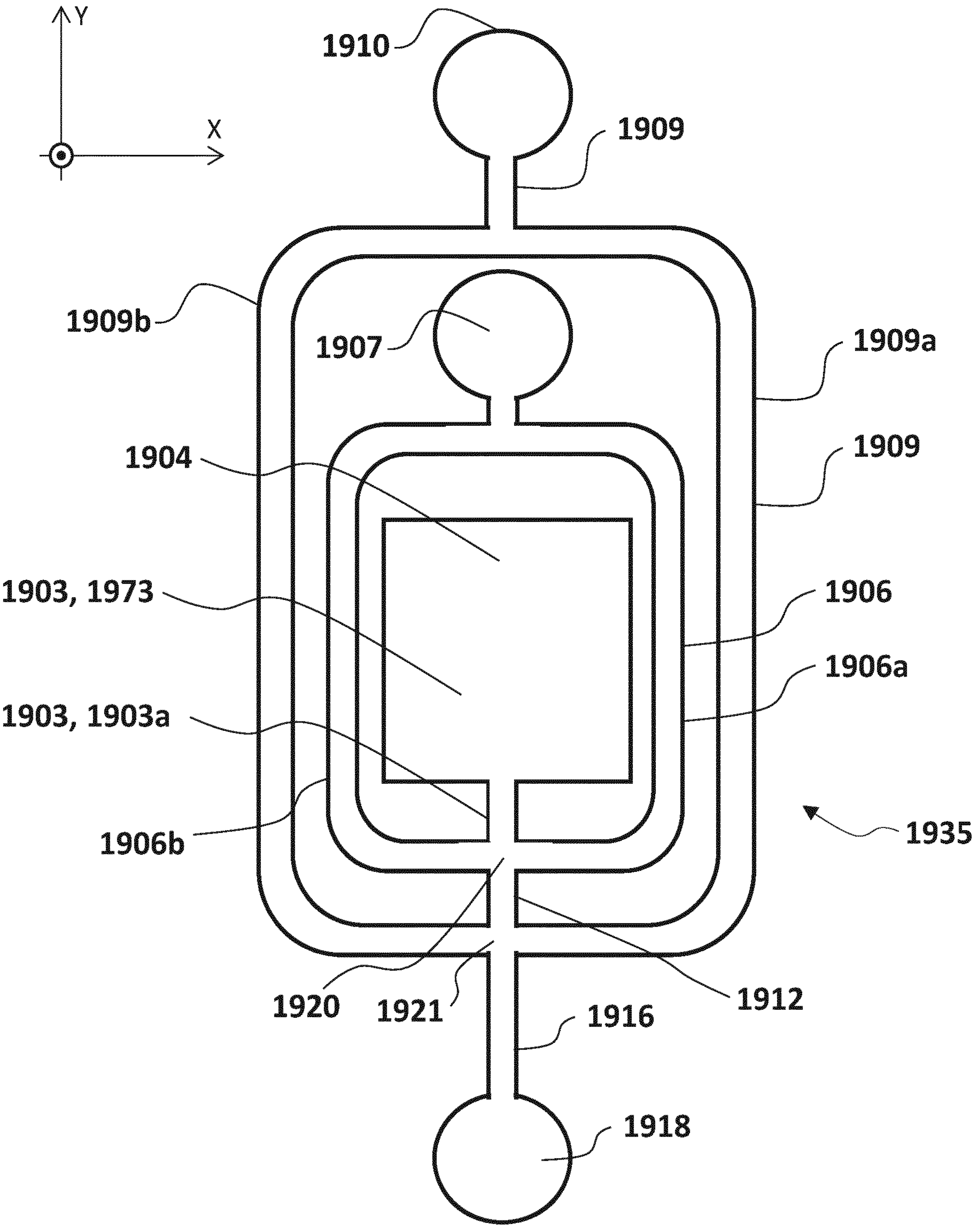

FIG. 29 schematically illustrates a top view of a part of the part of the fifth embodiment illustrated in FIGS. 27 and 28.

FIG. 30 schematically illustrates isometric exploded views of the microfluidic device of the fourth embodiment of a device according to the present invention.

Figure 30A:
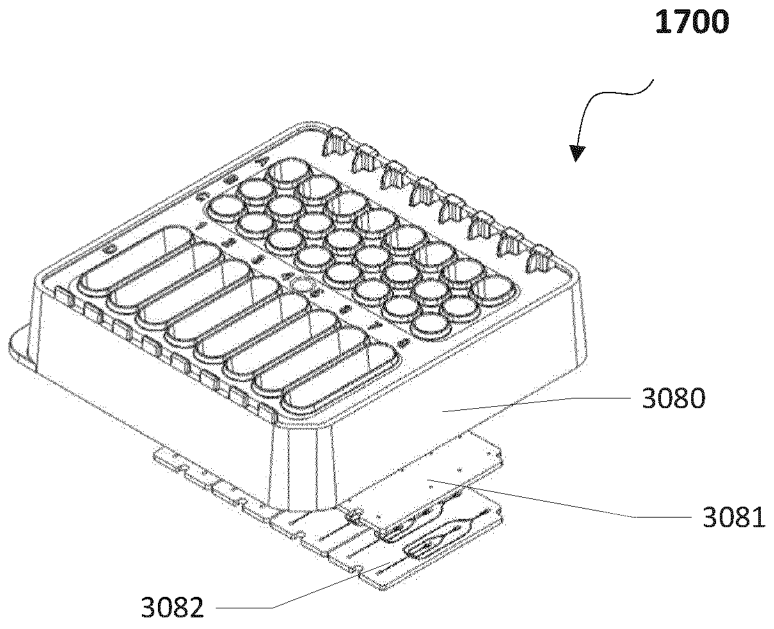
Figure 30B:
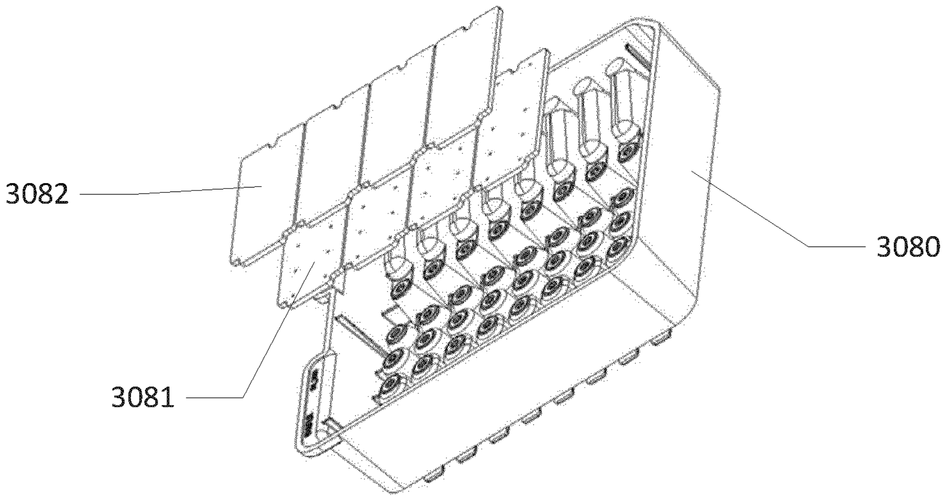
Figure 31:
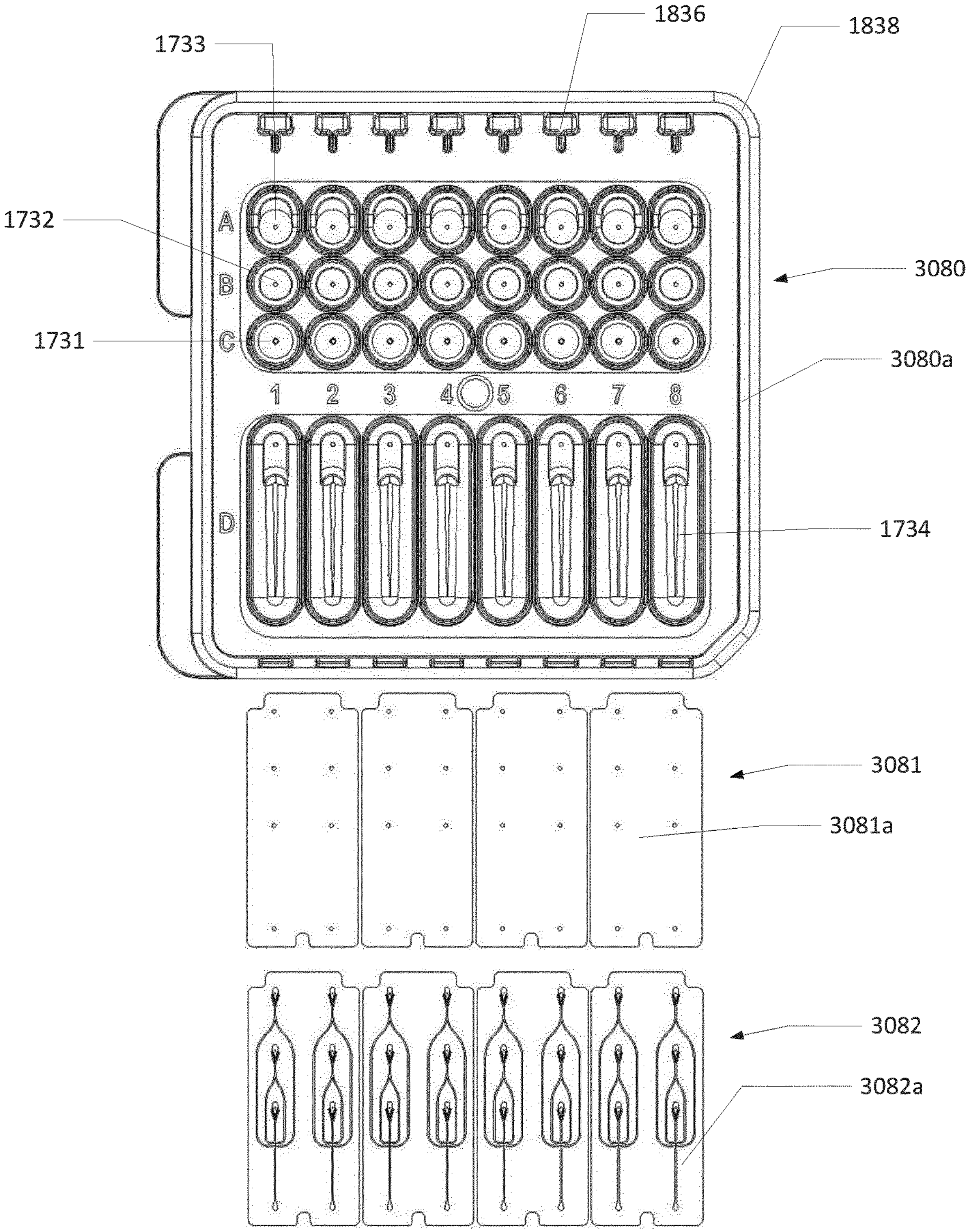

FIG. 31 schematically illustrates a top view of the fourth embodiment illustrated in FIG. 30 showing the exploded parts from top to bottom.

Figure 32:
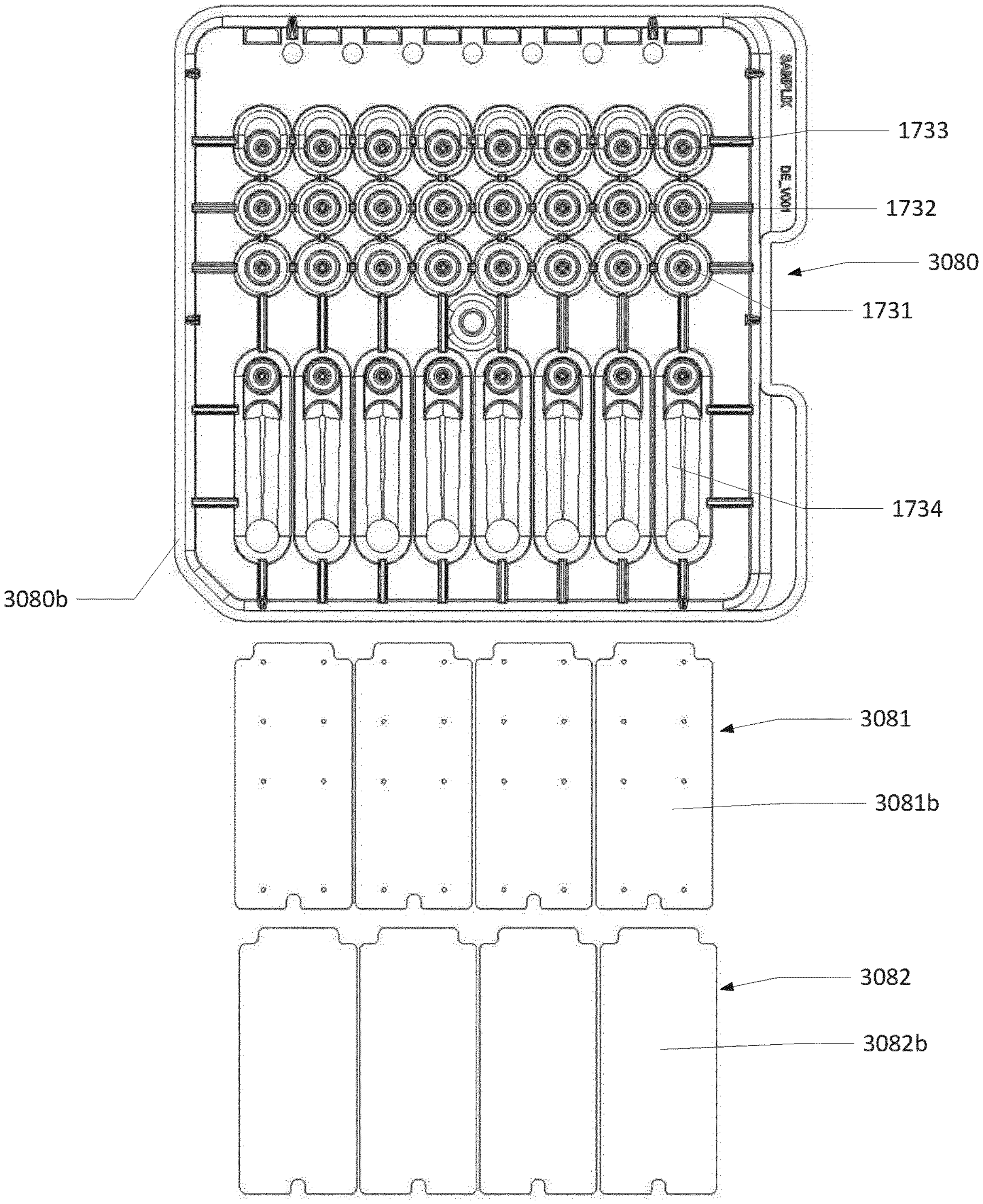

FIG. 32 schematically illustrates a bottom view of the fourth embodiment illustrated in FIG. 30 showing the exploded parts from top to bottom.

Figure 33:
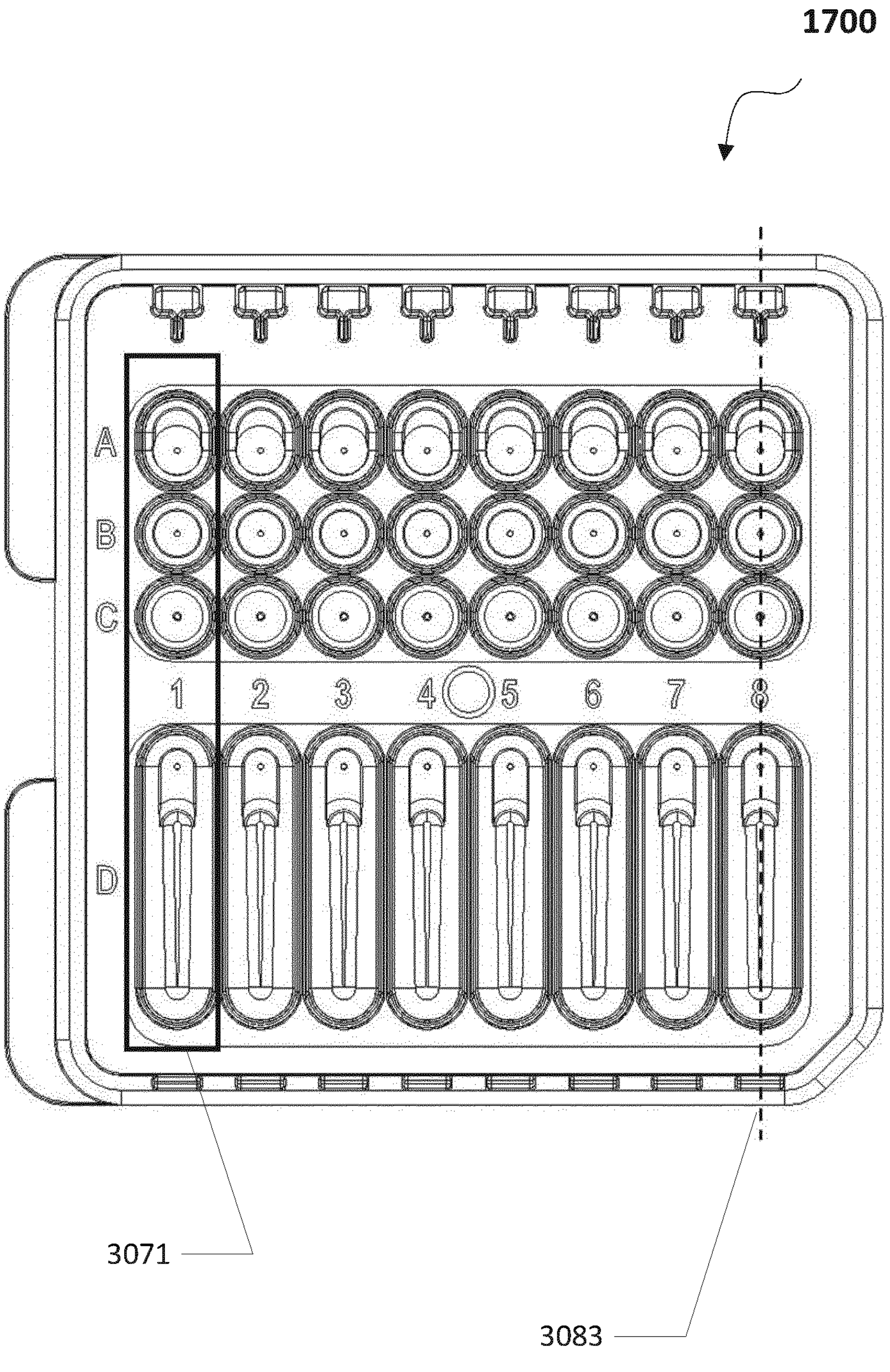

FIG. 33 schematically illustrates a top view of the fourth embodiment.

FIG. 34 schematically illustrates isometric views of a microfluidic device according to a sixth embodiment of the present invention seen from a top side and seen from a bottom side.

Figure 35A:
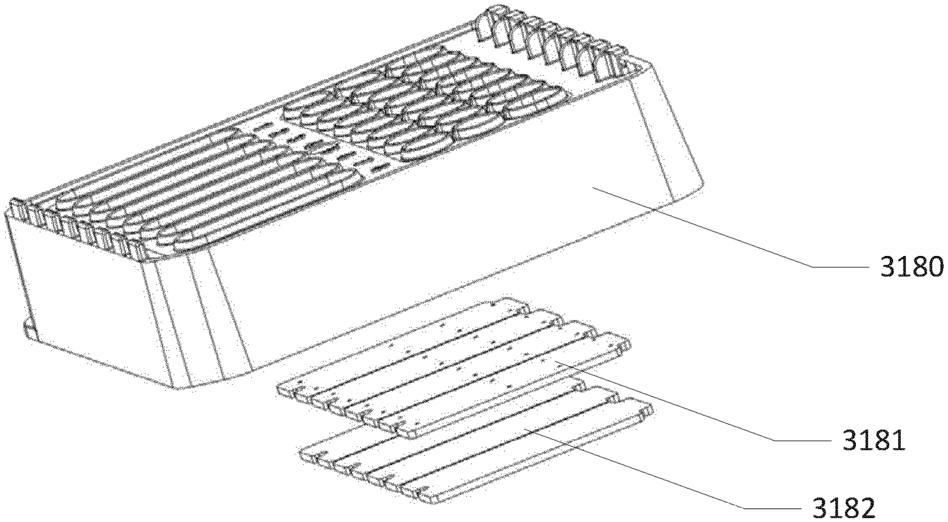
Figure 35B:
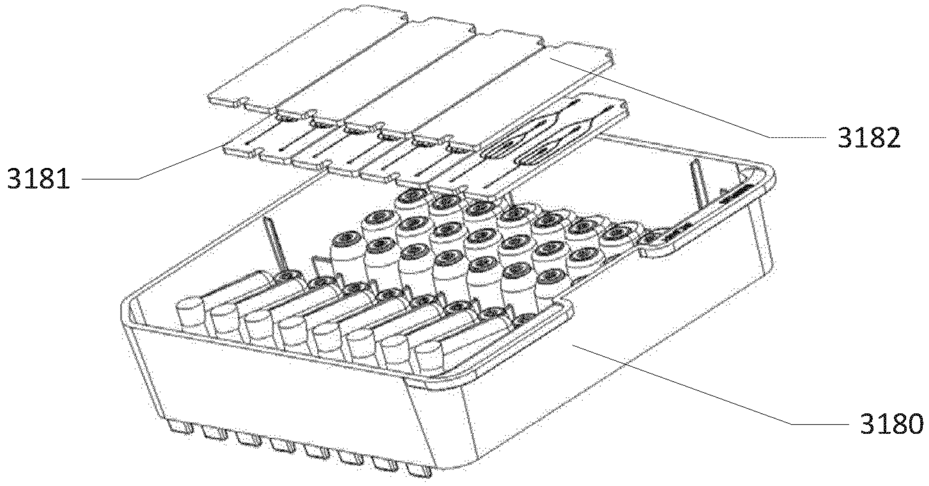

FIGS. 35*a* and 35*b* schematically illustrate a top and a bottom exploded view, respectively, of the sixth embodiment.

Figure 36:
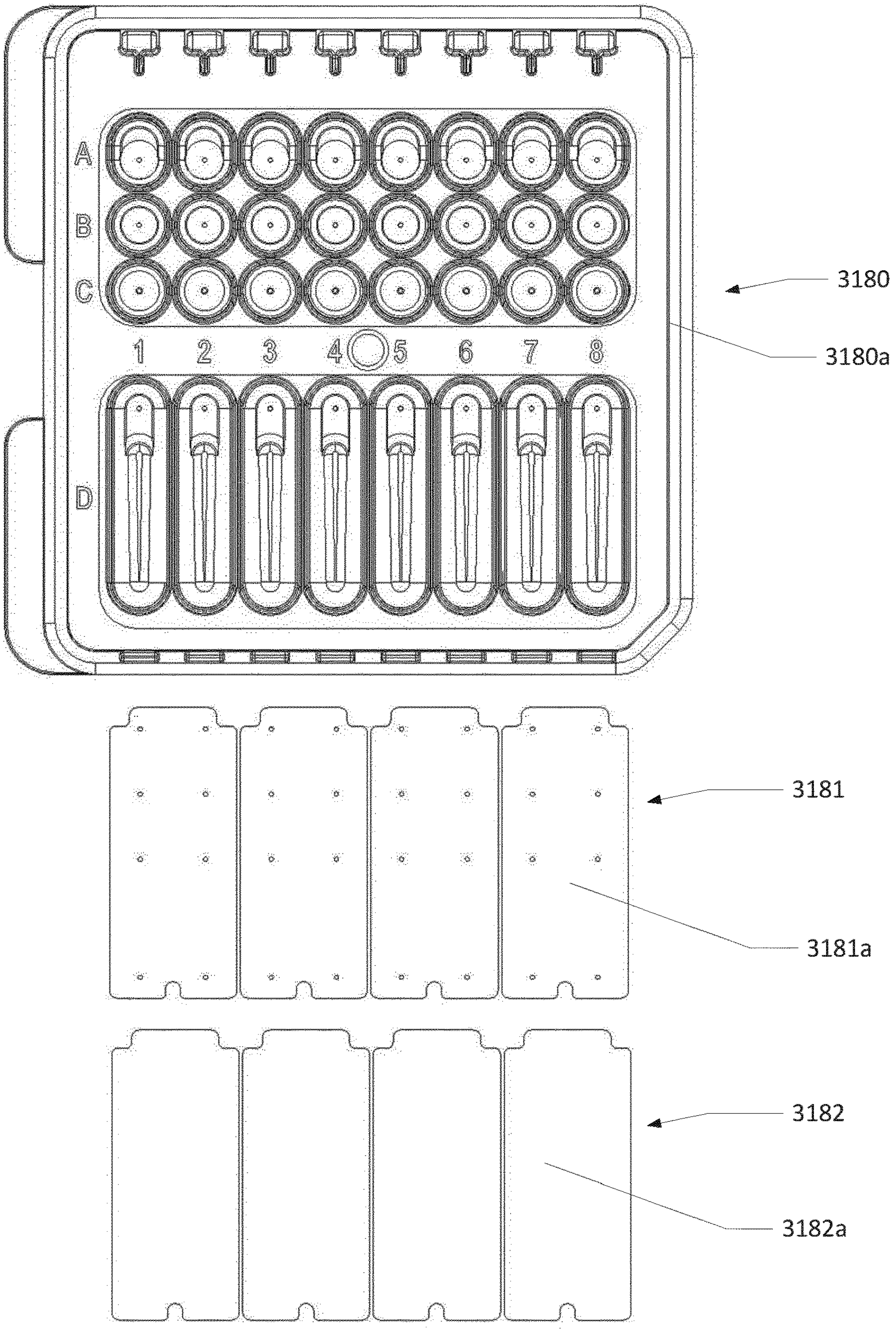

FIG. 36 schematically illustrates a bottom view of the sixth embodiment showing the exploded parts side-by-side.

Figure 37:
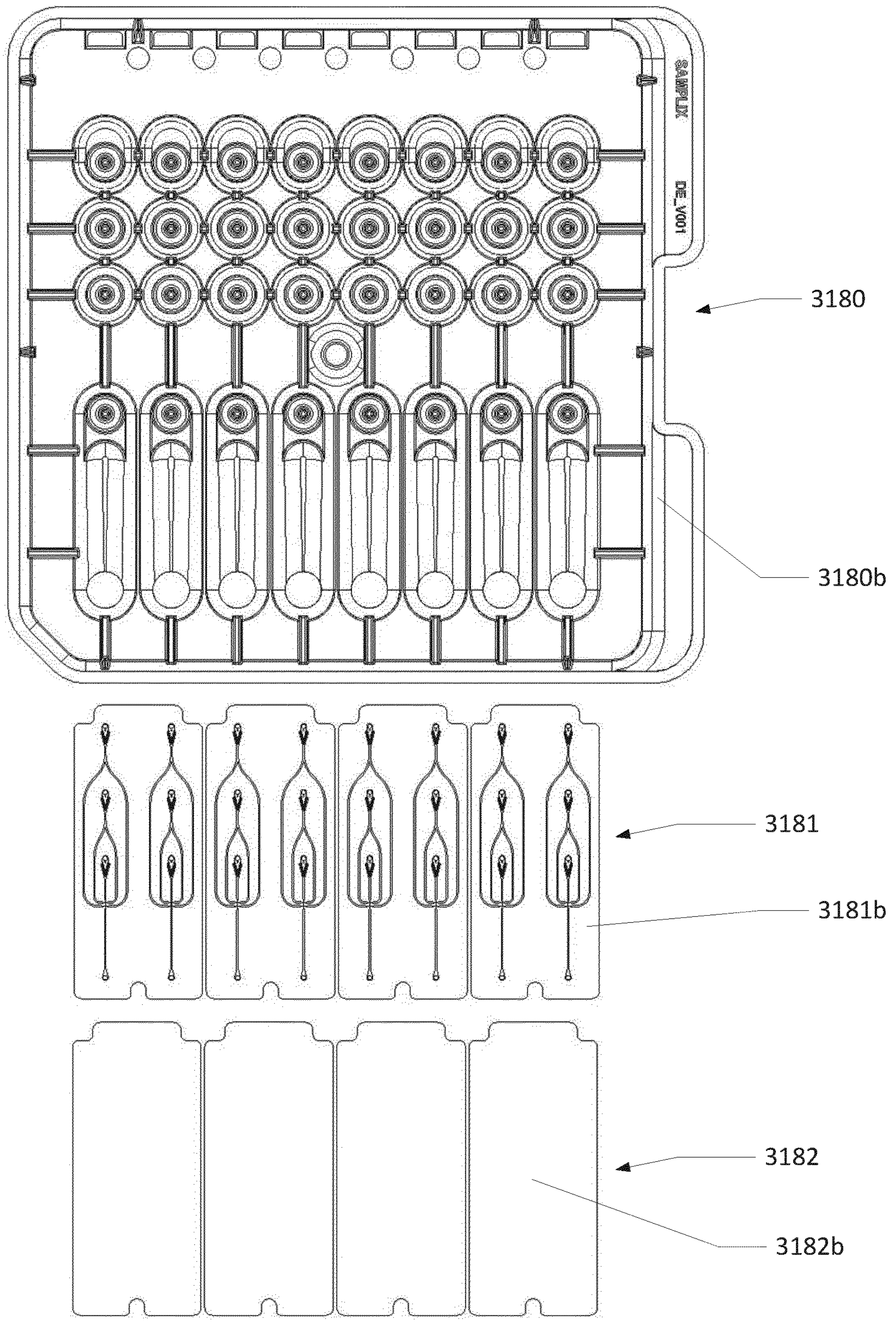

FIG. 37 schematically illustrates a top exploded view of the sixth embodiment showing the exploded parts side-by-side.

Figure 38A:
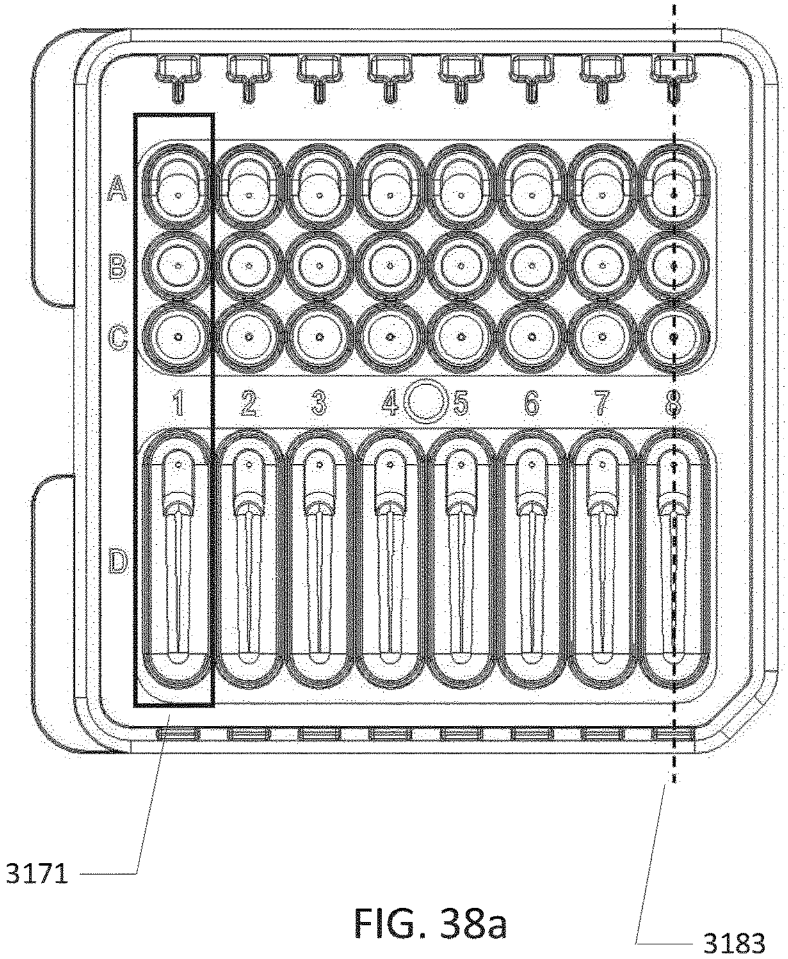

FIG. 38*a* schematically illustrates a top view of the sixth embodiment.

Figure 38B:
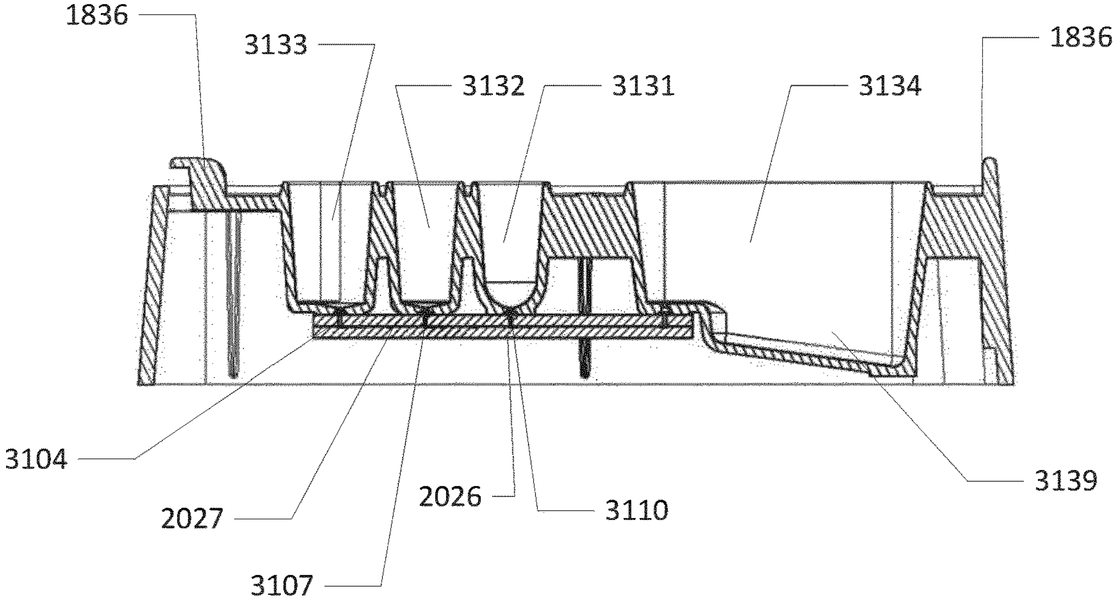

FIG. 38*b* schematically illustrates a cross-sectional view of the sixth embodiment.

Figure 39A:
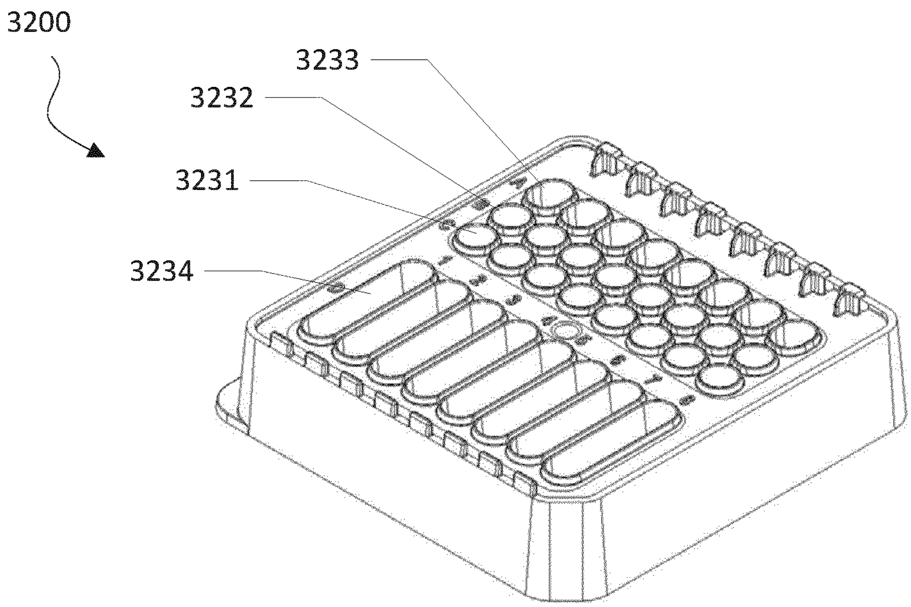

FIG. 39*a* schematically illustrates a top view of a seventh embodiment according to the present invention.

Figure 39B:
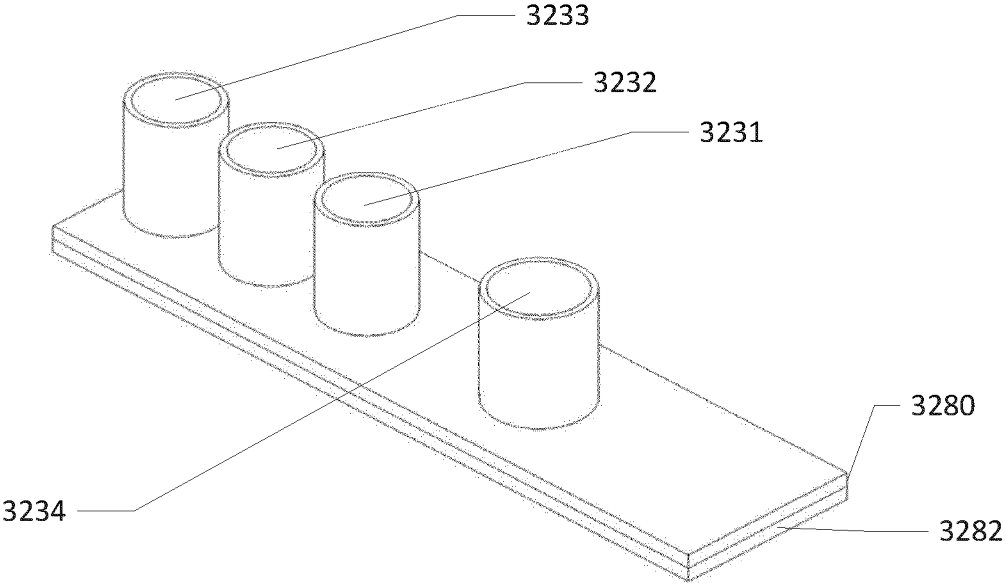

FIG. 39*b* schematically illustrates a simplified view of a sample line of the embodiment of FIG. 39*a*

Figure 40A:
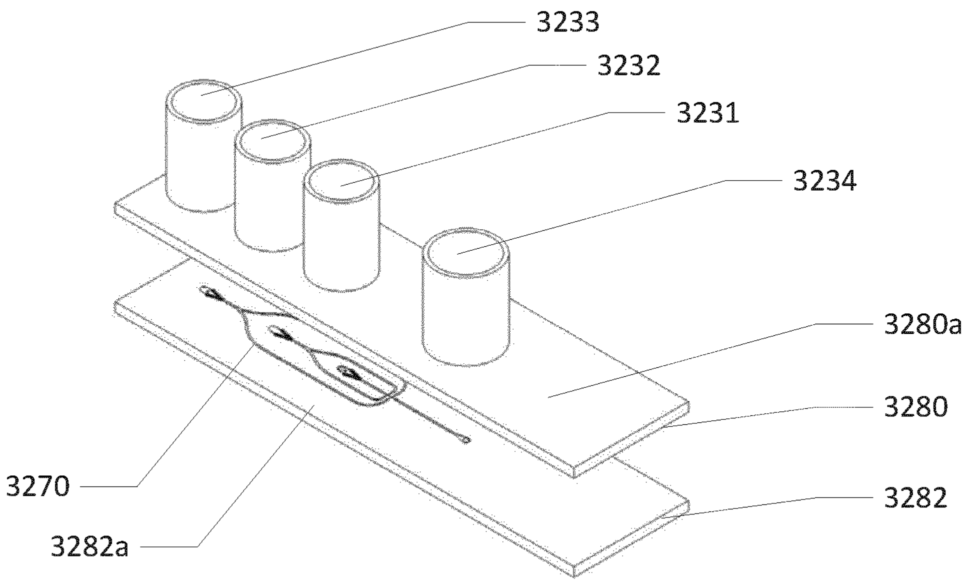
Figure 40B:
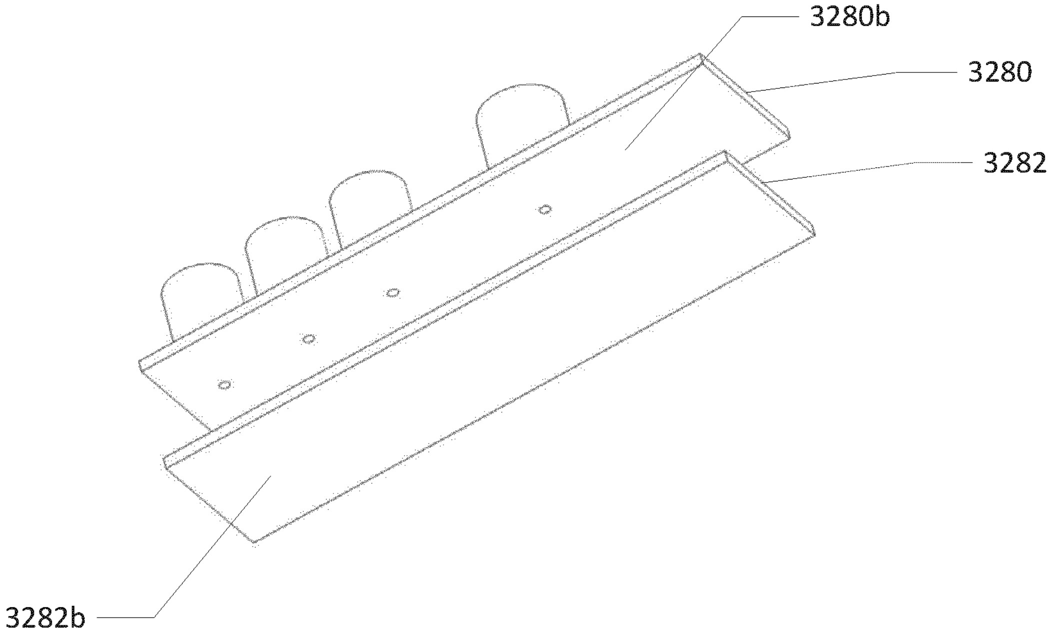

FIGS. 40*a* and 40*b* schematically illustrate exploded views of the sample line of FIG. 39*b*.

Figure 41A:
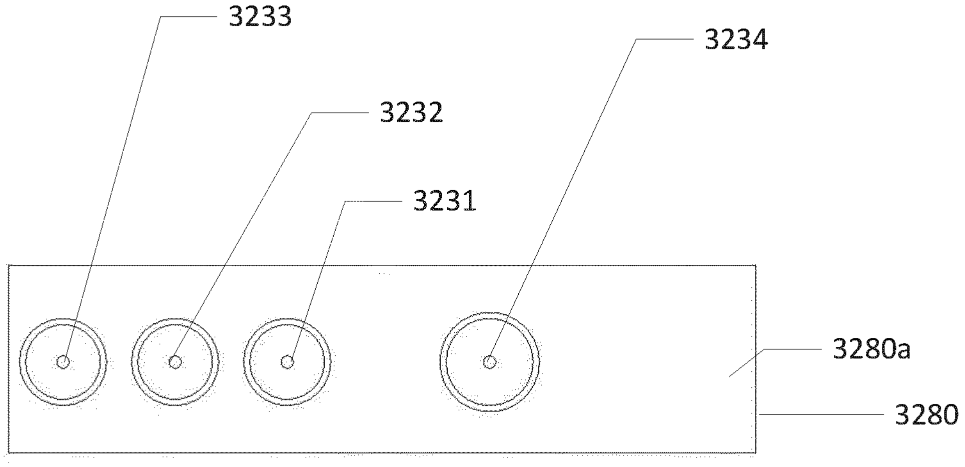
Figure 41B:
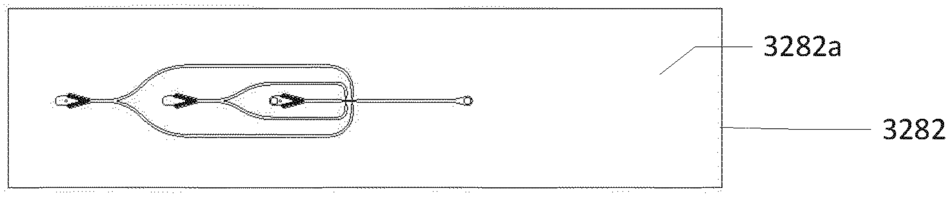

FIGS. 41*a* and 41*b* schematically illustrate top views of the exploded parts of FIGS. 40*a* and 40*b*.

Figure 42A:
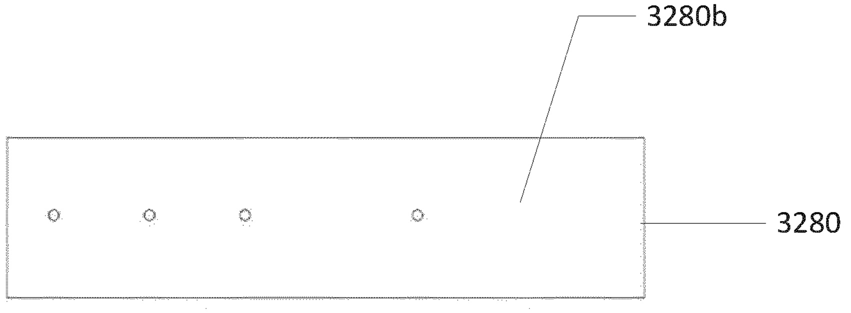
Figure 42B:
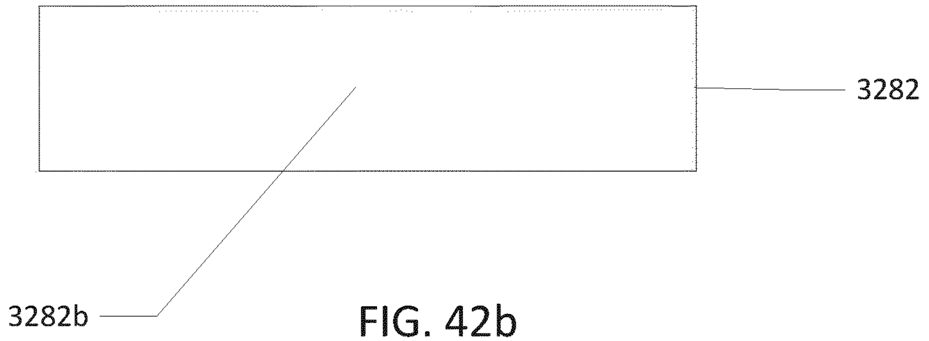

FIGS. 42*a* and 42*b* schematically illustrate bottom views of the exploded parts of FIGS. 40*a* and 40*b*.

Figure 43A:
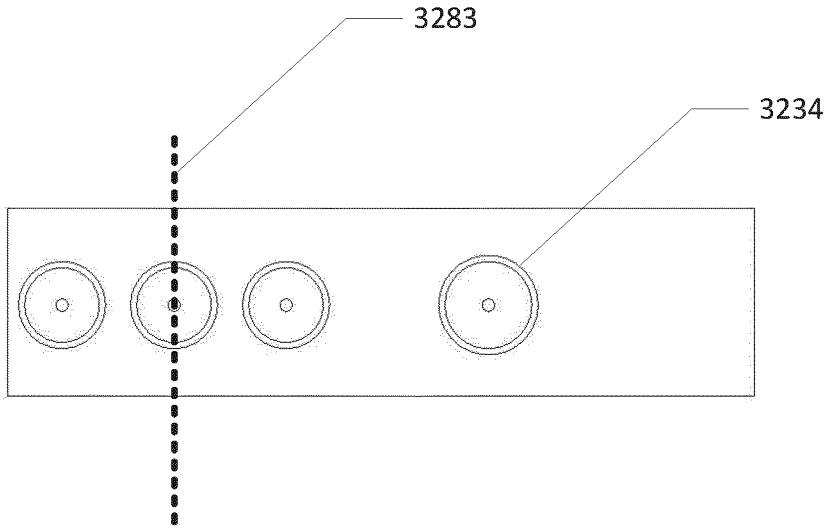

FIG. 43*a* schematically illustrates a top view of the part illustrated in FIG. 39*b*.

Figure 43B:
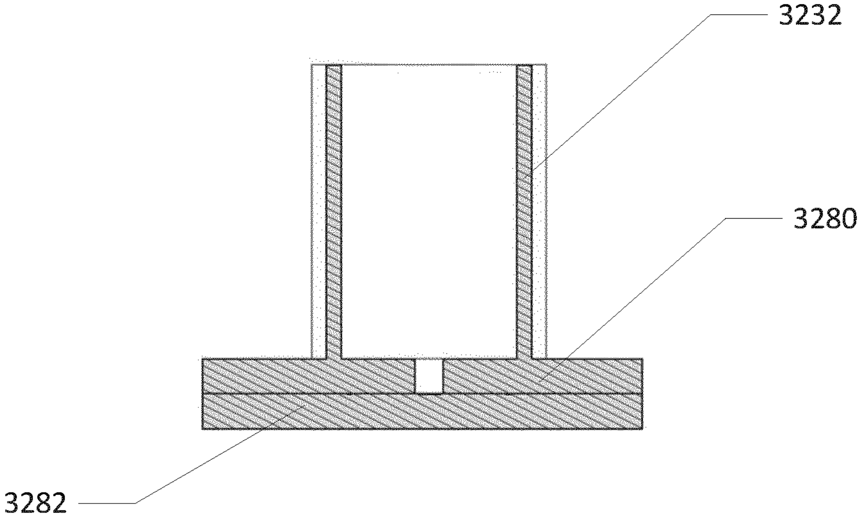

FIG. 43*b* illustrates a cross-sectional side view of the sample line of FIG. 43*a*.

FIGS. 44*a*, 44*b*, 44*c*, 45*a*, 45*b*, 47*a*, 47*b*, 49*a*, and 49*b* schematically illustrate various steps of a method of provision of a microfluidic device according to the present invention.

Figure 46:
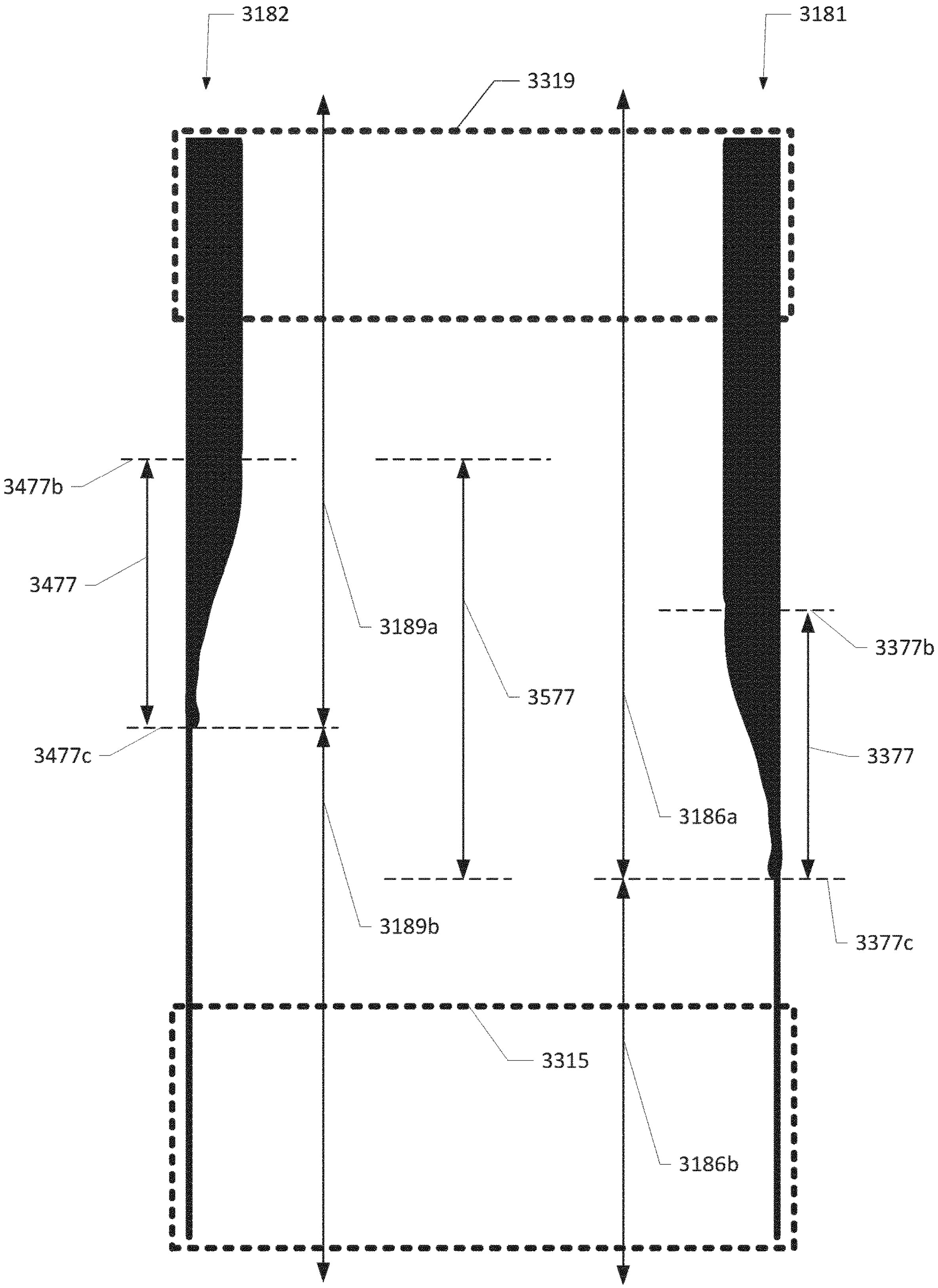

FIG. 46 schematically illustrates a cross-sectional view of an embodiment having unaligned coating at the transition zone.

Figure 48A:
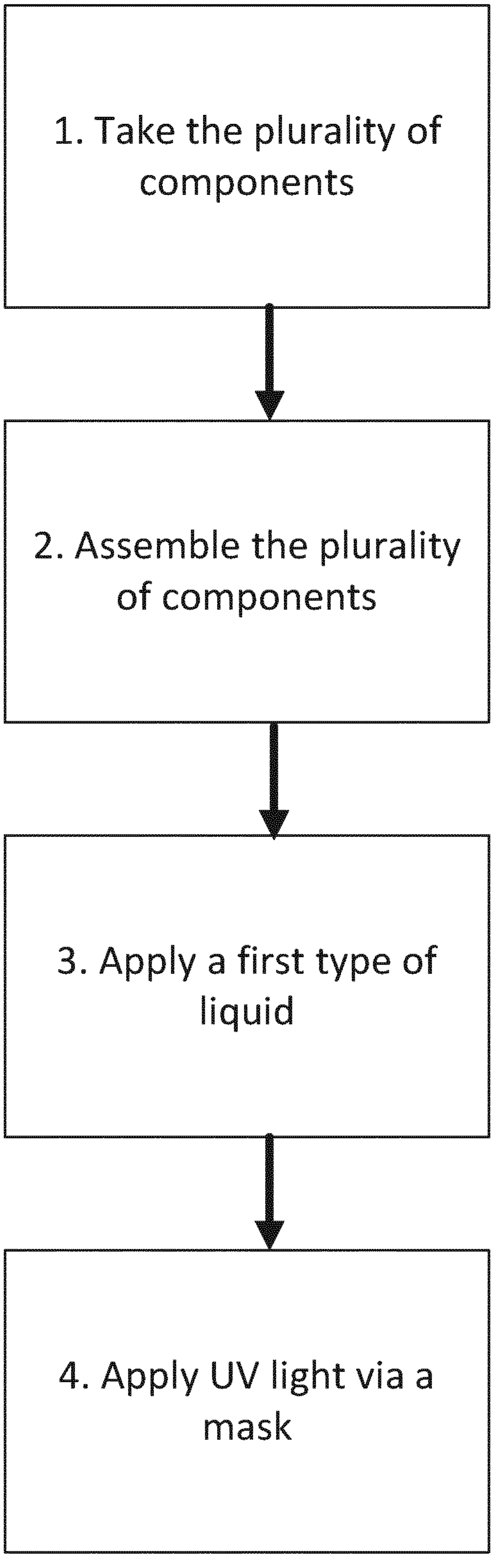
Figure 48B:
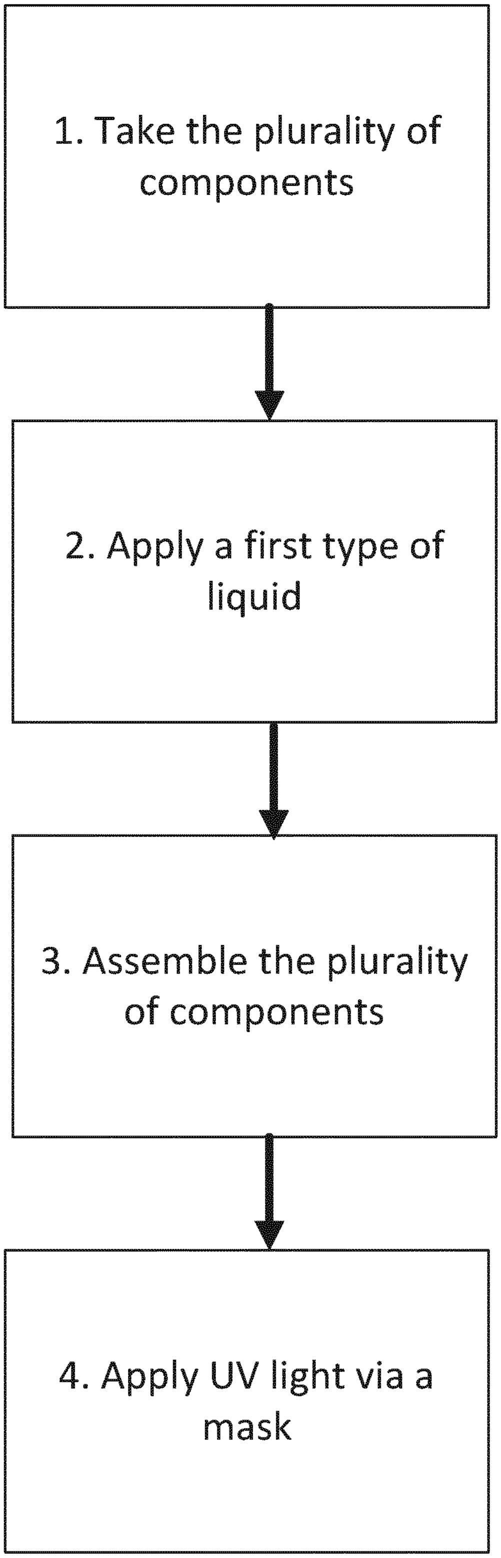

FIGS. 48*a*, 48*b* schematically illustrate respective block diagrams of methods of provision of a device according to the present invention.

Figure 9A:
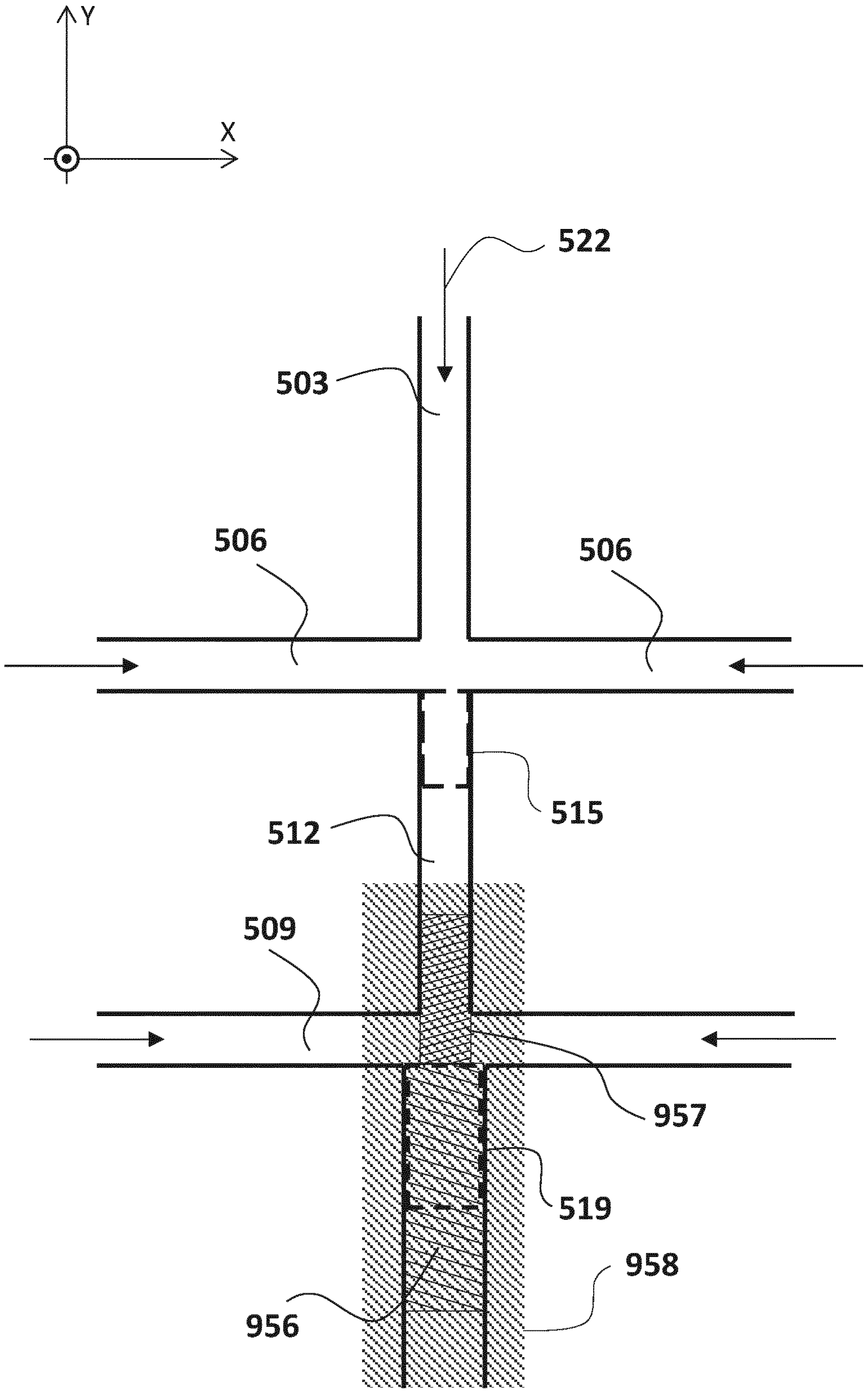
Figure 9B:
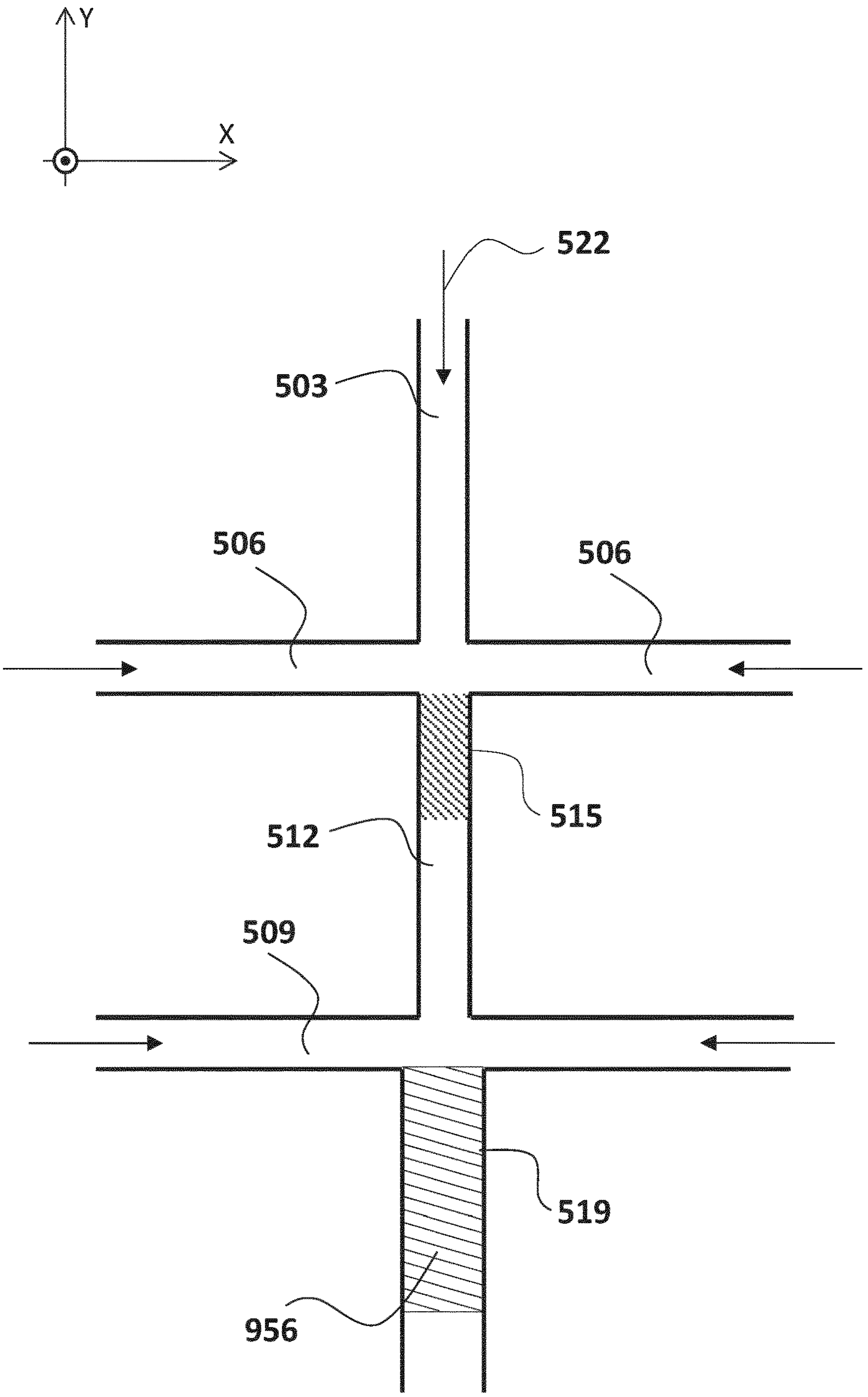
Figure 9C:
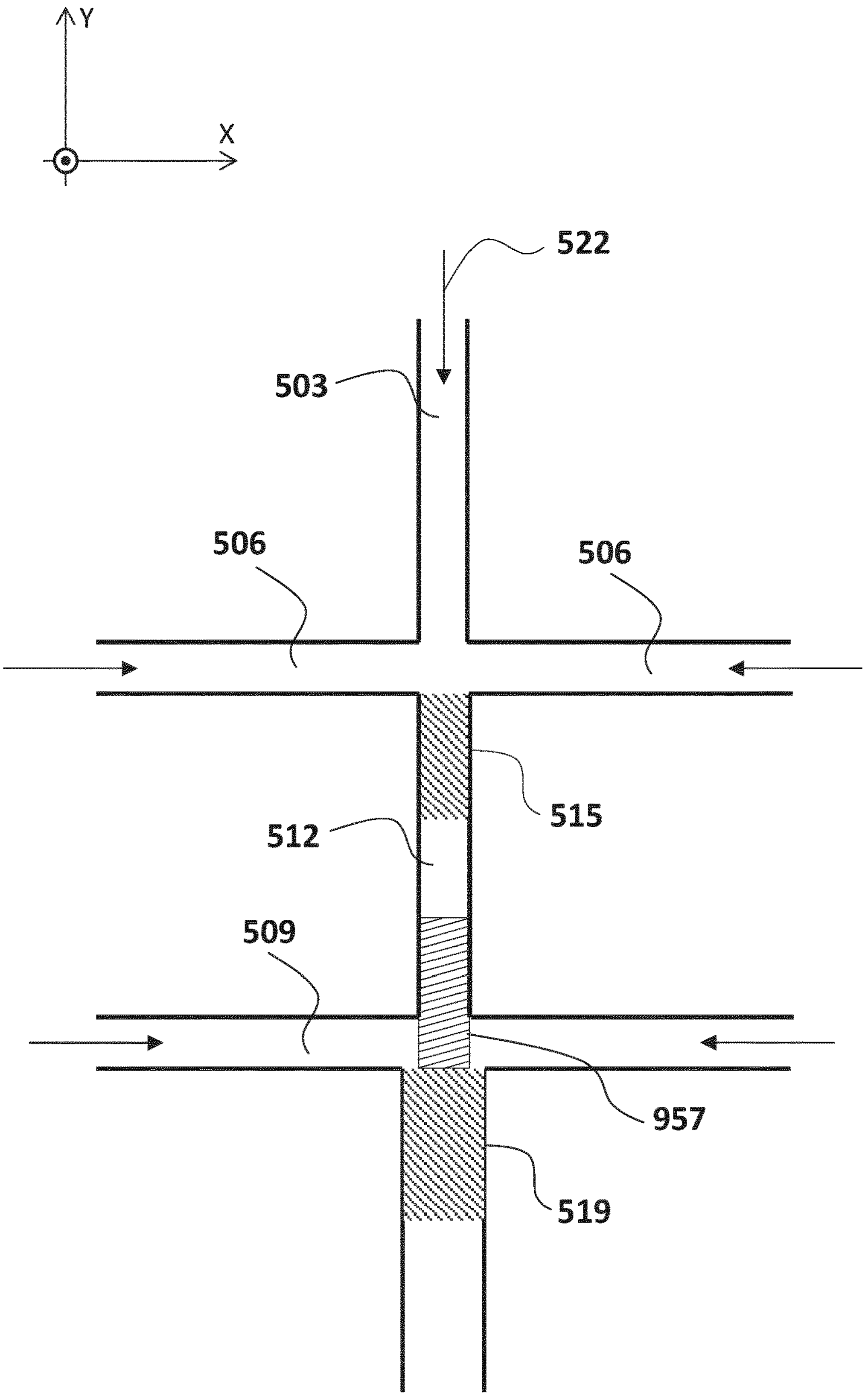
Figure 9D:
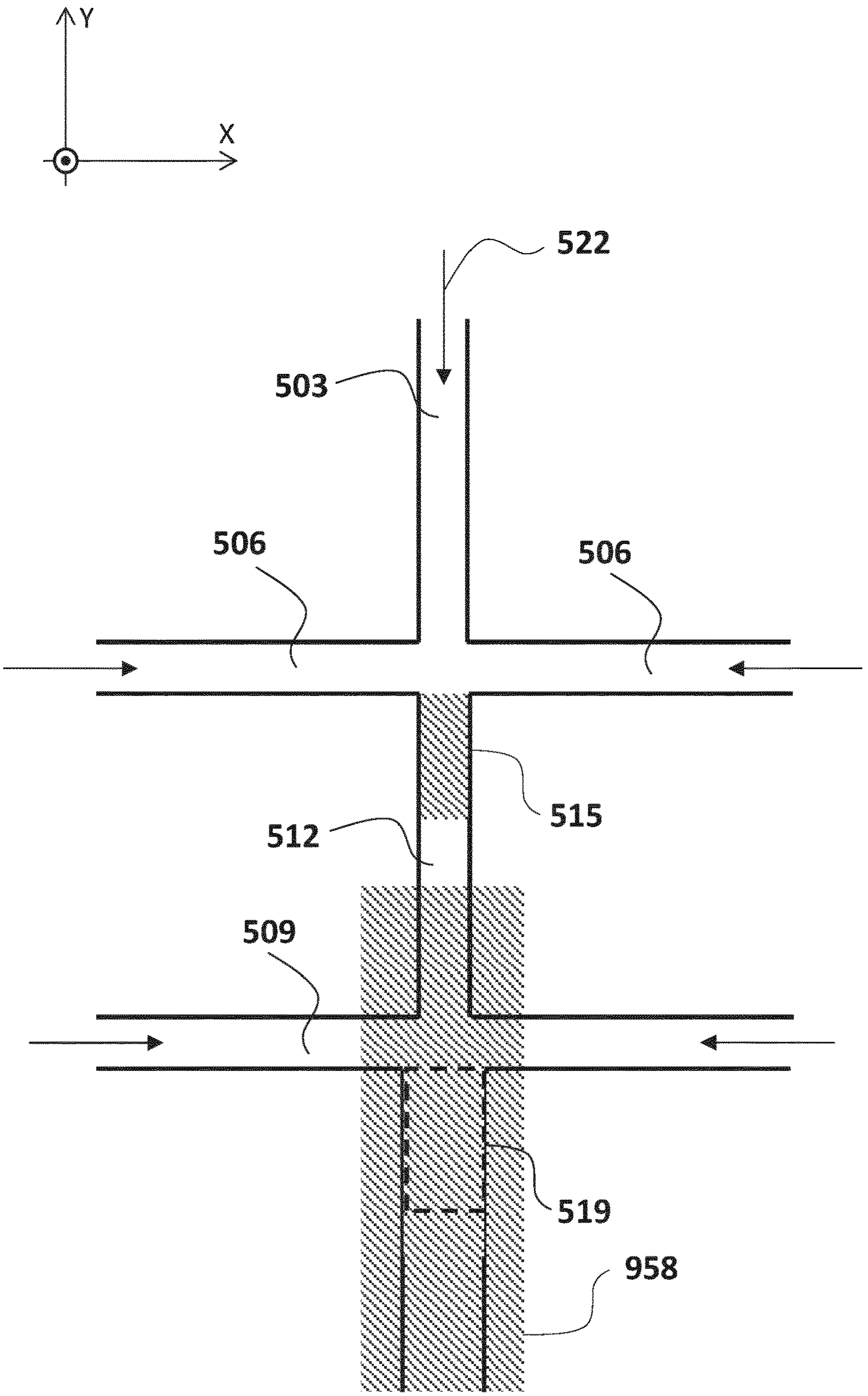
Figure 10A:
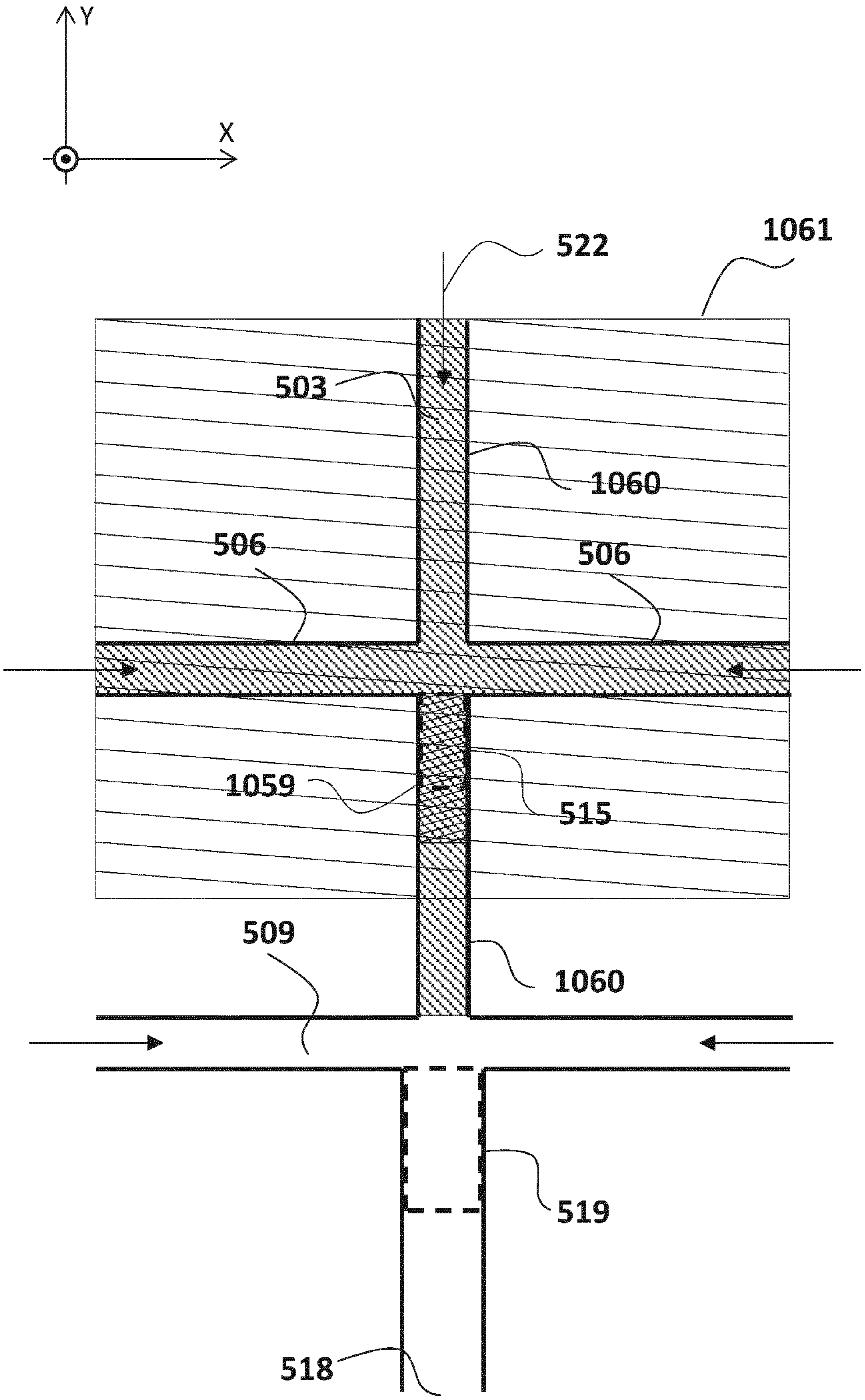
Figure 10B:
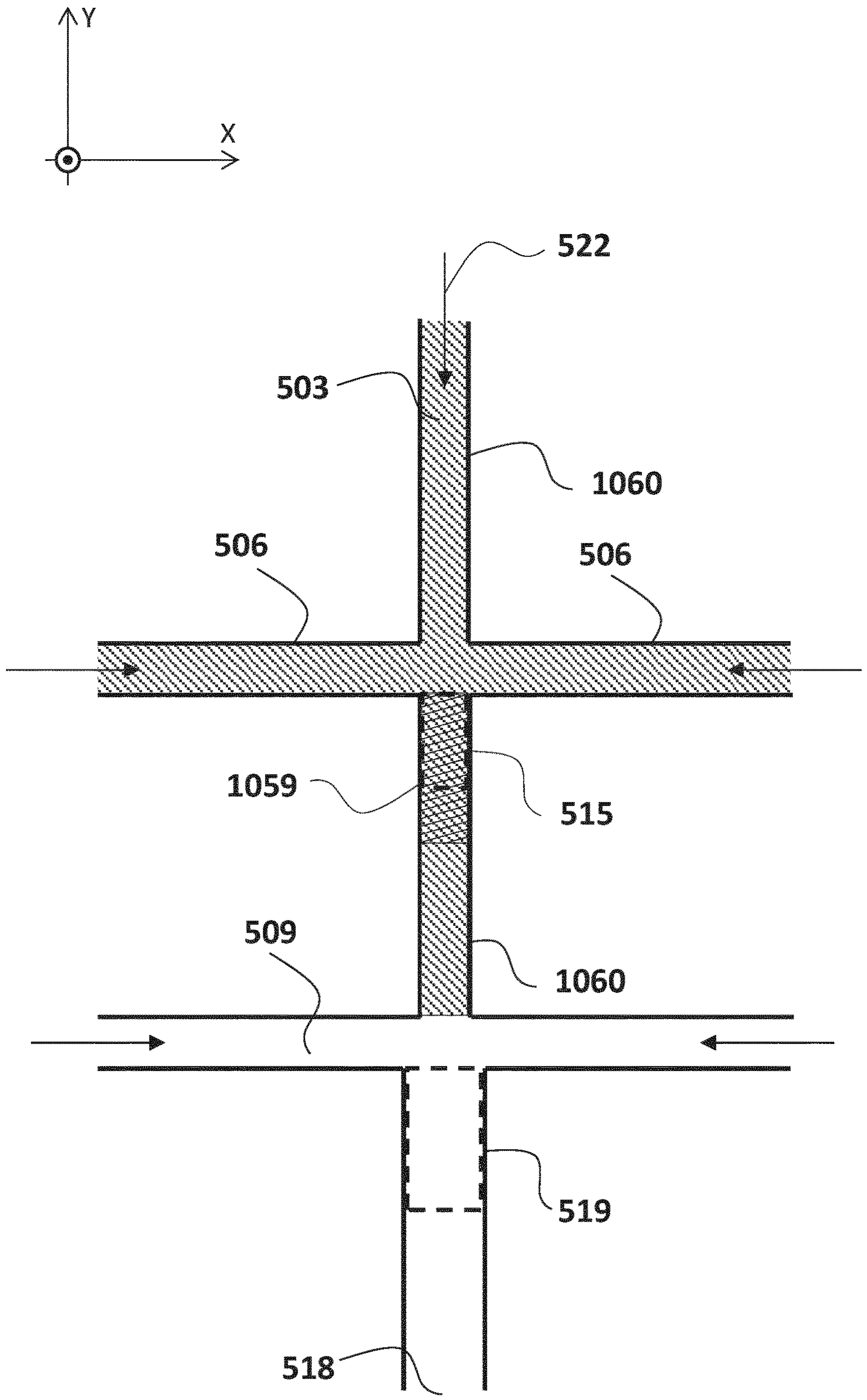
Figure 10C:
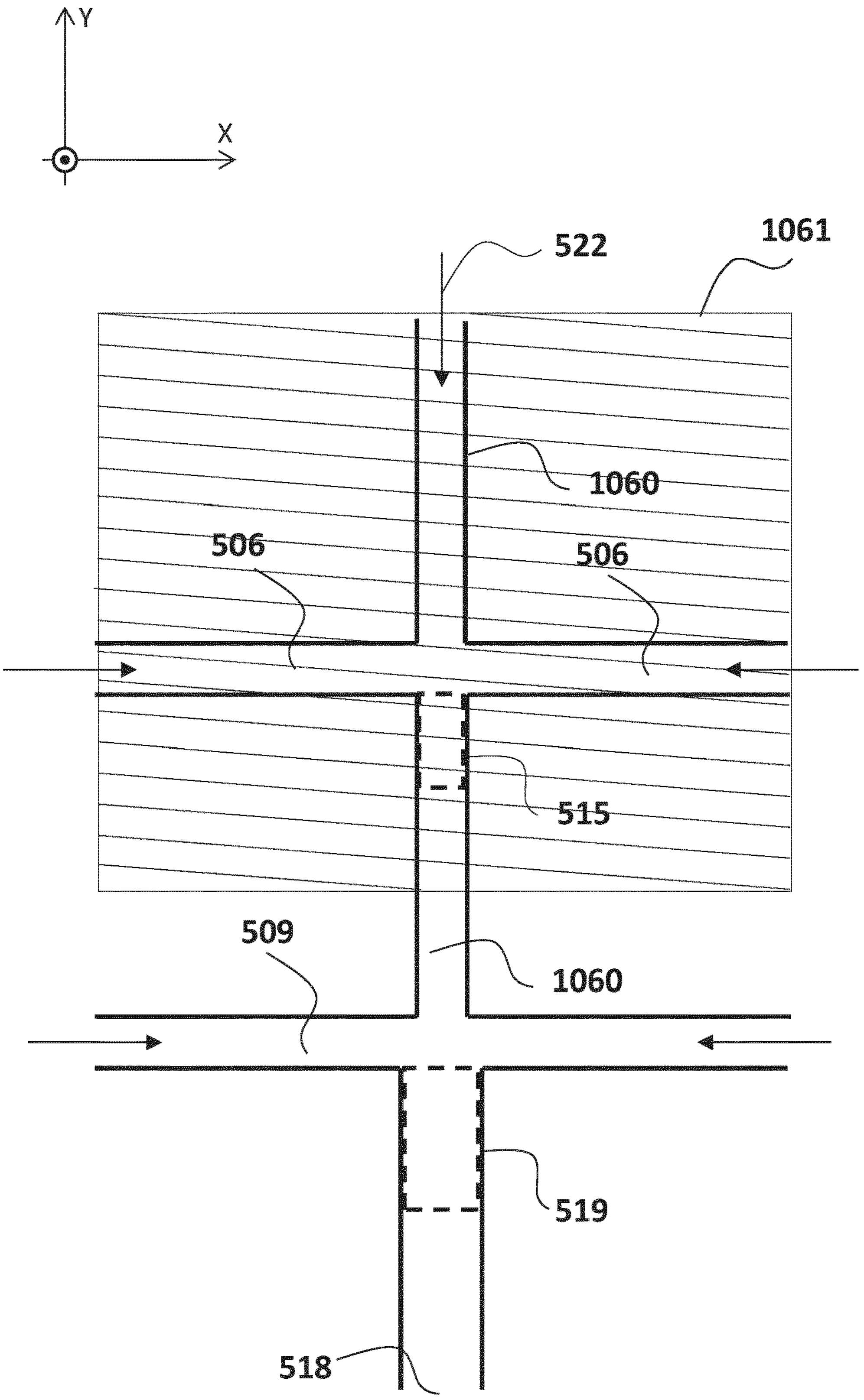
Figure 10D:
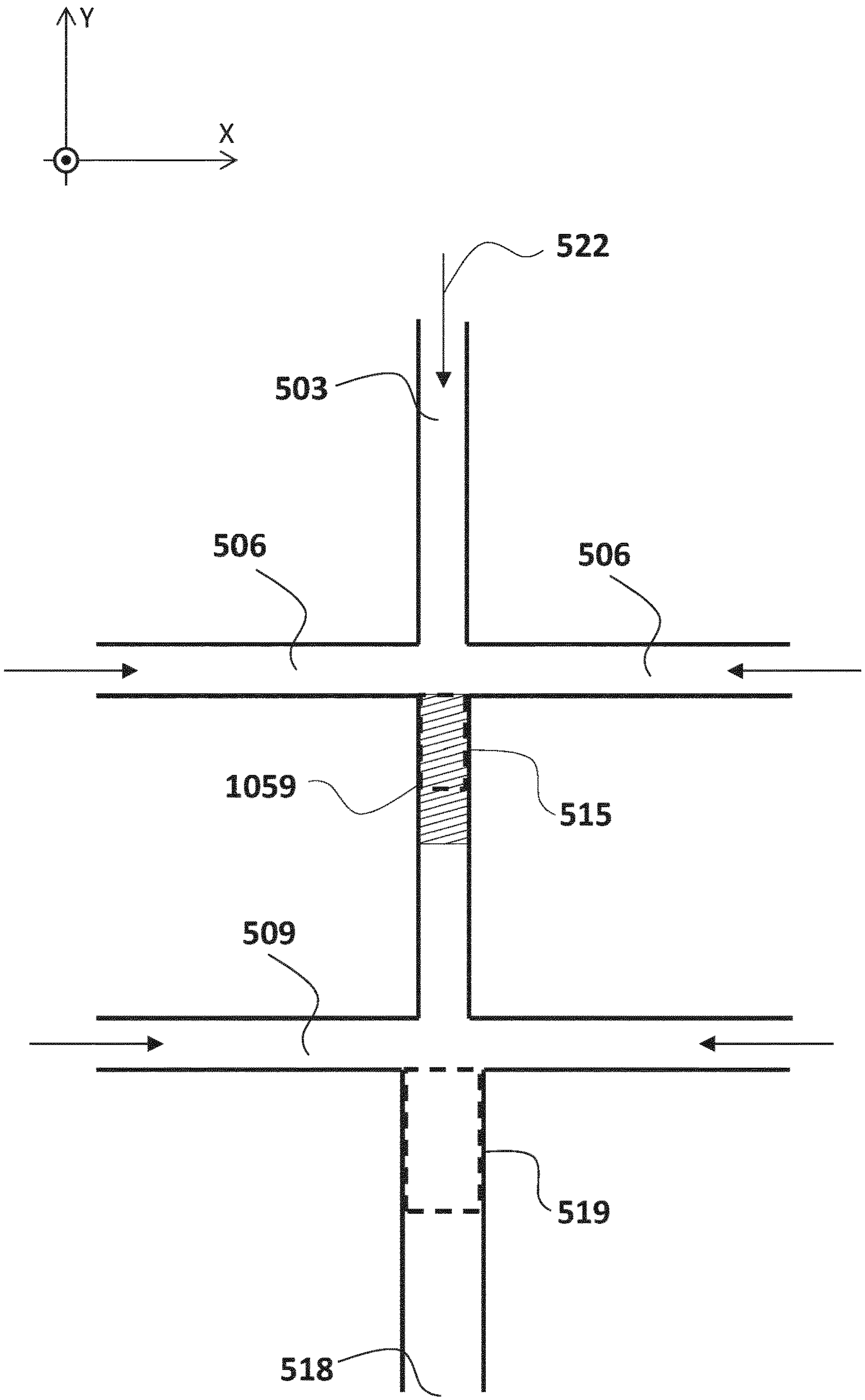
Figure 50A:
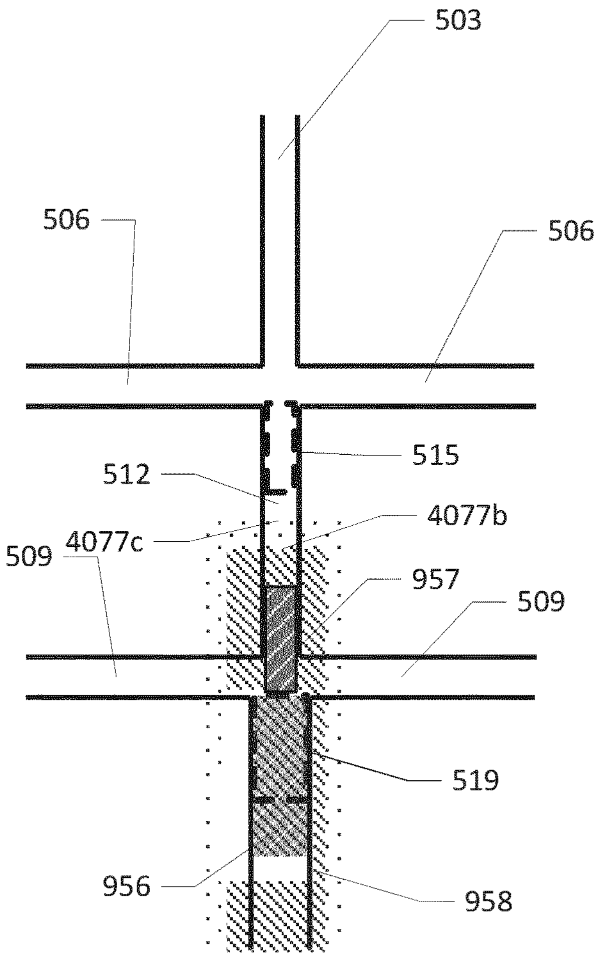
Figure 50B:
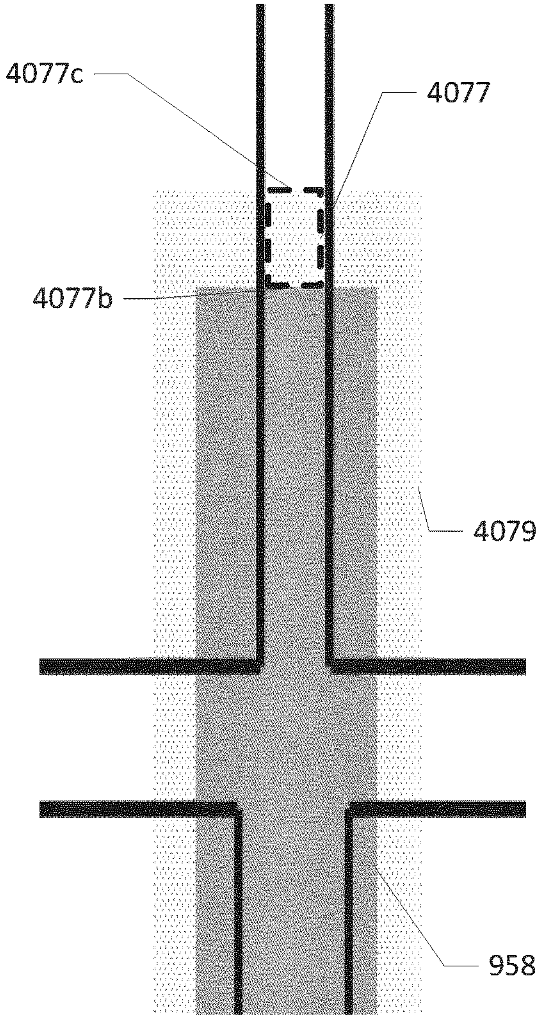

FIGS. 50*a*, 50*b* schematically illustrates the same features as illustrated and disclosed in connection with FIG. 9*a*. Furthermore, FIG. 50 illustrates a transition zone.

Figure 51A:
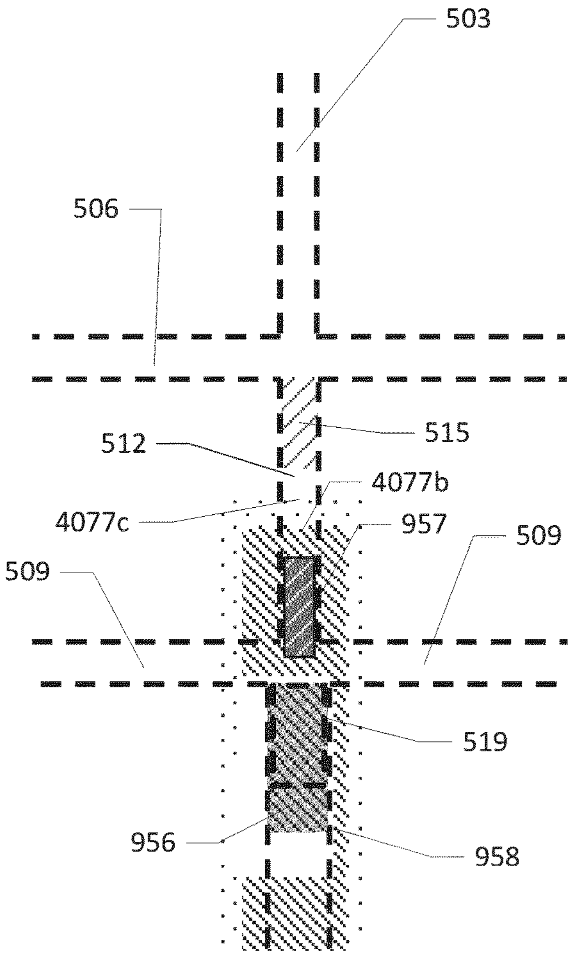
Figure 51B:
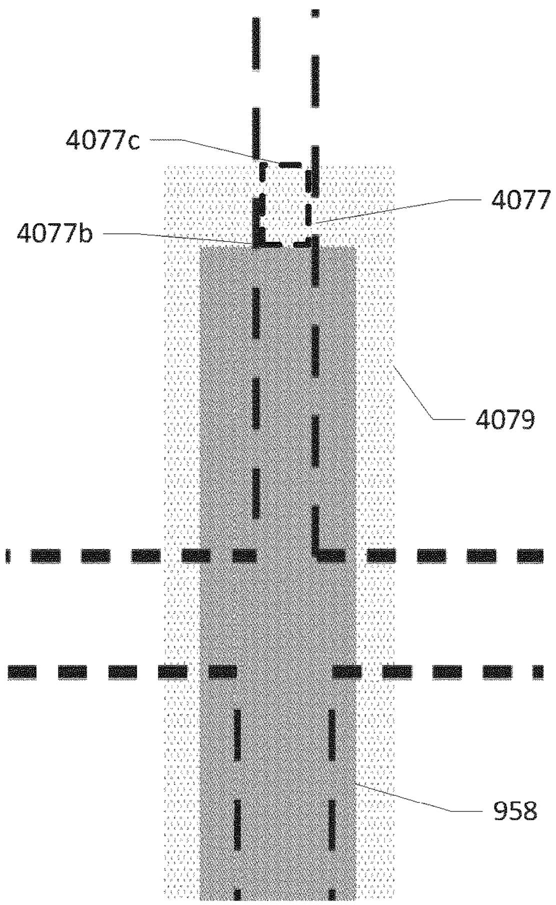

FIGS. 51*a*, 51*b* schematically illustrates coating of a component forming a capping part of another component.

Throughout the present disclosure, the term "droplet" may refer to "double emulsion droplet", may also be denoted "DE droplet", such as provided according to the present invention.

Throughout the present disclosure, the term "example" may refer to an embodiment according to the present invention.

The microfluidic device according to the present invention may be denoted "cartridge" or "microfluidic cartridge". A first part of the microfluidic device, comprising the plurality of microfluidic units, may be denoted "microfluidic section". A second part of the microfluidic device, comprising the plurality of groups of containers, may be denoted "container section". The second part of the microfluidic device may be different from and may not comprise the first part of the microfluidic device. The microfluidic section and/or a microfluidic unit may be denoted "chip", "microchip", or "microfluidic chip".

The base microfluidic piece may be formed in one piece, such as being moulded, for example by injection-moulding. The base microfluidic piece may form part of the microfluidic section. The base microfluidic piece may comprise each microfluidic unit of the microfluidic device.

The base container structure piece may be formed in one piece, such as being moulded, for example by injection-moulding. The base container structure piece may form part of the container section. The base container structure piece may comprise each container of the microfluidic device.

The microfluidic section and the container section may be fixedly connected to each other and/or may form a fixedly connected unit.

Each microfluidic unit may form a fluid connection between the individual containers of the corresponding group of containers. A group of containers and a microfluidic unit may be denoted "corresponding" if fluid connection is provided between them. Each group of containers of the plurality of group of containers may form part of a functional unit in combination with the respective corresponding microfluidic unit of the plurality of microfluidic units. Such functional unit may be denoted "droplet generating unit" and/or "sample line". The sample lines may be isolated from each other such that any sharing of liquids is prevented.

Provision of a plurality of sample lines may facilitate individual and/or parallel processing of several samples.

The microfluidic device may be intended for single use, i.e. each sample line may be intended to be used only once. This may provide a low risk of contamination of results.

The term "microfluidic" may imply that at least a part of the respective device/unit comprises one or more fluid conduits being in the microscale, such as having at least one dimension, such as width and/or height, being smaller than 1 mm and/or a cross-sectional area smaller than 1 $mm^2$. The smallest dimension, such as a height or a width, of at least one part of the fluid conduit network, such as a conduit, an opening, or a junction, may be less than 500 μm, such as less than 200 μm, for example less than 20 μm.

The term "microfluidic" may imply that the volume of the respective part is relative small. The volume of each fluid conduit network may be between 0.05 μL and 2 μL, such as between 0.1 μL and 1 μL, such as between 0.2 μL and 0.6 μL, such as around 0.3 μL.

The behaviour of fluids at the microscale, such as may be provided by the fluid conduit network of the device of the present invention, may differ from "microfluidic" behaviour in that: factors, such as surface tension, energy dissipation, and/or fluidic resistance, may start to dominate the system. At small scales, such as when a conduit according to the present invention, such as the transfer conduit, has a diameter, height, and/or width of around 100 nm to 500 μm, the Reynolds number may become very low. A key consequence hereof may be that co-flowing fluids do not necessarily mix in the traditional sense, as flow may become laminar rather than turbulent. Consequently, when two immiscible fluids, e.g. the first fluid, such as an aqueous phase, and e.g. the second fluid, such as an oil phase which may comprise a fluorinated oil, meet at a junction, parallel laminar flows may result, which again may result in stable production of monodisperse droplets. At a larger scale, the immiscible liquids may mix at the junction, which may result in polydisperse droplets.

The microfluidic device according to the present invention is preferably configured for generation or provision of double emulsion droplets. Double emulsion droplets may refer to droplets wherein an inner, dispersed phase is surrounded by an immiscible phase which again is surrounded by a continuous phase. The inner dispersed phase may comprise and/or consist of one droplet. The inner phase may be an aqueous phase in which salts, nucleotides, and enzymes may be or is dissolved. The immiscible phase may be an oil phase. The continuous phase may be an aqueous phase.

The microfluidic device according to the present invention may be configured for triple emulsions, quadruple emulsions, or a higher number of emulsions.

The microfluidic device preferably comprises an upper side and a lower side. The upper side may be configured for accessing each container, e.g. by means of a pipette.

The plurality of microfluidic units may comprise and/or consist of eight microfluidic units. An advantage of provision of exactly eight units may be facilitation of use of state of the art equipment, such as an 8-channel pipette.

A lower part and/or an upper part of each microfluidic unit may be provided by the base microfluidic piece.

The fluid conduit network may form a network of conduits that intersect at junctions, comprising the first fluid junction and the second fluid junction.

Any one or more conduits of the fluid conduit network may comprise one or more parts, such as channels, having substantially uniform cross-sectional area for example by a substantially uniform diameter.

The fluid conduit network may comprise conduits having a varying diameter. Parts of the fluid conduit network having a relative large diameter may provide transport of liquid at a relative low resistance resulting in higher volumetric flow. Parts of the fluid conduit network having a relative small diameter may enable provision of a desired size of the generated droplets.

A cross sectional area of a part of the fluid conduit network, such as of a conduit thereof, may refer to the area of a cross section defined perpendicular to the one or more walls of e.g. the respective conduit or at least one wall part of e.g. the respective conduit.

The fluid conduit network may comprise conduits having a varying cross-sectional area. Parts of the fluid conduit network having a relative large cross-sectional area may provide transport of liquid at a relative low resistance resulting in higher volumetric flow e.g. at application of different pressure at opposing ends of a conduit. Parts of the fluid conduit network having a relative small cross-sectional area may enable provision of a desired size of the generated droplets.

The first transfer conduit part preferably possesses a cross-sectional area of 150-300 $\mu m^2$ and the first collection conduit part preferably possesses a cross-sectional area of 200-400 $\mu m^2$. This may facilitate that the droplets generated have a diameter of the inner droplet of 10 to 25 μm and an outer total diameter of the inner droplet plus shell layer of 18 to 30 μm.

The fluid conduit network may comprise nozzles and/or chambers. A nozzle may comprise a constriction in a conduit of smaller cross-sectional area than the conduit on both sides of the nozzle. A nozzle may facilitate production of a smaller size droplet than what otherwise could be expected from the conduit cross-sectional area. This may in turn enable use of conduits having larger cross-sectional area with lower resistance. A chamber may be an area within the microfluidic unit designed to hold a volume of liquid to delay the liquid or to temporarily store liquid within the microfluidic unit. Such a chamber may be an advantage as it may delay liquid from one or more conduits relative to other conduits which may ensure the correct timing of liquids at the respective junctions.

A supply conduit of a microfluidic unit may refer to any one, more, or all of the following: the primary supply conduit, the secondary supply conduit, and the tertiary supply conduit.

A supply inlet of a microfluidic unit may refer to any one, more, or all of the following: the primary supply inlet, the secondary supply inlet, and the tertiary supply inlet.

A supply opening of a microfluidic unit may refer to any one, more, or all of the following: the primary supply opening, the secondary supply opening, and the tertiary supply opening.

A conduit of a microfluidic unit may refer to any one, more, or all of the following: the transfer conduit, the collection conduit, the primary supply conduit, the secondary supply conduit, and the tertiary supply conduit.

An opening of a conduit of a microfluidic unit may refer to any one, more, or all of the following: the first transfer opening, the second transfer opening, the collection opening, the primary supply opening, the secondary supply opening, and the tertiary supply opening.

An opening of a conduit may be defined as the narrowest part of the respective conduit provided at a junction. The opening may be positioned close to the junction such as within 1 mm of the junction and may be narrower or have essentially the same cross-sectional area as the conduit leading into or out of the junction. The opening may be followed by a widening into the junction or have essentially the same cross-sectional area as the junction. An opening may comprise one or more holes or slits.

The first fluid junction and/or the second fluid junction may be defined by a plurality of openings of conduits, which conduits may be considered to intersect or meet each other.

Each of the first and second fluid junctions may comprise a plurality of openings for leading fluid into the junction and one opening for leading fluid out of the junction.

Each of the first and second fluid junction preferably enables immiscible fluids from two or more conduits to come into direct fluid contact and interact. Accordingly, a stream of alternating liquid portions or plugs or droplets may be produced, formed or provided. While within a relative narrow conduit, a droplet may be oblong and may be considered to be a plug.

Formation of droplets or plugs comprising double emulsion droplets or plugs may be initiated starting from the second fluid junction and may be completed within or after the junction in the direction of the fluid exiting the junction, i.e. along the collection conduit.

The first transfer conduit part may be a part of the transfer conduit where droplets or plugs formed from a first liquid being immiscible with a second liquid. The first transfer conduit part may have a first affinity for water that enables formation and/or durability of droplets in the first transfer conduit part. This first affinity for water may correspond to hydrophobic properties allowing formation of water droplets or plugs in oil such as fluorocarbon oil.

Affinity for water may be known as wettability for water. A high affinity for water may refer to high wettability for water. A low affinity for water or lack of affinity for water may refer to a low wettability for water.

The first collection conduit part preferably forms part of the collection conduit where an emulsion comprising double emulsion droplets or plugs is formed. The first collection conduit part may have a second affinity for water that enables formation and/or sustainability of double emulsion droplets in the first collection conduit part. This second affinity for water may correspond to hydrophilic properties allowing formation of aqueous droplets or plugs surrounded by an oil shell in a continuous aqueous phase.

The secondary supply conduit may comprise a second secondary supply conduit. Such second secondary supply conduit may be extending from the secondary supply inlet to a second secondary supply opening. The first plurality of openings of the first fluid junction may comprise the second secondary supply opening. Provision hereof may improve generation of droplets by pinching from more than one side at the first junction. Accordingly, pinching of the second fluid onto the first fluid may be carried out from the first fluid junction by means of the combination of the first secondary supply conduit and the second secondary supply conduit, which both may extend between the secondary supply container and the first supply conduit.

Any parts involved in providing pinching, such as the first secondary supply conduit and the second secondary supply conduit, may be configured to have the same fluid resistance for the respective fluid, e.g. the second fluid. This may be to facilitate uniform effect within and after the respective fluid junction. Any pinching parts may be configured to have the same cross-sectional area and/or volume to facilitate that the respective fluid, e.g. the second fluid, will arrive to the respective fluid junction, e.g. the first fluid junction, at the same time. Accordingly, pinching of the third fluid onto the mixture of the first fluid and the second fluid may be carried out from the second fluid junction by means of the combination of the first tertiary supply conduit and the second tertiary supply conduit, which both may extend between the tertiary supply container and the second supply conduit.

The tertiary supply conduit may comprise a second tertiary supply conduit. Such second tertiary supply conduit may be extending from the tertiary supply inlet to a second tertiary supply opening. The second plurality of openings of the second fluid junction may comprise the second tertiary supply opening. Provision hereof may improve generation of droplets by pinching from more than one side at the second junction.

The first transfer conduit part preferably extends to the second transfer opening. Alternatively, the transfer conduit may comprise a second transfer conduit part, e.g. extending from a second end of the first transfer conduit part, which second end may be opposite of the first transfer opening, and e.g. extending to the second transfer opening. Such second transfer conduit part may have an affinity for water being different from the first affinity for water.

For one or more embodiments, a part of the transfer conduit and/or a part of the collection conduit may have further supplies of fluid.

The first collection conduit part may be extending to the collection outlet.

The first transfer conduit part may refer to a first zone immediately following the first fluid junction along the intended direction of the fluid flow where formation of aqueous droplets in oil carrier fluid may occur.

The first collection conduit part may refer to a second zone immediately following the second fluid junction in the intended direction of the fluid flow where formation of double emulsion aqueous droplets surrounded by an oil shell in an aqueous carrier fluid may occur.

Formation of single emulsions of the first fluid emulsified in the second fluid may be initiated at first junction and may be continued within the first transfer conduit part. Accordingly, after the first transfer conduit part, the first fluid may be in the dispersion phase, whereas the second fluid is in the continuous phase. Formation of double emulsions may be initiated at second junction and may be continued within first collection conduit part. Accordingly, after the first collection conduit part, the third fluid forms a continuous carrier phase which emulsifies the second fluid. The second fluid may form a shell layer around the first fluid.

The first affinity for water may be defined as having a lack of affinity for water, i.e. such as being hydrophobic. The first affinity for water may describe a surface having a contact angle for water of more than 60°, such as more than 65°, such as more than 70°, such as more than 90°. A higher contact angle may provide a more stable provision of droplets, i.e. such as single emulsion water-in-oil droplets. This in turn may enable a wider range of pressures to be utilized and/or a higher percentage of double emulsion droplets provided according to desired dimensions.

A contact angle may be measured on a surface as described in Yuan Y., Lee T. R. (2013) Contact Angle and Wetting Properties. In: Bracco G., Hoist B. (eds) Surface Science Techniques. Springer Series in Surface Sciences, vol 51. Springer, Berlin, Heidelberg. A contact angle within a closed volume, such as a conduit, may be measured as described in Tan, Say Hwa et al. Oxygen Plasma Treatment for Reducing Hydrophobicity of a Sealed Polydimethylsiloxane Microchannel. Biomicrofluidics 4.3 (2010): 032204. PMC.

The second affinity for water may be defined as having a strong affinity for water, i.e. such as being hydrophilic. The second affinity for water may describe a surface having a contact angle of less than 60°, such as less than 55°, such as less than 50°, such as less than 40°, such as less than 30°. A lower contact angle may provide a more stable provision of double emulsion droplets, i.e. e.g. water-in-oil-in-water double emulsion droplets. This in turn may enable a wider range of pressures to be utilized and/or a higher percentage of double emulsion droplets provided according to desired dimensions.

Having one affinity for water being different from another affinity for water may be understood as having opposite affinities for water or an oppositely defined affinities, such as high affinity vs. low affinity. For instance, if the first affinity for water is hydrophobic, then the second affinity for water may be hydrophilic, and vice versa.

Provision of the first affinity for water may for instance be provided by polymers such as PMMA (Poly(methyl methacrylate)), Polycarbonate, Polydimethylsiloxane (PDMS), COC Cyclic Olefin Copolymer (COC) e.g. including also TOPAS, COP Cyclo-olefin polymers (COP) including ZEONOR®, Polystyrene (PS), polyethylene, polypropylene, and negative photoresist SU-8.

Provision of the first affinity for water may alternatively, or additionally, be provided by a material such as glass e.g. treated using a method to make the surface hydrophobic, such treated as using siliconization, silanization, or coating with amorphous fluoropolymers.

Provision of the first affinity for water may alternatively, or additionally, be provided by coating the surface to make it hydrophobic by applying a layer of Aquapel, sol-gel coating, or by deposition of thin films of gaseous coating material.

Provision of the second affinity for water may for instance be provided by materials including glass, silicon, or other materials providing hydrophilic properties.

Provision of the second affinity for water may alternatively, or additionally, be provided by modifying the surface using oxygen plasma treatment, UV irradiation, UV/ozone treatment, UV-grafting of polymers, Deposition of Silicon dioxide (SiO2), deposition of thin films such as Silicon dioxide by chemical vapor deposition (CVD) or Plasma Enhanced Chemical Vapor Deposition (PECVD).

Any supply container or collection container may be referred to as "a well". The term "well" may refer to any one, more, or all of the following: the collection container, the primary supply container, the secondary supply container, and the tertiary supply container. However, the primary supply container may alternatively be provided by an intermediate chamber, as described in the present disclosure, instead of by a well.

A well may be a structure, suitable for accepting and containing a liquid, e.g. such as an aqueous sample, an oil, a buffer, or an emulsion.

A well may have two openings. One opening may be configured for providing or extracting liquid to or from the well, e.g. by top-loading/extracting using a pipette. Another opening may enable liquid held by the respective well to exit or enter the well actively, such as when subjected to a pressure difference.

A well may be bounded in one, two or three dimensions such as being essentially flat, being circumferentially bounded, or being bounded in all dimensions such as a blister.

The primary supply container may be configured for holding a first fluid, such as a sample buffer. A fluid held by the primary supply container may be guided by the corresponding microfluidic unit towards the corresponding collection container.

This secondary supply container may be configured for holding a second fluid, such as oil. A fluid held by the secondary supply container may be guided by the corresponding microfluidic unit towards the corresponding collection container.

The tertiary supply container may be configured for holding a third fluid, such as a buffer. A fluid held by the tertiary supply container may be guided by the corresponding microfluidic unit towards the corresponding collection container.

The collection container may be configured for collecting the fluids from the supply containers. This fluid may comprise double emulsion droplets provided by the device according to the present invention during use. The double emulsion droplets may be suspended in a continuous fluid, such as a buffer.

The primary supply container may be configured to contain a first supply volume. The secondary supply container may be configured to contain a second supply volume. The tertiary supply container may be configured to contain a third supply volume. The collection container may be configured to contain a collection volume. The collection volume may be larger, such as at least 5% larger, than the sum of the volumes contained by the corresponding supply containers, such as the first supply volume, the second supply volume, and the third supply volume.

The first supply volume may e.g. be between 100 and 500 μL, such as between 200 and 400 μL.

The second supply volume may e.g. be between 100 and 500 μL, such as between 250 and 450 μL.

The third supply volume may e.g. be between 150 and 800 μL, such as between 300 and 500 μL.

The collection volume may e.g. be between 250 and 1000 μL, such as between 400 and 800 μL.

During use of the device according to the present invention, liquid may be transferred from each of the supply containers to the collection container. Liquid contained by the collection container may be collected using a pipette. When a tip of a pipette is inserted into the collection container for collecting liquid, then liquid may be displaced by the pipette tip. Accordingly, if a collection volume is larger than the sum of the volumes contained by the supply containers this may be helpful to prevent overflow of liquid from the collection container during collection.

A bottom part of the first supply container may be rounded. This may be for ensuring essentially complete entry of the first liquid contained by the first supply container into the corresponding microfluidic unit when pressure is applied to the container. Since the first liquid may contain a sample, it may be advantageous that all or essentially all the first liquid is utilized.

The containers, e.g. each supply container or each container of each group of containers, may for instance be provided in a grid, such as rows and columns, where the spacing between adjacent containers may be the same along two orthogonal directions.

The containers, e.g. each supply container or each container of each group of containers, may be provided in a standard well plate layout, such as defined as published by American national standard institute on behalf of Society for Biomolecular Screening. Accordingly, the distance between the center of adjacent containers in any of two orthogonal directions may be 9 mm.

The distance between the center of the first supply containers of adjacent microfluidic units may be 9 mm.

The containers may for instance have any suitable shape, such as a cylinder with a round opening at the top. The containers may be tapered towards the bottom of the container, i.e. with a larger opening at the top than at the bottom. An advantage of a tapered container or a tapered bottom of the container may be to assure a complete withdrawal of the liquids during operation. The opening of the containers at the top may have a size suitable for dispensing and removing liquids using a standard micropipette.

The top of each container may be at the same level. This may facilitate provision/extraction of fluid from the respective containers.

The bottom of the collection container may be provided at a lower level than the collection outlet. An advantage hereof may be that double emulsion droplets may be moved from the fluid conduit network into a part of the collection container that may be isolated from the fluid conduit network in order to prevent backflow of double emulsion droplets in the fluid conduit network. Accordingly, low droplet loss may be provided. The volume of the lower part, e.g. bottom part, of the collection container may be at least 200 μL.

A lower part and/or an upper part of each group of containers may be provided by the base container structure piece.

The top of the base container structure piece may accommodate a substantially flat gasket.

The gasket may be a separate part and the base container structure piece may have features/protrusions that allow the reversible fixation of the gasket. Protrusions may have any suitable shape and size. In some embodiments, each column might have a set of protrusions. An advantage hereof may be that only a single or a defined number of columns may be opened at a time.

A set of protrusions may be constituted by any number of protrusions such as one, a pair or more. A pair of protrusion may comprise two identical structures or two different structures such as a hook and a pin. One advantage of using a pair of protrusions is to restrict the opening to only the collection container.

The top of each container may have a protrusion or heightening of any suitable size, such as 1 or 2 mm in height and width. The protrusion may have a uniform height and width along the borders of all containers such as the lip shown in the example. An advantage of the protrusion may be to facilitate a correct seal with the gasket.

The term "fixedly connected" may be understood as "being adjoined". Fixedly connected may for instance comprise being connected via one or more additional structures, e.g. via one or more interface structures and/or via a capping piece fixed to or forming part of a base microfluidic piece.

The base container structure piece and the base microfluidic piece may for instance be fixedly connected to each other using one or more attachment elements, such as glue, weld buts, screws, and/or by being clamped by a clamping structure.

An advantage of having the base container structure piece and the base microfluidic piece fixedly connected to each other may be that the microfluidic device may be handled as a single piece by a user.

The microfluidic device may comprise one or more interface structures configured for coupling the plurality of microfluidic units, such as the base microfluidic piece or a structure comprising or coupled to the base microfluidic piece, to the plurality of groups of containers, such as the base container structure piece. Such one or more interface structures may provide an air and liquid tight coupling between each of the respective containers and the corresponding inlets/outlets of the corresponding microfluidic units.

The one or more interface structures may form part of the plurality of microfluidic units or the plurality of groups of containers, such as the base container structure piece.

The one or more interface structures may be provided in form of a gasket, such as a flat sheet of an elastomeric material. The gasket may have coupling perforations, e.g. of diameter 0.2 to 1 mm, for provision of fluid connections.

There may be one coupling perforation for each fluid connection between a container and a corresponding inlet/outlet of the corresponding microfluidic unit. For instance, in case of 4 containers for each group of containers and 8 microfluidic units, and thus also 8 groups of containers, there may be 4×8 coupling perforations.

The one or more interface structures may be overmoulded, e.g. onto a structure comprising or forming part of the plurality of groups of containers, such as the base container structure piece. This may facilitate assembly of the cartridge.

The one or more interface structures may be made of an elastomeric material, which may be desired to be resistant to the chemicals and reagents applied to the device such as to the containers of the device with the purpose of producing droplets e.g. oils and buffers. The elastomeric material may for instance be or comprise any one or more of: natural rubber, silicone, ethylene propylene diene monomer styrenic block copolymers, olefinic copolymers, thermoplastic vulcanizates, thermoplastic urethanes, copolyesters, or copolyamides.

The one or more interface structures may be provided with one or more attachment perforations for enabling attachment elements, such as screws, to pass through the gasket. Such one or more attachment perforation may be of 1 to 8 mm such as 6 mm in diameter.

It has been observed by the inventors that droplets tend to get a cross-sectional area at the droplet center, i.e. the inner droplet, of slightly more than the cross-sectional area of the first transfer conduit part, which is provided after the first fluid junction in the intended direction of flow. This may be because the droplet is elongated while being subject to a flow in the respective conduit. Likewise, it has been observed by the inventors that droplets tend to get a cross-sectional area, i.e. the inner droplet plus the outer shell, of slightly more than the cross-sectional area of the first collection conduit part, which is provided after the second fluid junction in the intended direction of flow.

To get smaller droplets than this, a jet stream may be required, which requires a lot of the second fluid and/or the third fluid, respectively, which may be undesired. It may be advantageously, to provide a device and a method having a low requirement for amounts of buffers and oils.

The cross-sectional areas defined perpendicular to the intended direction of flow of the first transfer conduit part and the first collection conduit part, respectively, may be of relevance. Each may be desired to be slightly smaller in cross-sectional area than the desired cross-sectional areas of the respective droplets, i.e. inner droplet and inner plus outer droplet, as defined through their respective droplet center.

The first transfer conduit part and the first collection conduit part of each microfluidic unit may be configured to retain their respective affinity for water for at least one month of storage from time of provision of the respective parts.

A respective affinity for water may be considered as retained if the respective contact angle hereof remains within the limit-value defined in the present disclosure for the respective affinity for water.

A respective affinity for water may be considered as retained if the respective contact angle hereof does not change from below a lower limit to above a higher limit, or vice versa. The lower limit and the higher limit may be equal, such as 60°. The lower limit may for instance be 55° or 50°. The upper limit may for instance be 65° or 70°.

The storage conditions may be 18° C. to 30° C., 0.69 atm to 1.1 atm.

The first transfer conduit part may e.g. be configured to retain the first affinity for water by being provided of a base material produced from polymers such as any one or combination of PMMA (Poly(methyl methacrylate)), Polycarbonate, Polydimethylsiloxane (PDMS), COC Cyclic Olefin Copolymer (COC) e.g. including also TOPAS, COP Cycloolefin polymers (COP) including ZEONOR®, Polystyrene (PS), polyethylene, polypropylene, and negative photoresist SU-8.

The first transfer conduit part may e.g. be configured to retain the first affinity for water by being provided of a material such as glass or polymers treated using a method to make the surface hydrophobic such as using siliconization, silanization, or coating with amorphous fluoropolymers.

The first transfer conduit part may e.g. be configured to retain the first affinity for water by being provided of a base material coated by applying a layer of Aquapel, sol-gel coating, or by deposition of thin films of gaseous coating material.

The first collection conduit part may e.g. be configured to retain the second affinity for water by being provided of materials including glass, silicon, or other materials providing hydrophilic properties.

The first collection conduit part may e.g. be configured to retain the second affinity for water by being provided of a base material modified using oxygen plasma treatment, UV irradiation, UV/ozone treatment, UV-grafting of polymers, Deposition of Silicon dioxide (SiO2), deposition of thin films such as Silicon dioxide by chemical vapor deposition (CVD) or PECVD.

A base material for a microfluidic device may comprise any of the following: thermoplastic, elastomers such as PDMS, thermoset, SU-8 photoresist, glass, silicon, paper, ceramic, or a hybrid of materials e.g. glass/PDMS. Thermoplastic may comprise any of the following: PMMA/acrylic, polystyrene (PS), Polycarbonate (PC), COC, COP, polyurethane (PU), poly-ethylene glycol diacrylate (PEGDA), and Teflon.

The time of provision of the respective parts may be defined as the time of provision of the coating, even if a coating is only applied to one of the first collection conduit part and the first transfer conduit part.

A high degree of stability of the surface properties of the first transfer conduit part and the first collection conduit part may enable a long shelf life of the microfluidic device.

One, more, or all parts of the microfluidic device, such as the base container structure piece and/or the base microfluidic piece, may be provided using injection moulding. Injection moulding may become more cost efficient at higher volumes, which may lead to a larger volume on stock and therefore a desire for a long shelf life.

The surface properties of the first transfer conduit part of each microfluidic unit may be provided by a coating, e.g. provided on top of a substrate. Alternatively, or in combination, the surface properties of the first collection conduit part of each microfluidic unit may be provided by a coating, e.g. provided on top of a substrate. The substrate may provide the surface properties of either the first transfer conduit part or the first collection conduit part of each microfluidic unit. The substrate may be provided in a base material such as described in the present disclosure.

Accordingly, the coating may be provided on a substrate, such that the coating constitutes either the first transfer conduit part or the first collection conduit part while the substrate constitutes the other.

The coating may be provided on a polymer by subjecting the polymer to plasma treatment followed by chemical vapour deposition, e.g. plasma enhanced chemical vapour deposition, wherein the chemical vapour deposition may comprise using $SiO_2$.

The coating may alternatively, or additionally, be provided onto a glass or polymer surface by subjecting both the first transfer conduit part and the first collection conduit part to coating such as siliconization, silanization, or coating with amorphous fluoropolymers followed by removal of the coating from the first collection conduit part e.g. using a chemical such as sodium hydroxide.

The coating may have a thickness of less than 1 μm, such than less than 500 nm, such as less than 250 nm. A thin coating may be achieved using chemical vapour deposition rather than physical vapour deposition.

An advantage of providing a thin coating may be that the diameter or cross-sectional area of the respective part of the fluid conduit network may be affected to a low degree. Accordingly, the fluid conduit network may be provided with a diameter disregarding that a coating may be applied subsequently. Accordingly, similar cross-sectional area in coated and non-coated parts may be provided.

The first transfer conduit part may be provided with stable hydrophobic surface properties. The first collection conduit part may be provided with stable hydrophilic surface properties.

The microfluidic section may comprise a base microfluidic piece providing at least a part of each of: the primary supply conduit of each microfluidic unit; the secondary supply conduit of each microfluidic unit; the tertiary supply conduit of each microfluidic unit; the transfer conduit of each microfluidic unit; the collection conduit of each microfluidic unit; the first fluid junction of each microfluidic unit; and the second fluid junction of each microfluidic unit.

The base microfluidic piece may be provided in a base material having surface properties corresponding to the first affinity for water, wherein at least a part of the coating providing the first collection conduit part is provided on top of the base material of the base microfluidic piece. Alternatively, the base microfluidic piece may be provided in a base material having surface properties corresponding to the second affinity for water, wherein at least a part of the coating providing the first transfer conduit part is provided on top of the base material of the base microfluidic piece.

The base microfluidic piece may provide at least a part of each of: the primary supply conduit of each microfluidic unit; the secondary supply conduit of each microfluidic unit; the tertiary supply conduit of each microfluidic unit; the transfer conduit of each microfluidic unit; the collection conduit of each microfluidic unit; the first fluid junction of each microfluidic unit; and the second fluid junction of each microfluidic unit.

The base microfluidic piece may be provided in a base material having surface properties corresponding to the first affinity for water.

The coating may be provided on the base material of the base microfluidic piece at the area providing at least a part of the first collection conduit part. The coating may provide a surface exhibiting the second affinity for water.

The base microfluidic piece may be provided in a base material having surface properties corresponding to the second affinity for water.

The coating may be provided on the base material of the base microfluidic piece at the area providing at least a part of the first transfer conduit part. The coating may provide a surface exhibiting the first affinity for water.

Different materials may be used for the container section and the microfluidic section. Accordingly, optimal materials for both the larger and deeper features of the container section and the very fine features of the microfluidic section may be provided. Provision of two or more parts may lower production cost as the tools for the base container structure piece and the microfluidics section may have different tolerances.

Different materials may be used for the container section and the microfluidic section. Use of different materials, for the container section and the microfluidic section may enable use of different desired materials for the respective parts.

The container section may comprise relative large and deep features while the microfluidic section may comprise very fine features.

Provision of the container section and the microfluidic section in different structures, which may be fixedly connected subsequently, may lower production cost as the tools needed for provision of the container section and the microfluidics section may have different tolerances.

The microfluidic section may e.g. be made from glass or polymer material.

Examples of polymer materials, which may be used for the microfluidic section may comprise any of the following: poly(methyl methacrylate) (PMMA), cyclic olefin copolymer (COC), cyclic olefin polymer (COP), polystyrene, polyethylene, polypropylene, polyethylene terephthalate (PET), polycarbonate (PC), polytetrafluoroethylene (PTFE). The use of polymers may be limited by their properties to be compatible with the sample, oil, and continuous phase buffer in use with the present invention, e.g. including NOVEC oil. Furthermore, use of polymers may be limited by the applicable prior art manufacturing and patterning techniques. COPs and COCs over for example PDMS may have the advantages that they have excellent transparency, near zero birefringence, low density, low water uptake, good chemical resistance, low binding of proteins, halogen-free, BPA-free, and are suited to standard polymer processing techniques such as single and twin-screw extrusion, injection moulding, injection blow moulding and stretch blow moulding (ISBM), compression moulding, extrusion coating, biaxial orientation, thermoforming and many others. COC and COP are noted for high dimensional stability with little change seen after processing. COC may in some applications be preferred over COP. COP may tend to crack if exposed to oil, such as oil which may be intended for use with the present invention. COP may crack when exposed to fluorocarbon oil such as NOVEC oil. COP may be compatible with reagents for PCR such as enzymes and DNA. COC and COP have glass transition temperatures which are typically in the range of 120-130° C. This may render them unsuitable for typical CVD coating as CVD processes are typically operated at above 300° C. and would therefore melt the COC or COP materials. This disadvantage of COC and COP may have been overcome in the present invention e.g. by applying a modified PECVD procedure operating at 85° C. COC are possibly not compatible with laser cutting as the laser may cause "burning" of the material. This disadvantage has been overcome according to the present invention e.g. using injection moulding.

Glass may alternatively, or additionally, be used as substrate with desired coating as explained for the microfluidic section.

Polydimethylsiloxane (PDMS) is often utilized for microfluidic parts. However, the inventors of the present invention have associated the following disadvantages of using PDMS:

- Change of material properties over the time (source: http://www.elveflow.com/microfluidic-tutorials/cell-biology-imaging-reviews-and-tutorials/microfluidic-for-cell-biology/pdms-in-biology-researches-a-critical-review-on-pdms-lithography-for-biological-studies/)
- Long process time (curing time of PDMS: 30 min to several hours, depending on the temperature, material stiffness required. (source Becker 2008)
- High manufacturing cost (source: Berthier, E., E. W. K. Young, et al. (2012). "Engineers are from PDMS-land, Biologists are from Polystyrenia." Lab on a Chip 12(7): 1224-1237.)
- Cost per device remains the same, even for higher volumes of production, (source: Becker, H. and C. Gärtner (2008). "Polymer microfabrication technologies for microfluidic systems." Analytical and Bioanalytical Chemistry 390(1): 89-111. AND Berthier, E., E. W. K. Young, et al. (2012). "Engineers are from PDMS-land, Biologists are from Polystyrenia." Lab on a Chip 12(7): 1224-1237.)
- PDMS might absorb some molecules (e.g. proteins) at the surface. (source: Berthier 2012 AND http://www.elveflow.com/microfluidic-tutorials/cell-biology-imaging-reviews-and-tutorials/microfluidic-for-cell-biology/pdms-in-biology-researches-a-critical-review-on-pdms-lithography-for-biological-studies/)
- PDMS is permeable for water vapour, which lead to evaporation in the conduit. (source: http://www.elveflow.com/microfluidic-tutorials/cell-biology-imaging-reviews-and-tutorials/microfluidic-for-cell-biology/pdms-in-biology-researches-a-critical-review-on-pdms-lithography-for-biological-studies/)
- PDMS is deformable. So, the shape of the fluid conduit network might change/deform under pressure, i.e. under operation of the device (source Berthier 2012)
- Risk of leaching of non-cross linked monomers into the conduits (source Berthier 2012 AND http://www.elveflow.com/microfluidic-tutorials/cell-biology-imaginq-reviews-and-tutorials/microfluidic-for-cell-biology/pdms-in-biology-researches-a-critical-review-on-pdms-lithography-for-biological-studies/)

Any opening of the first plurality of openings of the first fluid junction of each microfluidic unit may have a cross-sectional area being smaller than 2500 $\mu m^2$. For each microfluidic unit, the cross-sectional area of any opening between any supply conduit and the first fluid junction may be smaller than 2500 μm2. An advantage hereof may be that droplets provided by the device according to the present invention may be small enough for fluorescence-activated cell sorting (FACS).

The first transfer opening of each microfluidic unit may have a cross-sectional area being smaller than 2500 $\mu m^2$. For each microfluidic unit, the cross-sectional area of an opening between the first fluid junction and the transfer conduit may be smaller than 2500 $\mu m^2$. An advantage hereof may be that droplets provided by the device according to the present invention may be small enough for fluorescence-activated cell sorting (FACS).

The first transfer opening of each microfluidic unit may have a cross-sectional area being between 50% and 100% of the cross-sectional area of the second transfer opening of the corresponding microfluidic unit. For each microfluidic unit, the cross-sectional area of an opening between the first fluid junction and the transfer conduit may be between 50% and 100% of the cross-sectional area of an opening between the second fluid junction and the collection conduit. An advantage hereof may be that droplets provided by the device according to the present invention may have a shell thickness resulting in stable droplets that are not too large for FACS.

If the cross-sectional area of the opening leading into the second junction is smaller than or equal to the cross-sectional area of the opening leading out of the first junction, droplet production may become unstable. If it is a too much larger than the first junction, the oil shell may become thicker than desired.

The microfluidic section may comprise a first planar surface, which may be provided by the base microfluidic piece, and a capping piece comprising a second planar surface. The first planar surface of the base microfluidic piece may have a plurality of ramified recesses providing a base part of each fluid conduit network of the microfluidic device. The second planar surface may face the first planar surface. The second planar surface may provide a capping part of each fluid conduit network of the microfluidic device. The capping piece may comprise a third planar surface facing the container section.

The base microfluidic piece may be provided with a first planar surface having a plurality of ramified recesses providing a base part of each of the fluid conduit networks of the microfluidic device. The microfluidic device may furthermore comprise a capping piece having a second planar surface facing the first planar surface of the base microfluidic piece. The second planar surface of the capping piece may provide a capping part of each of the fluid conduit networks of the microfluidic device. The capping piece may have a third planar surface facing the base container structure piece.

The base microfluidic piece may be provided by a base substrate. The capping piece may be provided by a capping substrate.

One, more, or all parts of each fluid conduit network may form an acute trapezoidal cross section, wherein the longer base edge may be provided by the second planar surface of the capping piece A cross sectional shape of the fluid conduit network may vary throughout the network. It may be rectangular, square, trapezoidal, oval or any shape suitable to the droplet formation. In some examples, a conduit may have four walls with two of the walls provided in parallel or coplanar to each other. An acute trapezoidal cross section, such as wherein the longer base edge is formed by a cover section, may have the advantage that deposition of coating may be more even on the walls and bottom of a conduit as compared e.g. to a square, rectangular or oval shape. A higher draft angle of the conduit wall may result in a more even layer of coating than a lower draft angle and/or may facilitate ejection of the conduit structure from a mould without changing the dimensions of the conduits. The conduit walls may have a draft angle of 5-45 degrees, such as 10-30 degrees.

The acute trapezoidal cross section may form an isosceles trapezoidal cross section, wherein the side walls of equal length may have a tapering of at least 5 degrees and at most 20 degrees with respect to a normal of either of the parallel base edges. This may also be denoted "draft angle". An advantage hereof may be that it may be easier to apply a coating to the base microfluidic piece such that a desired thickness is applied to a bottom part as container as side parts. Furthermore, if the base microfluidic piece is provided by means of moulding, such as injection moulding, it may be easier to extract the base microfluidic piece from the mould during manufacture of the microfluidic device.

A typical result of an injection moulding sharp corners in the bottom with a tapering of 5-20 degrees. The upper part of the walls, towards the capping piece, may be rounded, but this may still provide a tapering of more than five degrees. Milled conduits would in most cases not be tapered whereas conduits edged in glass may have round corners at the bottom, such as like the bottom of a U.

Each microfluidic unit may comprise a primary filter at or within the primary supply conduit. Each microfluidic unit may comprise a secondary filter at or within the secondary supply conduit. Each microfluidic unit may comprise a tertiary filter at or within the tertiary supply conduit.

Any one, more or all of: the primary filter, the secondary filter, and the tertiary filter may be denoted "filter".

Each or any filter may comprise a structure that obstructs passage of particles having a dimension higher than a filter threshold value. The filter threshold value may for instance be the volume of the smallest of first and the second fluid junction and/or the smallest diameter or cross-sectional area of the fluid conduit network. A filter may provide a network of flow lines/conduits smaller than filter threshold value. A filter may for instance be provided by a plurality of pillars.

Each or any filter may be provided as a plurality of rows of a plurality of pillars with the height equal to the conduit depth at the pillars, a diameter between 5 and 16 μm, and a pitch, i.e. distance between the centre of each pillar, of 15 to 100 μm. The pillars may be in form of cylinders, i.e. with a constant diameter throughout the height or be tapered towards the top of the conduit, i.e. with a diameter larger at the bottom of the pillar compared to the diameter at the top of the pillar. Pillar filters have the advantage of trapping particles of many different sizes, while affecting the conduit resistance only to a minimum.

Each or any filter may comprise a weir as known in the art of microfluidics. Thereby the height of the conduit in the area comprising the filter may be reduced, and thereby block any particles larger than the height of the conduit at the position of the weir from entering the remaining part of the microfluidic unit.

The first transfer conduit part may have an extension of at least 200 μm, such as at least 500 μm, such as at least 1 mm. The first transfer conduit part may have an extension of 3 mm at most.

The extension of the first transfer conduit part may be equal to or smaller than the length of the transfer conduit.

The desired extension of the first transfer conduit part may be a compromise of a plurality of aspects as explained in the following.

The shorter the conduit, the lower the resistance. A low resistance may be desired. The longer the first transfer conduit part, the easier it may be to align when bonding since it is possible to compensate for variability in alignment of coating and alignment of lower and upper microfluidic part, such as the base the base microfluidic piece and the capping piece. Furthermore, the bonding may be stronger if the first transfer conduit part is long.

Accordingly, the desired length of the first transfer conduit may be selected as a compromise between different, and possibly conflicting, requirements.

The depth and/or width and/or cross-sectional area may vary along one or more parts of the fluid conduit network. The transfer conduit may for instance have a wider portion between the first transfer conduit part and the second fluid junction. This may be to reduce the resistance and/or increase the flow rate in some areas of the chip.

The largest area of a cross-section of the transfer conduit may be less than 10 times the smallest area of a cross-section of the transfer conduit such as less than 5 times or less than 2 times. If the transfer conduit is too large compared to the opening between the first fluid junction and the transfer conduit, the droplets loose alignment and may not arrive at the second junction at equal intervals or with equal spacing which may result in non-homogenous oil shell thickness and/or droplet size. The depth of each fluid conduit network may be the same throughout the microfluidic section. This may be to facilitate production e.g. of moulds, etching, and/or other means of producing the microfluidic section. The depth of a fluid conduit network may vary. This may e.g. be to decrease resistance in parts of the microfluidics section. The narrowest section of the primary supply conduit may have a cross-sectional area of 10-5000 $\mu m^2$, such as 50-500 $\mu m^2$, such as 150-300 $\mu m^2$. A narrow section of a conduit may be cylindrical, or it may be in the form of a nozzle. The primary supply conduit may be defined to end where the sample comes into fluid contact with the oil from the secondary supply conduit.

The narrowest section of the secondary supply conduit may have a cross sectional area of 10-5000 $\mu m^2$, such as 50-500 $\mu m^2$, such as 150-300 $\mu m^2$. The secondary supply conduit, such as comprising the first secondary supply conduit and the second secondary supply conduit, may be defined to end where the oil comes into fluid contact with the sample from the primary supply conduit. The aspect ratio of average width to average depth of a conduit at any position in the chip may be less than 5:1, such as less than 3:1, such as less than 2:1. Production may be facilitated by provision of conduits being wider than they are deep.

The narrowest section of the tertiary supply conduit may have a cross sectional area of 10-5000 $\mu m^2$, such as 50-500 $\mu m^2$, such as 150-300 $\mu m^2$. The tertiary supply conduit, such as including the first tertiary supply conduit and the second tertiary supply conduit, may be defined to end where the buffer comes into fluid contact with the carrier phase, e.g. oil, from the transfer conduit.

The narrowest section of the transfer conduit may have a cross sectional area of 10-5000 $\mu m^2$, such as 50-500 $\mu m^2$, such as 150-300 $\mu m^2$.

The narrowest section of the collection conduit may have a cross-sectional area which is 5-80% larger than the narrowest section of the primary supply conduit, such as 10-50% larger, such as 15-30% larger. The narrowest section of the collection conduit may have a cross-sectional area, which is 10-5000 $\mu m^2$, such as 50-1000 $\mu m^2$, such as 200-400 $\mu m^2$. This may facilitate that the droplets generated have an inner diameter of 10 to 25 μm and an outer diameter of 18 to 30 μm, which may facilitate use of standard equipment designed for bacterial or human cells for subsequent processing, quantification, handling, or analysis of the droplets. The inner diameter may be understood as the diameter of the inner droplet, e.g. of the first fluid, e.g. sample. The outer diameter may be the outer diameter of the shell of the second fluid, e.g. oil.

The relative small size of droplets generated with the present system may facilitate analysis, quantification and processing using instruments designed for use with cells. If a DE droplet, i.e. e.g. the combination of the oil layer and the aqueous inner phase, are sufficiently small, such as smaller than 40 μm or smaller than 25 μm, then a collection of double emulsion droplets may be analysed and processed using equipment developed for bacterial or mammalian cells such as flow cytometers and cell sorters.

The cross-sectional area of the first transfer conduit may affect the resistance. The smaller the cross-sectional area, the higher the resistance may be.

The cross-sectional area of any supply conduit may have a minimal cross-sectional area being larger than any opening, or the average openings, of the corresponding filter, also denoted filter rating or filter size. This may be to alleviate blocking of the conduit by particles in the filter.

It may be desired that the opening between a supply conduit and a corresponding fluid junction, such as between the first fluid junction and the secondary supply conduit, has a specified cross-sectional area range or value. Furthermore, it may be desired that a supply conduit has the same cross-sectional area at an adjacent part thereof leading up to the respective fluid junction as cross-sectional area of the opening into the respective fluid junction. Such adjacent part may for instance be at least 50 μm. However, to facilitate an overall lower resistance in the respective conduit, the remaining part of the respective supply conduit, or at least a major part thereof, may have a higher cross-sectional area.

The cross-sectional area of the transfer conduit may be smaller than the cross-sectional area of the supply conduits. A large cross-sectional area of the transfer conduit may disturb the periodic flow of the droplet within the conduit. The transfer conduit may be void of any section, wherein the cross-sectional area is larger than twice the cross-sectional area of the first transfer opening.

The cross-sectional area of the collection conduit may be larger than the second transfer opening. This may be to decrease resistance in the conduit. The first collection conduit part may comprise the region from the center of the second fluid junction to 250 μm from the center of the first fluid junction or at least the region from 25 μm to 75 μm from the center of the first fluid junction in the intended direction of the fluid flow corresponding to the area where droplets or plug formation occurs.

The distance between the first and second fluid junction, which may correspond to the length of the transfer conduit, may be at least 200 μm, such as at least 500 μm, 1000 μm or 1500 μm. A longer distance may facilitate large scale production of microfluidic device. Variation in placement of coating and placement/alignment of e.g. the base microfluidic piece and the capping piece may be expected. For facilitating that the first transfer conduit part and the first collection conduit part have correct surface properties, it may be desired to have a sufficient distance between the two junctions. A larger distance between the first junction and second junction may reduce the risk of insufficient bonding/attachment between the base microfluidic piece and the capping piece adjacent to the secondary supply conduit, the tertiary supply conduit, and the transfer conduit, which may be critical bonding area.

The assembly may be denoted: "instrument".

The pressure distribution structure may comprise a plurality of container valves comprising: a plurality of primary container valves comprising a primary container valve for each primary supply container of the microfluidic device; and a plurality of tertiary container valves comprising a tertiary container valve for each tertiary supply container of the microfluidic device.

The plurality of container valves may comprise a plurality of secondary container valves comprising a secondary container valve for each secondary supply container of the microfluidic device.

The container valves may be operated manually or may be operated by means of a control structure. A control structure, e.g. comprising a computer, integrated into the assembly may be desired.

An advantage of provision of the container valves and the operation thereof may be that separate operation of each of the plurality of sample lines is enabled.

The primary container manifold may be configured to be coupled to each of the primary supply containers of the microfluidic device via the primary container valves.

The tertiary container manifold may be configured to be coupled to each of the tertiary supply containers of the microfluidic device via the tertiary valves.

The plurality of line pressure regulators may comprise a secondary line pressure regulator coupled to the secondary container manifold.

The plurality of container manifolds may be formed in one piece. For instance, one piece of metal may provide the plurality of container manifolds.

Alternatively, or in combination with the above, different individual pressures may be utilized for the secondary supply container, the tertiary supply container, and possibly the primary supply container.

The assembly may comprise a pressure supply structure configured for supplying pressure to the pressure distribution structure. The pressure supply structure may comprise a compressor, e.g. including appropriate filters and valves.

A combination of the pressure supply structure and the pressure distribution structure may be configured to supply controlled amounts of pressurized gas or air to the microfluidic device, such as to the supply containers thereof.

The receptor may comprise a clamp configured to hold the microfluidic device and/or to facilitate air- and fluid-tight connections between different parts of the microfluidic device.

At least one corner of the receptor may be slanted to constitute an alignment feature with the clamp. This slanted corner may be fixed/retained in one position using a spring mechanism in the instrument. The slanted corner may have dimensions similar to a standard well plate.

The base container structure piece may include a flat protrusion on the lower part of a side to facilitate vertical alignment into the receptor.

The assembly may be configured for providing controlled air pressures to drive liquids from the respective supply containers and into the respective microfluidic unit(s) with the aim of generating double emulsion droplets. The assembly may comprise elements that may be used to build up and/or control compressed air or gasses. Ambient air may be used as well as specialized gasses. The assembly may allow for either pre-compressed gas/air or ambient pressures. Any pressure higher than ambient may be created in the system and pressure may be accumulated in the instrument after being provided by an external source. Utilizing the pressurized air or gas, individual pressure lines ensures variable and controlled pressures which may be applied to different channels of the manifold. Each of the positions may include individual pressure controllers or may be attached to the same controller.

Movement of either the manifold, of the lower part of the clamp or movement of both may ensure an airtight connection from instrument to cartridge, using a gasket or similar. The clamp may alternatively, or additionally, provide a pressure tight connection between the upper and lower part of the microfluidic unit and/or between the upper part of the microfluidic unit and the base container structure piece of the cartridge by applying pressure mainly to the microfluidic unit rather than the edges of the cartridge.

An adapter to be placed under the cartridge to interface with the instrument may be supplied with the system. This adapter may be produced in a material having a high thermal conductivity such as iron or aluminium. The adapter may be used to cool the cartridge, or one or more parts thereof, including the sample, at least until some or all droplets are formed.

Each of the pressure controllers may include one or multiple valves, a pressure controller and a PID regulator function or both. Read-out from PID values may be used to evaluate if the total samples volume has successfully been processed. In some cases, running time may be used to determine if a sample has been fully processed.

Bleed channels may be installed to each of the three main air/gas lines after the pressure regulator to ensure sufficient capability of the system to decrease pressure and enable efficient PID regulation. Bleed-valves may be installed on each of the three main channels, and may be opened when the instrument pressure is higher than the desired pressure. Closing the bleed valves when bleed is not necessary ensures a decreased amount of air/gas used in the system.

Operation of instrument electronics, clamping systems, pressures, valves may be done fully automated as an integrated part of the instrument or may be done by an external part. All operations may alternatively, or additionally, be done individually by manually operations by a user.

Example of Instrument and Example of Operation:

The following describes an exemplary structure of the operational instrument. The following combination of components is exemplified by using the instrument to drive liquids into the assembly of the cartridge and with the purpose of producing double emulsion droplets. The exemplary instrument may comprise:

1. Ambient air supply
2. Filter
3. Pump
4. Filter
5. Valve
6. Pressure sensor
7. Air reservoir (Air tank)
8. Air splitter
9. Pressure regulators/controllers (PID)
10. Bleed channels
11. Manifold valves (24 valves)
12. Manifold
13. Gasket and clamping Ambient air (1) is pulled into the filter by activating the pump (2). The pump is left running until the desired pressure of 4 bar(g) has been reached. Valve (5) is kept open until pump (3) has built up the acquired pressure in reservoir (7) as determined by pressure sensor (6). When the desired pressure is obtained, measured by the pressure sensor (6) pressure valve (5) is closed securing an airtight enclosure with compressed air pressure between Valve (5) and pressure controllers. PID controlled software operating the pressure regulators (9) ensure the desired air flow being delivered to the individual channels by the manifold (11). Bleed-channels allow air to constantly leak from the system to prevent pressure build-up during PID controlled pressure regulation. Bleed valves (10) may be installed and be configured to only open when PID controller is overshooting for increased speed of bleed.

Individual sample lines are opened or closed depending on the desire for quantity of samples running in parallel. The read-out from the inlet-pressure sensor (6) is used in combination with the pressure regulators (8) are used to determine if threshold pressures have been reached.

The instrument is started by the integrated software, and air pressures of sample (e.g. 1.8 bar), oil (e.g. 1.8 bar), and buffer (e.g. 1.7 bar) are delivered through the manifold to the three lines of inlets.

Desired individual pressures for the three parallel pressure lines (Sample, Oil, and buffer) are automatically adjusted using the pressure controllers by applying PID regulation to obtain stable differentiated pressures in the three lines.

Use of one sample line at a time may be enabled, e.g. by provision of 8 valves being placed on each of the three channels and all 24 valves are operated individually. 24 valves are placed on the manifold to enable opening and closing all channels individually to enable the user to run individual droplet systems.

Feedback from the PID-regulator is used to monitor a steady flow of liquids into the cartridge, and read-out parameters (needs to be more accurately determined) are used as verification of a completed run.

Since the instrument (i.e. the assembly) may enable use of one sample line at a time, as explained e.g. above, a long shelf life may be an advantage.

A kit according to the present invention may include aqueous liquids, reagents, buffers, oils necessary, cartridges, chips, gaskets sufficient to generate double emulsion droplets and instructions for using kit components with the instrument. Aqueous liquids suitable for the inner aqueous phase of the droplets may include DNA or RNA amplification reagents such as dNTPs, one or more polymerases, and salts. Aqueous liquids suitable for the outer carrier phase may have essentially the same osmolarity as the aqueous liquid suitable for the inner aqueous phase of the droplets. The aqueous liquids may include emulsion stabilizing agents such as polyether compounds and co-emulsifiers. The aqueous liquids may additionally comprise thickening agents.

If the carrier phase, i.e. the fluid provided by the tertiary supply container, of the droplets generated according to the present system is aqueous, then analysis and processing using standard instruments designed for use with cells, such as bacterial or mammalian cells, may be facilitated.

The sample buffer may be denoted the first fluid. The first fluid may comprise the sample buffer. The oil may be denoted the second fluid. The second fluid may comprise the oil. The continuous phase buffer, which may be referred to as the buffer, may be denoted the third fluid. The third fluid may comprise the buffer.

The enzyme may be provided in the sample buffer or separate from the sample buffer. An advantage of separate provision may be that the enzyme may be stored under different conditions, such as high glycerol concentrations, which may increase stability. An advantage of provision in sample buffer may be to facilitate use by simplifying pipetting steps and decreasing risk of errors.

The nucleotides may be provided in the sample buffer or separate from the sample buffer. An advantage of separate provision may be that the dNTP may be stored under different conditions, such as at higher concentrations, which may increase stability. An advantage of provision in sample buffer may be to facilitate use by simplifying pipetting steps and decreasing risk of errors.

The sample buffer may be of essentially the same osmolarity and/or comprise essentially the same concentrations of ions as the continuous phase buffer. Provision of such features may be advantageous since the concentrations of the components of the sample may otherwise change due to osmosis through the oil membrane. Changes in the concentration of sample or buffer components may lead to decreased efficiency of reactions performed in the droplets in subsequent steps. Swelling of the droplets due to osmosis may lead to droplets becoming too large for handling e.g. in a cell sorter. Examples of sample buffers may comprise ions such as $Na^+$, $Ka^+$, $Ca^{++}$, $Mg_{++}$, $NH_4^+$, $SO4^{--}$ and $Cl^-$, buffering compounds such as Tris-HCl, glycerol, Tween, nucleotides, and enzymes. A corresponding continuous phase buffer may comprise essentially the same concentrations of $Ka^+$, $Ca^{++}$, $Mg^{++}$, and $Cl^-$, glycerol and buffering compounds such as Tris-HCl as the sample buffer, but possibly not nucleotides or enzymes as the reaction occurs within the droplets.

An example of a suitable sample buffer is a buffer comprising 10 mM Tris-HCl, 57 mM Trizma-base, 16 mM $(NH_4)_2SO_4$, 0.01% Tween 80, 30 mM NaCl, 2 mM $MgCl_2$, 3% glycerol, and 25 μg/μL BSA. An example of a corresponding, suitable continuous phase buffer is a buffer comprising or consisting of 20 mM Tris-HCl (pH 9), 57 mM Trizma-base, 16 mM $(NH_4)_2SO_4$, 0.11% Tween 80, 30 mM NaCl, 2 mM $MgCl_2$, 3% glycerol, 1% PEG 35K, and 4% Tween 20.

Another example of a suitable sample buffer is a buffer comprising or consisting of 10 mM Tris-HCl, 57 mM Trizma-base, 16 mM $(NH_4)_2SO_4$, 0.01% Tween 80, 30 mM NaCl, 2 mM $MgCl_2$, 3% glycerol, and 25 μg/μL BSA, 0.2 mM dNTP, 0.2 μL primers, and 2 units Taq DNA polymerase. An example of a corresponding, suitable continuous phase buffer is a buffer comprising or consisting of 20 mM Tris-HCl (pH 9), 57 mM Trizma-base, 16 mM $(NH_4)_2SO_4$, 0.11% Tween 80, 30 mM NaCl, 3% glycerol, 1% PEG 35K, and 4% Tween 20.

The buffers may be provided two-fold concentrated, 10-fold concentrated or other concentrations. During use, the buffer may then be provided by dilution of the concentrated buffer to achieve a desired concentration, such as the concentrations in the above examples, before being loaded into the respective containers of the microfluidic device.

The density of the oil may be higher than the density of the continuous phase buffer. This may be to enable the droplets to sediment in the continuous phase buffer. This, in turn, may facilitate the collection of droplet from the bottom of the collection container. The density of the oil being higher than the density of the continuous phase buffer may prevent oil from evaporating at increased temperature, such as applied during PCR cycling. Another advantage of the density of the oil being higher than the density of the continuous phase buffer may be that if processing the droplets in a flow cytometer of cell sorter or other equipment for handling cells, the droplets may sediment like cells, which may facilitate handling.

An advantage of the present invention, such as the kit comprising an oil, wherein the oil has a density higher than the density of the sample buffer, may comprise that the resulting droplets may sediment in the collection container, e.g. in case the collection container is provided with a suitable recess, which in turn may facilitate collection of droplets from the collection container. The droplets sedimenting in the continuous phase buffer may additionally, or alternatively, result in droplets that are protected from evaporation by an upper layer of continuous phase buffer which in turn may increase droplet stability in reactions such as PCR reactions.

The assembly may be configured to carry out the method for providing double emulsion droplets according to the present invention.

The method for providing double emulsion droplets may comprise use of the microfluidic device according to the present invention.

The method for providing double emulsion droplets may comprise use of the microfluidic device according to the present invention. The method may comprise: providing a first fluid to the primary supply container of a first group of containers; providing, possibly subsequently, a second fluid to the secondary supply container of the first group of containers; providing a third fluid to the tertiary supply container of the first group of containers; and providing individual pressure differences between each of the respective supply containers of the first group of containers and the collection container of the first group of containers, such that the pressure within each of the individual supply containers of the first group of containers is higher than within the collection container of the first group of containers.

The method for providing double emulsion droplets may comprise: providing a primary flow of a first fluid from the primary supply container to the first fluid junction via: the primary supply inlet, the primary supply conduit, and the primary supply opening; and providing a secondary flow of a second fluid from the secondary supply container to the first fluid junction via: the secondary supply inlet, the secondary supply conduit, and the secondary supply opening; wherein the primary flow and the secondary flow provides a transfer flow of the first fluid and the second fluid from the first fluid junction to the second fluid junction via: the first transfer opening, the transfer conduit, and the second transfer opening.

The method for providing double emulsion droplets may comprise: providing a tertiary flow of a third fluid from the tertiary supply container to the second fluid junction via: the tertiary supply inlet, the tertiary supply conduit, and the tertiary supply opening; wherein tertiary flow and the transfer flow provides a collection flow of the first fluid, the second fluid, and the tertiary fluid, to the collection container via: the collection opening, the collection conduit, and the collection outlet.

The method for manufacturing a microfluidic device according to the present invention may comprise: changing surface property of a part of each of two parts of the microfluidic section; and joining the two parts of the microfluidic section by thermal bonding and/or clamping. The first part may be the base microfluidic piece and the second part is the capping piece of the microfluidic section. The method may comprise: manufacturing the first part in one piece; partially coating the areas of the first part and the second part corresponding to the first transfer conduit part or the first collection conduit part; and joining the two parts.

Surface modification of the microfluidic section may be necessary to achieve specific surface properties on the walls of the conduits. The surface modification may prevent adsorption of proteins such as enzymes, nucleotides, or ions onto the walls of the conduits or help to control the flow of hydrophobic or hydrophilic liquids.

Provision of the droplets may be realized in two steps. A water-in-oil droplet may be generated at the first fluid junction, requiring a hydrophobic surface in the area/conduit following the first fluid junction. An oil-in-water droplet, which oil part may contain water, may be formed at the second fluid junction, requiring a hydrophilic surface at this point in the area/conduit following the second fluid junction. Therefore, spatially-controlled modification of the surface of the conduit may be required. Alternatively, different materials in the different areas may be used, so that the inherent properties of the materials give the required surface properties at all positions of the fluid conduit network.

Different techniques may be used for the surface modification on a local part of the fluid conduit network. The method of choice may depend on the required stability of the surface modification, the material to modify, the compatibility of the surface modification with the chemicals in use and the configuration of the microchip when doing the surface modification. It may be desired to modify the entire circumference of a conduit, e.g. all four walls. An important criterion for the choice of surface modification method may be the effect on the material, as the method of surface modification should not damage the material or increase its roughness.

Polymer materials are in general hydrophobic, which may be defined by having a contact angle larger than 90°. Different techniques exist to change the surface from hydrophobic to hydrophilic, such as the deposition of chemicals, e.g. polymers, onto the surface or the modification of the surface itself, e.g. via exposure to plasma.

Surfaces of the conduits may be exposed to plasma, e.g. oxygen or air plasma for an appropriate amount of time, e.g. 1; 2; 5; 10 or more minutes. Reactive species/radical will come in contact with the surface and thereby the surface will become hydrophilic. Open reactive sites on the surface which may be used for grafting of further molecules.

A disadvantage of this process may be that surfaces will revert to their inherent hydrophobic properties with time. This means that treated devices may need to be used soon after surface modification.

A Hydrophobic surface may alternatively, or additionally, be exposed to UV light for an appropriate amount of time to obtain a hydrophilic surface. For example, Subedi, D. P.; Tyata, R. B; Rimal, D.; Effect of UV-treatment on the wettability of polycarbonate. Kathmandu University Journal of science, engineering and technology, Vol 5, No II, 2009, pp 37-41, have shown to treat polycarbonate with UV light for 25 min and obtain a decrease of the contact angle from 82° to 67°.

To achieve a more stable surface modification, i.e. a modification of the surface which lasts for an extended period, thereby providing an improved, i.e. a longer, shelf life of the devices, it may be desired to attach permanently molecules onto the surface, which attachment will make the surface hydrophilic.

UV-grafting to polymers may involve several steps, where for example a photoinitiator such as benzophenone is first deposited onto the surface and then the coating polymer is added. This may then be followed by illumination with UV-light where the polymer covalently binds to the surface (Kjaer Unmack Larsen, E. and N. B. Larsen (2013). "One-step polymer surface modification for minimizing drug, protein, and DNA adsorption in microanalytical systems." Lab on a Chip 13(4): 669-675).

In some examples, the UV-grafting of chemicals may be combined with a surface pre-treatment, e.g. with plasma oxidation.

Thin film may be deposited onto a substrate using physical vapor deposition (PVD), e.g. as described in https://www.memsnet.org/mems/processes/deposition.html. In this technique, the material to be deposited may be released from a target and directed onto the substrate to coat. Sputtering and evaporation are two techniques to release material from a target.

The advantage of sputtering over evaporation may be the low temperature at which the material may be released from the target. In sputtering, the target and substrate are placed in a vacuum chamber. Plasma may be induced between two electrodes. This ionizes the gas. Target material may be released in vapor form by the ionized ions of the gas and deposits on all surfaces of the chamber, among others the substrate.

Sputtering may be used to deposit thin films of chromium oxide onto polymers which makes their surface hydrophilic.

In contrast to PVD, thin films are deposited by chemical vapor deposition (CVD) due to a chemical reaction happening between different source gases. The product may then deposit onto all the walls of the chamber as well as the substrate. Different technologies are available for CVD. For example, plasma-enhanced CVD (PECVD) uses plasma to ionize gas molecules before the chemical reaction. PECVD uses lower temperatures than other CVD technologies, which represents a major advantage when coating a substrate not resistant to high temperatures. PECVD is widely used for the deposition of thin films in semiconductor applications. Materials that may be deposited are among others silicon dioxide ($SiO_2$) and silicon nitride (SixNy). Plasma Enhanced Chemical Vapor Deposition (PECVD) is described in e.g. http://www.plasma-therm.com/pecvd.html.

Liquid coating may be deposited onto a flat surface using spin coating. In spin coating, liquid material may be placed onto the middle of a substrate. During spinning, the liquid coating spreads uniformly onto the complete surface of the substrate. Different parameters such as rotation speed or time are responsible for the thickness of the deposited film.

This technique is commonly used for example for the deposition of photoresist onto wafers.

Yet another technique to deposit a coating onto a substrate is via spraying, where a stream comprising small droplets of liquid material may be directed onto the substrate. When sprayed onto a substrate comprising an open conduit, liquid coating may be allowed to dry before the capping piece or ceiling of the conduit is added. If applied accurately, spraying and drying of a liquid coating material onto the substrate may avoid masking of the substrate and the process may be more cost effective for large scale production.

Corona treatment, e.g. as described in http://www.vetaphone.com/technology/corona-treatment/, is a technique where a plasma may be generated at the tip of an electrode. This plasma modifies the polymer chains at the surface of the substrate, thereby increasing the surface energy and hence the wettability of the material.

Without further treatment, the substrate will revert to its inherent properties.

Another technique to make polymer surfaces hydrophilic is the UV/ozone treatment. This technique is typically used for the cleaning of surfaces from organic residues. Under UV/ozone treatment, the surfaces are photooxidized by UV-light and atomic oxygen and the surface molecules are modified (A. Evren Özçam, Kirill Efimenko, Jan Genzer, Effect of ultraviolet/ozone treatment on the surface and bulk properties of poly(dimethyl siloxane) and poly(vinylmethyl siloxane) networks, In Polymer, Volume 55, Issue 14, 2014, Pages 3107-3119). The UV/ozone treatment causes less damage to the surface than other treatment such as plasma treatment. Microfluidic chips may be made out of glass. The surface of glass is hydrophilic and water spreads on the surface. For the present invention, in the case of microfluidic conduits made of glass, the surface at the first transfer conduit part or the first collection conduit part has to be modified from hydrophilic to hydrophobic. Glass surfaces may be modified for example with silanes to obtain permanent modification of the surface. As described in https://www.pcimag.com/ext/resources/PCI/Home/Files/PDFs/Virtual_Supplier_Brochures/Gelest_Additives.pdf, different types of silanes exist that may lead to hydrophobic properties.

Modifying surface properties of the fluid conduit network at a predefined area, e.g. from hydrophobic to hydrophilic, may be realized before assembly of a substrate comprising the base microfluidic piece with a substrate comprising the capping piece.

A physical mask such as a metal or glass plate, a polymer sheet or any appropriate material, may be used to protect the areas that should not be exposed to the coating/surface modification treatment. The mask may be attached/brought in contact with the surface in any suitable way, such as be a hard or soft contact mask. The mask may also go into any of the ramified recesses to prevent coating material from leaking under the mask. The mask may be any material that may be used only once, e.g. in the case of a mask that is damaged/destroyed when removed from the surface, or reused a plurality of times.

This strategy may be used for methods involving a coating deposited in gas form or a physical treatment such as UV-exposure or a liquid coating deposited via sputtering or spray onto the surface.

After removal of the mask, a partially patterned conduit may be obtained.

For modifying all, such as four, walls of a fluid conduit, both the capping piece and the base microfluidic piece may need to be treated. Accurate alignment may be necessary to assure that the transition hydrophobic/hydrophilic will take place at the same position for all four conduit walls. Accurate alignment may not be necessary at the end, i.e. in the intended direction of flow, of the first transfer conduit part/the first collection conduit part.

An advantage of this strategy may be that a high number of devices may be treated at the same time. Moreover, the deposited coating material may be analyzed, e.g. thickness measurement, coating homogeneity after the coating process.

If the fluid conduit network is formed by the capping piece being positioned over the ramified recesses of the base microfluidic piece, i.e. is in a closed configuration, any liquid coating may be deposited very accurately in the conduit and will wet all four walls of the fluid conduit network.

To achieve a spatially controlled modification, flow confinement may be used using an inert fluid, i.e. a fluid which will not mix or interact with the liquid coating fluid.

Liquid coating material may be introduced via the tertiary supply conduit, while the rest of the fluid conduit network may be protected from exposure to the coating material using flow confinement with an inert liquid or with air, such as water or oil. While flowing in the conduit, the coating may be deposited on all walls of the fluid conduit network. This technique may require accurate flow control and does not enable measurement of the thickness of the deposited layer.

In some examples, the spatial patterning may be achieved by blocking the gaseous treatment from reaching some areas of the fluid conduit network. For example, for a closed part of the fluid conduit network, plasma oxidation may be limited by diffusion. Hence, if the diffusion may be limited in some areas of the fluid conduit network, the plasma will be denser in some areas compared to others. Therefore, some regions will be modified while others will not be affected by the plasma.

Limiting the diffusion to some areas of a closed conduit for plasma oxidation may be done in different ways, such as blocking the inlets close to the areas to protect or connecting a long conduit to the inlets close to the areas to protect, thereby increasing the resistance of the conduit which will prevent plasma from going into those regions of the microchip or any other methods This process may require an accurate spatial control of the plasma and yields a gradual transition between the hydrophobic and hydrophilic areas. Moreover, this treatment may not be stable over time as the treated regions reverse to their inherent hydrophobic properties within some hours, depending on the polymer material used.

The microfluidics section of the cartridge may be partially coated in at least a first transfer conduit part or a first collection conduit part.

The first transfer conduit part may refer to the zone immediately following the first fluid junction in the direction of the fluid flow, where formation of aqueous droplets in oil carrier fluid may occur. The first transfer conduit part may comprise the region from the center of the volume of the first fluid junction to the center of the second fluid junction or at least the region from 25 μm to 75 μm from the center of the first fluid junction in the direction of the fluid flow.

The first collection conduit part may refer to the zone immediately following the second fluid junction in the direction of the fluid flow, where formation of double emulsion aqueous droplets surrounded by an oil shell in an aqueous carrier fluid may occur. The first collection conduit part may comprise the region from the center of the volume of the second fluid junction to 250 μm from the center of the second fluid junction or at least the region from 25 μm to 75 μm from the center of the first fluid junction in the direction of the fluid flow.

The first transfer conduit part may be hydrophobic with a contact angle measured with water of at least 70°, such as 80° or 90°. If the first transfer conduit part is produced from a hydrophobic material such as a polymer, the first transfer conduit part may be uncoated. The first transfer conduit part may be treated in such a way that the contact angle is at least 70°, such as 80° or 90° after treatment.

The first collection conduit part may be hydrophilic with a contact angle measured with water of not more than 40°, such as not more than 30° or 20°. If the first transfer conduit part is produced from a hydrophilic material such as glass, the first transfer conduit part may be uncoated, i.e. the first transfer conduit part may be treated in such a way that the contact angle is not more than 40°, such as not more than 30° or 20° after treatment.

As conduit cross-sectional area may be very small in some areas, such as the junctions and filter areas of the microfluidic section, the coating may be very thin to have minimal effect on the cross-sectional area. A suitable thickness of the coating may be less than 1 μm such as less than 500 nm or less than 100 nm.

The fluidic cartridge may be made of polymer in all parts or be a hybrid between different materials such as a hybrid of different polymers or a polymer-glass hybrid. If a polymer-glass hybrid is used, the base container structure piece may be made of polymer while the microfluidic device may be made of glass.

The microfluidic cartridge may be manufactured from three or more separate parts which are subsequently assembled into a cartridge. The separate parts may include a base container structure piece, a microfluidic structure and a capping piece. The assembly of the parts may be performed using thermal bonding, heat stacking or similar techniques. An elastomer may be over-moulded onto either the base container structure piece, the microfluidic structure or both to ensure a pressure tight seal between the instrument and the cartridge and between the microfluidic structure and the base container structure piece.

The base container structure piece may be made using injection moulding. For injection moulding, a mould may be created by machining the negative shape of the base container structure piece in one or more blocks of e.g. METAL. The polymer may be melted and flows into the mould. Upon cooling, the polymer will retain the shape of the mould and will be ejected from the mould for use. The mould may be reused for a high number of parts. For injection moulding, different thermoplastics may be used such as poly(methyl methacrylate) (PMMA) or cyclic olefin copolymer (COC), or cyclic olefin polymer depending on the compatibility with the chemicals in use.

The base container structure piece may be provided using 3D printing techniques. Various 3D printing techniques are available, such as stereolithography or fused filament printing. Layers of material are deposited and cured onto each other creating the object. The base container structure piece may be 3D printed onto the microfluidics section.

Fabrication of the microfluidic device may be realized by different microfabrication methods, depending on the volume to produce, material of choice as well as the resolution required/smallest feature to pattern/create.

For low volumes, soft lithography and/or laser ablation may be used. For example, soft lithography of PDMS may alternatively, or additionally be used to fabricate the two substrates of the microfluidic device. The PDMS mixture may be poured over a mould containing the negative shape of the microstructure. After curing, the PDMS part and the mould are separated.

High precision micromachining alternatively, or additionally be used to create microstructures in a polymer substrate. However, typically the size of the microstructures cannot be below 50 μm and this technique may be time consuming.

For high production volumes, replication methods are often used including hot embossing, injection moulding among others or LIGA (German abbreviation: lithographie (Lithography), Galvanoformung (electroplating), Abformung (moulding)). Those methods involve the fabrication of a mould which contains the negative shape of the structure such as ramified recesses and possibly any additional feature on the substrate, e.g. holes for fluidic connection, alignment features, etc.

The mould may be produced using different techniques such as high precision micromachining, electrical discharge machining (EDM) or photolithography.

Photolithography may be the first step for the fabrication of the mould, followed by electroplating as described here. A silicon substrate may be coated with a layer of photoresist which then may be exposed to UV-light through a chromium mask to create a positive shape of ramified recesses. Nickel may then be deposited onto the photoresist by electroplating. The silicon wafer may then be chemically dissolved, e.g. using KOH. The mould insert may be diced and inserted into the microinjection moulding tool, which forms a cavity containing the negative shape of the ramified recesses.

After fabrication of the mould, polymer may be melted and flows in the microcavities of the mould. When the polymer cools down, it retains the shape of the mould. Critical parameters such as filling pressure and/or temperature need to be optimized to achieve a good replication of the mould and a correct demoulding/removal of the microstructured parts from the mould.

Assembly of the polymer substrate containing the conduit and of the polymer capping piece substrate may be necessary to create a closed and liquid tight conduit. The assembly of the substrate or closing of the conduit may be done irreversibly using various techniques, for example through thermobonding ultrasonic or laser welding, lamination. In thermobonding, the polymer substrates are heated slightly below glass transition temperature and high pressure may be applied to assemble the two substrates. The temperature, time and pressure parameters may have to be optimized so that the microstructure is not damaged by the process. For lamination, a thin laminate, e.g. 30 μm to 400 μm thick, with an adhesive surface, e.g. pressure sensitive adhesive, may be placed over the part of the conduit. Pressure may be applied uniformly over the whole surface to seal the laminate, using for example a roller.

Another method of irreversible closing of the conduit may be used for microstructures made of PDMS. The PDMS part may be assembled with a flat PDMS part or a glass substrate. After cleaning of those parts using a solvent, e.g. ethanol and/or isopropanol, the parts may be exposed to oxygen plasma for 1 minute. The two surfaces are then brought into contact to form an irreversible bond.

One or more parts of the microfluidic device, such as including the base microfluidic piece, may be made of glass. In this case, the fluid conduit network may be made using photolithography and anisotropic etching. Inlet holes may be made using sand/powder blasting.

Similar as for microchips made of polymers, glass microchips need to be closed to create a liquid tight conduit.

Assembly of the glass substrates may be done e.g. via anodic bonding.

The microfluidic section may comprise a first transfer conduit part and a first collection conduit part. The first transfer conduit part refers to the zone immediately following the first fluid junction in the direction of the fluid flow where formation of aqueous droplets in oil carrier fluid occurs. The first transfer conduit part may comprise the region from the center of the volume of the first fluid junction to the center of the second fluid junction or at least the region from 25 μm to 75 μm from the center of the first fluid junction in the direction of the fluid flow.

The first collection conduit part refers to the zone immediately following the second fluid junction in the direction of the fluid flow where formation of double emulsion aqueous droplets surrounded by an oil shell in an aqueous carrier fluid occurs. The first collection conduit part may comprise the region from the center of the volume of the second fluid junction to 250 μm from the center of the second fluid junction or at least the region from 25 μm to 75 μm from the center of the first fluid junction in the direction of the fluid flow.

DETAILED DESCRIPTION OF DRAWINGS

FIGS. 1-4 schematically illustrate various views of a first embodiment 100 of a microfluidic device according to the present invention.

The microfluidic device 100 comprises a microfluidic section 101 and a container section 102. The container section and the microfluidic section are fixedly connected to each other. The microfluidic section 101 comprises a plurality of microfluidic units 170. However, only one microfluidic unit 170 is illustrated in FIGS. 1-4. The container section 102 comprises a plurality of groups of containers 171 comprising one group of containers 171 for each microfluidic unit 170. However, only one group of containers 171 is illustrated in FIGS. 1-4.

Each microfluidic unit 170 comprises a fluid conduit network 135 comprising: a plurality of supply conduits 103, 106, 109; a transfer conduit 112; a collection conduit 116; a first fluid junction 120; and a second fluid junction 121.

The plurality of supply conduits comprises: a primary supply conduit 103; a secondary supply conduit 106 comprising a first secondary supply conduit 106*a*; and a tertiary supply conduit 109 comprising a first tertiary supply conduit 109*a*. The transfer conduit comprises a first transfer conduit part 115 having a first affinity for water. The collection conduit comprises a first collection conduit part 119 having a second affinity for water being different from the first affinity for water.

The first fluid junction 120 provides fluid communication between the primary supply conduit 103, the secondary supply conduit 106, and the transfer conduit 112. The first transfer conduit part 115 extends from the first fluid junction 120.

The second fluid junction 121 provides fluid communication between the tertiary supply conduit 109, the transfer conduit, and the collection conduit 116. The first collection conduit part 119 extends from the second fluid junction 121.

The primary supply conduit 103 extends from a primary supply inlet 104 to a primary supply opening 105. The secondary supply conduit 106 comprises a first secondary supply conduit 106*a* extending from a secondary supply inlet 107 to a first secondary supply opening 108*a*. The tertiary supply conduit 109 comprises a first tertiary supply conduit 109*a* extending from a tertiary supply inlet 110 to a first tertiary supply opening 111*a*. The transfer conduit 112 extends from a first transfer opening 113 to a second transfer opening 114. The transfer conduit 112 comprises a first transfer conduit part 115 extending from the first transfer opening 113. The first transfer conduit part 115 has a first affinity for water. The collection conduit 116 extends from a collection opening 117 to a collection outlet 118. The collection conduit 116 comprises a first collection conduit part 119 extending from the collection opening 117. The first collection conduit part 119 has a second affinity for water being different from the first affinity for water.

The fluid conduit network 135 comprises a first fluid junction 120 and a second fluid junction 121. The first fluid junction 120 is a junction of a plurality of openings comprising a first plurality of openings for leading fluid into the first fluid junction 120 and the first transfer opening 113 for leading fluid out of the first fluid junction 120. The first plurality of openings comprises the primary supply opening 105 and the first secondary supply opening 108*a*. The second fluid junction 121 is a junction of a plurality of openings comprising a second plurality of openings for leading fluid into the second fluid junction 121 and the collection opening 117 for leading fluid out of the second fluid junction 121. The second plurality of openings comprises the second transfer opening 114 and the first tertiary supply opening 111*a*.

The container section and the microfluidic section being fixedly connected to each other such that each group of containers is fixedly connected to a respective corresponding microfluidic unit.

Each group of containers 171 comprises a plurality of containers comprising: a plurality of supply containers; and a collection container 134. The collection container 134 is in fluid communication with the collection outlet 118 and the collection conduit 116 of the corresponding microfluidic unit 170. The plurality of supply containers comprises a primary supply container 131, a secondary supply container 132, and a tertiary supply container 133. The primary supply container 131 is in fluid communication with the primary supply inlet 104 and the primary supply conduit 103 of the corresponding microfluidic unit 170. The tertiary supply container 133 is in fluid communication with the tertiary supply inlet 110 and the tertiary supply conduit 109 of the corresponding microfluidic unit 170. The secondary supply container 132, is in fluid communication with the secondary supply inlet 107 and the secondary supply conduit 106 of the corresponding microfluidic unit 170.

FIGS. 5-10 schematically illustrate various views of a microfluidic unit 570 of a second embodiment of a microfluidic device according to the present invention.

The embodiment of the microfluidic unit 570 is similar to the microfluidic unit 170. The main difference is that for the microfluidic unit 570, the secondary supply conduit 506 comprises a second secondary supply conduit 506*b* in addition to the first secondary supply conduit 506*a*. Furthermore, the tertiary supply conduit 509 comprises a second tertiary supply conduit 509*b* in addition to the first tertiary supply conduit 509*a*.

With reference to FIG. 6, it is illustrated that the cross-sectional area of an opening, e.g. 513, between the first fluid junction 520 and the transfer conduit 512 is between 50% and 100% of the cross-sectional area of an opening, e.g. 517, between the second fluid junction 521 and the collection conduit 516.

With reference to FIG. 7, there is illustrated: a method for providing double emulsion droplets. For provision of double emulsion droplets the method comprises use of the microfluidic device according to the present invention. The method may comprise: providing a first fluid to the primary supply container of a first group of containers; providing, possibly subsequently, a second fluid to the supply container of the first group of containers, which supply container is in fluid communication with the secondary supply conduit of the corresponding microfluidic unit, such as the primary supply container or the secondary supply container, if such is provided; providing a third fluid to the tertiary supply container of the first group of containers; and providing individual pressure differences between each of the respective supply containers of the first group of containers and the collection container of the first group of containers, such that the pressure within each of the individual supply containers of the first group of containers is higher than within the collection container of the first group of containers.

The method for providing double emulsion droplets may comprise: providing a primary flow 522 of a first fluid from the primary supply container to the first fluid junction 520 via: the primary supply inlet, the primary supply conduit, and the primary supply opening; and providing a secondary flow 523 of a second fluid from the secondary supply container to the first fluid junction 520 via: the secondary supply inlet, the secondary supply conduit 506, and the secondary supply opening; wherein the primary flow and the secondary flow provides a transfer flow of the first fluid and the second fluid from the first fluid junction 520 to the second fluid junction 521 via: the first transfer opening, the transfer conduit, and the second transfer opening.

The method for providing double emulsion droplets may comprise: providing a tertiary flow 523 of a third fluid from the tertiary supply container to the second fluid junction via: the tertiary supply inlet, the tertiary supply conduit, and the tertiary supply opening; wherein tertiary flow and the transfer flow provides a collection flow of the first fluid, the second fluid, and the tertiary fluid, to the collection container via: the collection opening, the collection conduit, and the collection outlet.

FIG. 8 schematically illustrates the part of the fluid conduit network illustrated in FIG. 6, indicating areas of the fluid conduit network where the first and second affinity for water, respectively, is required. The first transfer conduit part 515 has the first affinity for water. The first collection conduit part 519 has the second affinity for water.

FIGS. 9 and 10 schematically illustrate various examples for achieving the desired affinity for water at both the desired locations indicated in FIG. 8. The various examples comprise: a first example 956 of region provided with coating; a second example 957 of region provided with coating; a third example 958 of region provided with coating; a fourth example 1059 of region provided with coating; a fifth example 1060 of region provided with coating; and a sixth example 1061 of region provided with coating.

The first, second, and third examples are for a situation where the affinity for water is as desired as provided by the respective substrate for the first transfer conduit part 515. All of the first, second, and third examples comprises coating on the area 519.

The fourth, fifth, and sixth examples are for a situation where the affinity for water is as desired as provided by the respective substrate for the first collection conduit part 519. All of the fourth, fifth, and sixth examples comprises coating on the area 515.

FIG. 11 schematically illustrates an example of a junction, such as a first fluid junction 1120, of a microfluidic device according to the present invention.

FIG. 12 schematically illustrates a cross-sectional top view of a microfluidic unit of a third embodiment of a microfluidic device according to the present invention.

The embodiment of FIG. 12 differs from the embodiment of FIG. 5 by comprising filters 1323, 1324, and 1325. The microfluidic unit 1370 comprises: a primary filter 1323 at or within the primary supply conduit/the primary supply inlet 1304; a secondary filter 1324 at or within the secondary supply conduit/the secondary supply inlet 1307; and a tertiary filter 1325 at or within the tertiary supply conduit/the tertiary supply inlet 1310.

FIG. 13 schematically illustrates a cross-sectional top view of a plurality of microfluidic units of the third embodiment comprising the microfluidic unit 1370 illustrated in FIG. 12.

FIG. 14 schematically illustrates an isometric sectional view of a part of a conduit of microfluidic device according to the present invention. The illustrated part of the conduit may be applied to any of the embodiments of a microfluidic device according to the present invention.

One or more parts or all of each fluid conduit network of any embodiment of a device according to the present invention may form an acute trapezoidal cross section as illustrated in FIG. 17, wherein the longer base edge is provided by the capping part 1427. The acute trapezoidal cross section may form an isosceles trapezoidal cross section, wherein the side walls 1428 of equal length may have a tapering of at least 5 degrees and/or at most 20 degrees 1429 with respect to a normal of either of the parallel base edges.

The parts 1427 and 1426 are shown slightly exploded for illustrative purposes. The microfluidic section comprises a first planar surface and a capping piece 1427 comprising a second planar surface, the first planar surface having a plurality of ramified recesses 1430 providing a base part of each fluid conduit network of the microfluidic device. The second planar surface faces the first planar surface and provides a capping part of each fluid conduit network of the microfluidic device.

FIG. 15 schematically illustrates a cross-sectional top view of a supply inlet 1504 of microfluidic device according to the present invention showing a filter 1525 similar to the filters of FIGS. 12 and 13.

FIGS. 16-20 schematically illustrate various views of a fourth embodiment 1700 of a microfluidic device according to the present invention.

FIG. 16 schematically illustrates an isometric and simplified view of a part of a fourth embodiment of a microfluidic device according to the present invention. FIG. 17 schematically illustrates an exploded view of the simplified part of the fourth embodiment illustrated in FIG. 16.

With reference to FIGS. 16 and 17, there is illustrated: a method for manufacturing a microfluidic device according to the present invention. The method comprises fixing the container section 1702 and the microfluidic section 1701 to each other, such that fluid communication is provided between the individual containers of each group of containers via the corresponding respective microfluidic units.

FIG. 18 schematically illustrates an isometric view of the fourth embodiment of a microfluidic device according to the present invention.

FIG. 19 schematically illustrates a top view of the fourth embodiment illustrated in FIG. 18.

FIG. 20 schematically illustrates a cross-sectional side view of the fourth embodiment illustrated in FIGS. 18 and 19.

FIG. 21 schematically illustrates a cross-sectional side view of a container and a corresponding part of a microfluidic unit of a microfluidic device according to the present invention when connected to a receptor 2142 (cf. 2342 of FIG. 23) of an assembly according to the present invention.

FIG. 22 schematically illustrates an exploded view of the illustration of FIG. 21.

FIG. 23 schematically illustrates a first embodiment of an assembly 2390 according to the present invention.

The assembly 2390 comprises a receptor 2342 and a pressure distribution structure 2399. The receptor is configured to receive and hold a microfluidic device according to the present invention. The pressure distribution structure is configured to supply pressure to the microfluidic device when held by the receptor. The pressure distribution structure comprising: a plurality of container manifolds 2353 comprising a primary container manifold and a tertiary container manifold; a plurality of line pressure regulators 2350 comprising a primary line pressure regulator and a tertiary line pressure regulator; and a main manifold 2353. The primary container manifold is configured to be coupled to each primary supply container of the microfluidic device. The tertiary container manifold is configured to be coupled to each tertiary supply container of the microfluidic device. The primary line pressure regulator is coupled to the primary container manifold. The tertiary line pressure regulator is coupled to the tertiary container manifold. The main manifold is coupled to each container manifold via the respective line pressure regulators.

FIG. 24 shows an image of fluid from a collection container of a microfluidic device according to the present invention.

FIG. 25 shows an image of a plurality of collection containers of a microfluidic device according to the present invention.

FIG. 26 schematically illustrates a first embodiment of a kit according to the present invention.

An advantage with the present invention when comprising an intermediate chamber may be facilitation of a simpler manufacturing process and/or facilitation of usage of less material, e.g. compared to a microfluidic device having more containers than the microfluidic device according to the present invention.

An advantage with the present invention when comprising an intermediate chamber may be facilitation of improved and/or different separation of different fluids, i.e. e.g. the first fluid and the second fluid, contained by the microfluidic device prior to formation of emulsions, such as single emulsions.

An advantage with the present invention when comprising an intermediate chamber may be that the second fluid, which may be provided to the primary supply container after the first fluid has been provided to the intermediate chamber, may displace the first fluid in the intermediate chamber during formation of emulsion droplets, whereby a more complete process may be achieved. A complete process may be considered a process where all of the first fluid has been emulsified and, for formation of single emulsions, being dispersed in the second fluid being in a continuous phase. The second fluid may force any remnants of the first fluid through the fluid conduit network during emulsion formation, which may enable that all or a at least a majority of the first fluid may be processed by the device according to the invention and may be provided to the collection container e.g. in form of droplets.

An advantage with the present invention when comprising an intermediate chamber may be facilitation of an environment, such as the intermediate chamber, which may be better controlled than a supply container, e.g. in terms of temperature and/or by being shielded from contamination and/or reactions caused by ambient air and/or particles in the ambient air.

Accordingly, the time that lapses between providing the first fluid to the microfluidic device according to the present invention may be less critical to keep short compared to prior art solutions.

The microfluidic device and/or any method according to the present invention may be structurally and/or functionally configured according to any statement of any desire of the present disclosure.

The volume of each fluid conduit network may be between 0.05 μL and 2 μL, such as between 0.1 μL and 1 μL, such as between 0.2 μL and 0.6 μL, such as around 0.3 μL.

It may be desired that the second fluid is provided to the first fluid junction before the first fluid is provided to the first fluid junction. This may be to facilitate that even the first part of the first fluid being provided to the first fluid junction may be emulsified. It may be desired that all the first fluid is emulsified.

It may be desired that the intermediate chamber has a larger volume than the volume of the first fluid as provided to the intermediate chamber at a time, such as the intended volume of the first fluid to be provided to the intermediate chamber.

The intermediate chamber of a microfluidic network may constitute the primary supply conduit. Alternatively, the intermediate chamber may form part of the primary supply conduit. The primary supply conduit may comprise a connection conduit provided between the intermediate chamber and the first fluid junction. The connection conduit may be configured to extend the time it takes from a pressure difference is applied between the intermediate chamber and the collection container and until the first fluid arrives at the first fluid junction. This may facilitate that the second fluid arrives at the first fluid junction before the first fluid, which may in turn result in all of the first fluid being emulsified in the second fluid.

The connection conduit may be provided with a volume which is larger than the volume of the secondary supply conduit. The volume of the connection conduit may be between 0.05 μL and 1 μL, such as between 0.1 and 0.5 μL.

Each fluid conduit network may be configured such that the fluid resistance of the connection conduit is larger than the fluid resistance of the secondary supply conduit.

Processing of the first fluid may refer to emulsification of the first fluid.

The volume of the intermediate chamber may be defined as the volume of a fluid, e.g. water, which may be contained within the intermediate chamber. It may be desired that the intermediate chamber has a minimal volume, since the volume of the intermediate chamber may define an upper limit of a volume of the first fluid to be processed at a time. The intermediate chamber may for instance have a volume of at least 2 μL, 3 μL, 4 μL, 5 μL, 6 μL, 10 μL, 15 μL, 20 μL, 50 μL, or 100 μL. However, there may be several reasons to provide an intermediate chamber with a maximal volume. The intermediate chamber may for instance have a volume of at most 1 mL, 500 μL, 400 μL, 200 μL, or 100 μL.

A higher volume of the intermediate chamber may increase the required minimal outer dimensions of the intermediate chamber and/or may increase the time it takes for a fluid to be pulled from the intermediate chamber to the intermediate chamber and/or may put further requirements to the material used for the intermediate chamber, such as the material used for the fluid conduit network and/or the structural complexity of the intermediate chamber. A requirement to the material used may for instance include a requirement regarding the affinity for water for the respective surfaces. Affinity for water may be known as wettability for water. A high affinity for water may refer to high wettability for water. A low affinity for water or lack of affinity for water may refer to a low wettability for water.

Accordingly, a desired volume for the intermediate chamber may be considered a compromise.

For instance, for facilitation of manufacturing of the microfluidic device, such as in particular the microfluidic section, it may be desired that each intermediate chamber is provided within a common layer, which may be denoted an "intermediate chamber layer". Such intermediate chamber layer may have a longer extension along two orthogonal axes than along a third orthogonal axis.

Each first intermediate chamber may have a width of at least: 2 mm, 3 mm, 4 mm, or 5 mm, and/or at most: 8 mm, 7 mm, or 6 mm. The maximal width of each intermediate chamber may e.g. be of relevance for a microfluidic device having a plurality of sample lines being configured for use with a standard multichannel pipette, e.g. a standard multichannel pipette having a nozzle spacing of 9 mm.

Each first intermediate chamber may have a depth of at least: 0.02 mm, 0.05 mm, 0.1 mm, 0.25 mm, 0.5 mm, or 0.7 mm, and/or at most: 2 mm, 1.5 mm, 1 mm, or 0.7 mm.

Each first intermediate chamber may have a longitudinal extension of at least: 5 mm, 6 mm, 8 mm, 10 mm, 15 mm, or 20 mm, and/or at most: 150 mm, 120 mm, 100 mm, 80 mm, or 50 mm.

Each first intermediate chamber may have a cross-sectional area perpendicular to the longitudinal extension of at least: 0.1 $mm^2$, 0.2 $mm^2$, 0.25 $mm^2$, 0.5 $mm^2$, 1 $mm^2$, or 2 $mm^2$, and/or at most 4 $mm^2$.

Each first intermediate chamber may be: 0.1 mm to 1 mm deep; 3 mm to 8 mm wide; and 5 mm to 25 mm long.

Each first intermediate chamber may be: 0.25 mm to 0.8 mm deep; 4 mm to 7 mm wide; and 7 mm to 15 mm long.

Each first intermediate chamber may have rounded corners and/or inclined side walls.

Provision of a first intermediate chamber may simplify production of the microfluidic device, e.g. compared to more structural complex solutions.

The primary supply container of each group of containers may comprise a bottom part, such as a flat bottom part. The bottom part may have a primary through hole and a secondary through hole. The primary through hole may provide fluid communication between the primary supply container and the intermediate chamber of the corresponding microfluidic unit. The secondary through hole may provide fluid communication between the primary supply container and the secondary supply conduit. The primary through hole and the secondary through hole of a primary supply container may be provided at least 2 mm apart, such as at least 3 mm apart, such as at least 5 mm apart. It may be desired to have the primary through hole and the secondary through hole of a primary supply container being provided as far from each other as possible. Accordingly, the width of the bottom part of the primary supply container may determine the possible separation of the primary through hole and the secondary through hole of the primary supply container. The width of the bottom of a primary supply container may for instance be 7 mm in diameter.

The first fluid may be provided, e.g. using a pipette, within and possibly exceeding the primary through hole, but without being provided within the secondary through hole. Accordingly, the first fluid may be pulled into the intermediate chamber without being pulled into the secondary supply conduit.

The primary through hole may taper towards a side-wall of the primary supply container. This may enable that the end-point of a pipette, which is inserted into the primary supply container and towards the primary through hole, may be directed towards the part of the primary through hole being furthest from the secondary through hole, which may facilitate provision of the first fluid to the intermediate chamber, such that of the fluid provided to the primary supply conduit may be pulled into the intermediate chamber.

At least a part of the microfluidic section, such as comprising the base microfluidic piece, may comprise or be made of or provided in poly(methyl methacrylate), abbreviated PMMA. At least a part of the container section, such as comprising the base container structure piece, may comprise or be made of or be provided in PMMA. For instance, the base microfluidic piece and the base container structure piece may be provided in PMMA.

It may be desired to provide at least a part of the microfluidic section and at least a part of the container section in the same material.

PMMA may be advantageous for fabrication because PMMA may be patterned using many different methods relevant both for prototyping and for high volume production, such as injection moulding, laser cutting, and machining.

PMMA may be advantageous for fabrication because it has a low glass transition temperature. Accordingly, it may be bonded at low temperature.

PMMA may be advantageous because it is may be adequately transparent within the visual spectrum to enable visual inspection of the process going on within the microfluidic device, which may be desired.

PMMA may be advantageous because it may be adequately UV-resistant. This may for instance be of relevance for storing in direct sunlight and/or in case of use with coatings requiring a UV curing step during production.

However, it may not be obvious to choose PMMA, since the material may provide disadvantages leading away from choosing this material. These disadvantages may include any one or combination of the following: low chemical resistance, PMMA may for instance not be resistant to solvents such as ethanol; brittleness may be relative high; relative low impact resistance; relative low temperature tolerance, PMMA may not tolerate high temperatures, has a glass transition temperature of 85° C. to 165° C.

The microfluidic device according to the present invention may comprise a base microfluidic piece and a base container structure piece. The base microfluidic piece and the base container structure piece may be provided in the same material, e.g. PMMA.

The base microfluidic piece may form a base part of the microfluidic section. The base microfluidic piece may be provided with a first planar surface having a plurality of ramified recesses providing a base part of each fluid conduit network of the microfluidic device.

The base container structure piece may form a base part of the container section. Sidewalls of each container may be formed protruding extensions of the base container structure piece. The base container structure piece may be formed in one piece, e.g. by being moulded. The base container structure piece may form a second planar surface facing the first planar surface of the base microfluidic piece. The microfluidic device may be provided with an adhesive layer between the first planar surface and the second planer surface. This may facilitate that the container section and the microfluidic section forms a fixedly connected unit and/or that each fluid conduit network do not have any undesired leaks at any boundary between the base microfluidic piece and the base container structure piece and/or facilitate a pressure tight connection.

One or more parts or all of each fluid conduit network may form an acute trapezoidal cross section, wherein the longer base edge is provided by the capping part. The acute trapezoidal cross section may form an isosceles trapezoidal cross section, wherein the side walls of equal length may have a tapering of at least 5 degrees and/or at most 20 degrees with respect to a normal of either of the parallel base edges.

At least a majority of each intermediate chamber may be provided at a desired distance from a bottom part of the microfluidic device. This desired distance may be such that any material between at least a majority of the intermediate chamber and the bottom part of the microfluidic device is less than 5 mm, such as less than 2 mm, such as less than 1 mm.

At least a majority of each intermediate chamber may be provided within 4 mm, such as within 2 mm, from a bottom part of the microfluidic device.

The microfluidic device may be configured to be placed on and/or coupled with a thermal surface that may provide thermal transfer with the microfluidic device, such as by cooling down the part of the microfluidic device being closest to the thermal surface. A bottom part of the microfluidic device, such as a bottom part of the microfluidic section, may be flat. A bottom part of the microfluidic section may be the part furthest from and/or facing away from the container section. A flat bottom part of the microfluidic device may be placed on a flat thermal surface. A cold thermal surface may provide thermal transfer with the first fluid, e.g. comprising a sample, which may be heat sensitive. Accordingly, a reaction may be prevented or impeded from starting until the first fluid is emulsified. If the entire microfluidic device is cooled, then the second fluid, e.g. oil, will also be cold, will become more viscous, and the flow rate hereof will decrease or stop completely, which will hinder or make emulsification of the first fluid difficult.

An advantage with the present invention when comprising an intermediate chamber may be facilitation or impediment of some reactions which may occur to a fluid contained by the microfluidic device prior to formation of emulsions. It may for instance be desired that the different fluids used with the microfluidic device are kept at different temperatures, e.g. at least until emulsion of the fluids are provided by means of the device. For instance, it may be desired that the first fluid, such as a water based fluid, such as comprising a sample, is kept at a lower temperature than the second fluid, such as an oil based fluid. The first fluid may comprise a heat sensitive sample. A sample may for instance be heat sensitive since a reaction within the sample may be triggered and/or intensified by heat, which may be undesired to occur prior to the formation of emulsions. It may be desired that the second fluid has a higher temperature than the first fluid, e.g. it may be desired that the second fluid is at room temperature, such as around 20° C., since the viscosity of e.g. oil may increase with decreased temperature, which may prevent or impede the oil from flowing through a respective fluid conduit network of the microfluidic device and/or which may require higher force, such as a higher applied pressure, for driving the oil through the fluid conduit network. The microfluidic device according to the present invention may facilitate some or all of the above-mentioned, in particular by provision of the intermediate chamber according to the present invention.

The method according to the present invention for providing emulsion droplets may comprise use of the microfluidic device according to the present invention when comprising the intermediate chamber. The method may comprise providing the first fluid to the intermediate chamber of a first group of containers and, e.g. subsequently, providing the second fluid to the secondary supply container of the first group of containers and subsequently providing a pressure difference between the secondary supply container of the first group of containers and the collection container of the first group of containers, such that the pressure within the secondary supply container of the first group of containers is higher than within the collection container of the first group of containers.

Accordingly, the pressure difference between the secondary supply container of the first group of containers and the collection container of the first group of containers may: provide a primary flow of the first fluid from the intermediate chamber of the corresponding microfluidic unit to the corresponding first fluid junction; and provide a secondary flow of the second fluid from the secondary supply container of the first group of containers to the first fluid junction via the secondary supply conduit.

The primary flow and the secondary flow may provide a collection flow of the first fluid and the second fluid to the collection container via the transfer conduit.

An advantage with the present invention when comprising an intermediate chamber may be that application of pressure difference between the one or more supply containers and the collection container may be simpler and/or easier, e.g. compared to a microfluidic device having more containers, e.g. for each sample line, than the microfluidic device according to the present invention.

It may be an object of the present invention to facilitate production of a microfluidic device.

Throughout the present disclosure, terms such as any of: up/down, upper/lower, top/bottom, and upper side/underside may be in relation to the orientation of the microfluidic device during the intended use thereof, i.e. during processing of fluids for provision of emulsion droplets. Similar may apply for terms such as height/width/length and horizontal plane. Height and depth may be used interchangeably. Furthermore, an inclining surface may refer to an inclination in relation to the horizontal plane.

However, whenever referring to a conduit or another fluidic/microfluidic structure being provided by a recess in a flat surface part and e.g. being caped by another flat surface part, e.g. as illustrated in FIG. 14, the term bottom may refer to the lowermost part of the recess and the term top may refer to the another surface part providing the capping part of the respective conduit or another structure.

Whenever materials are defined as being "the same", it may be understood as substantially the same. For instance, to pieces, such as the top piece, and the bottom piece, may be referred to as being of the same material even if one, more, or all of them have a coating applied, which coating may be different from any material of the two pieces.

The term "base material" may e.g. refer to a substrate, which may or may not be coated, e.g. coated on a part of the surface thereof.

The diameter of any conduit part may be understood as a pseudo-diameter ($D_p$). A pseudo-diameter may be based on the cross-sectional area ($A_{cs}$) at the respective part. If the respective part does not have the same cross-sectional area throughout the extension of the respective part, an average cross-sectional area may be utilized. The pseudo-diameter may be defined based on the respective cross-sectional area as follows: $D_p=2\sqrt{(A_{cs}/\pi)}$.

Throughout the present disclosure the terms first, second, and third, as well as the terms primary, secondary, tertiary, as well as any combination hereof does not necessarily indicate any timing and/or prioritizing of the respective events, steps, or features. Accordingly, one event, such as a first event, may occur before, during, or after another event, such as a second event, or the one event may occur at any combination of before, during, and after the other event.

Throughout the present disclosure, whenever a range is defined as being between a first value and a second value, the first value and the second value are regarded as being part of the range, unless otherwise is explicitly stated.

An orifice may be understood as a passage, such as a fluid passage.

Height (or depth) to width ratio of at least the first transfer conduit part and/or the first collection conduit part and/or the entire "microfluidic part" may have a value of at least 0.7 and/or at most 1.4, such as at least 0.8 and at most 1.2, such as at least 0.9 and at most 1.1, such as around 0.9. This may be to facilitate production. If the ratio is too much above 1, e.g. above 1.4, production may prove difficult. E.g. for injection moulding, it may be difficult to separate the mould and the substance being shaped by the mould if the ratio is outside a desired range. E.g. for milling, it may be difficult to provide a milling device, e.g. a drill, having the required strength to length ratio if outside the desired range. It may be desired that the ratio is not too much lower than 1, such as lower than 0.7, because the risk of "sagging" of a cover part of a recess forming a conduit, which otherwise may reduce height of the conduit part or may be blocking the conduit completely or partly, as these effects may increase at lower height to width ratios.

A conduit may be referred to as a channel. Any conduit and/or any part of the fluid conduit network may be defined in terms of four sides: a bottom part, a top part, and two side walls.

Unless otherwise stated, a reference to an affinity for water for a conduit or a part thereof, may refer to an average, e.g. weighted with respect to the percentage of the circumference that the respective part of the circumference has, such as for each of four sides.

The sidewalls of a recess of a conduit of the fluid conduit network may be inclining at least 1 degree, such as at least 2 degrees, such as 3-4 degrees, with respect to a vertical direction and such that the bottom of the recess is more narrow than the top of the recess. The sidewalls, e.g. sidewalls of equal length, may have a tapering of at least 1 degree and/or at most 20 degrees with respect to a normal of either of the parallel base edges.

The microfluidic device may be provided in one piece, e.g. by being 3D-printed. However, the current state of the art, such production method may not be cost effective and may be time consuming.

Accordingly, it may be an object of the present invention to facilitate production, e.g. by provision of a plurality of components forming the microfluidic device by being bonded together.

The microfluidic device may comprise a plurality of components bonded together. The plurality of component may include a first component and a second component. The first component and the second component may form the fluid conduit network between them, e.g. by a ramified recess in one of the two components being capped by a flat surface by the other component. The first and second component may be bonded together. The one component comprising the ramified recess may be referred to as a "base microfluidic piece" while the other component may be referred to as a "capping piece". The first and second component may, e.g. when bonded together, be referred to as a "microfluidic structure".

The first and second component may, e.g. when bonded together, be referred to as a "base microfluidic piece" or a "microfluidic structure" if being connected to, or if being configured for being connected to, a third component forming part of the plurality of components and comprising at least the secondary supply container and. In such setup, the third component may be referred to as the "base container structure piece", or "container structure piece" or similar.

A component comprising at least the secondary supply container may be denoted "base container structure piece".

In any event, the components forming the plurality of components, such as the first, second and e.g. third component, may be referred to according to their vertical order when assembled and when the microfluidic device has the intended orientation during the intended use. Accordingly, the plurality of components may comprise a top component, a bottom component, and possibly an intermediate component. The first and second component may comprise the bottom and the intermediate component, or vice versa. The first and second component may comprise the top and the intermediate component, or vice versa.

The plurality of components may be provided in the same material.

A component covering the recesses forming the fluid conduit network may be denoted a cover layer/piece or a capping layer/piece.

The term "piece" may be utilized instead of "component", or vice versa.

A top side and a bottom side of a component/piece may be referred to according to their vertical orientation when assembled and when the microfluidic device has the intended orientation during the intended use The intermediate component may be denoted a "through hole piece", e.g. if comprising a plurality of through holes connecting the respective containers of the top component to respective microfluidic structures provided between the through hole piece and the bottom piece.

The microfluidic device may comprise at least two pieces comprising a base container structure piece and a bottom piece, which are fixedly connected to each other such that each group of containers is fixedly connected to a respective corresponding microfluidic unit, wherein the container section is provided by the base container structure piece, and wherein the microfluidic section is provided by at least two pieces of the at least two pieces.

The recesses of "the microfluidic structure" may be provided in the top side of the bottom piece, e.g. with the bottom side of the base container structure piece function as a lid.

The recesses of "the microfluidic structure" may be provided in the bottom side of the base container structure piece, e.g. with the top side of the bottom piece function as a lid below, wherein the base container structure piece may comprise a ramified recess for each microfluidic unit.

The at least two pieces forming the microfluidic section, e.g. one pieces with recesses and one pieces providing a lid of the recesses, thereby forming conduits, may be provided in different materials. For bonding the two pieces adhesive may be utilized.

One of the two pieces may be provided in a base material having the first affinity for water. The other of the two pieces may be provided in a base material having the second affinity for water. Accordingly, depending on the needed affinity for water at the first transfer conduit part and the first collection conduit part, respectively, the first pieces may be coated at the zone thereof corresponding to the first transfer conduit part or the first collection conduit part, while the second pieces may be coated on the one of the first transfer conduit part or the first collection conduit part that is not coated on the first pieces.

For instance, if utilizing a hydrophobic substrate as the first piece, e.g. recess-pieces, in order to make water-in-oil-in-water droplets, a hydrophilic coating may be needed at the zone thereof providing the first collection conduit part. Use of a hydrophilic cover substrate as the second pieces, e.g. cover layer, may then need a hydrophobic coating at the area where the first transfer conduit part is provided.

The microfluidic device may comprise at least three pieces comprising a through hole piece, e.g. in addition to a base container structure piece and a bottom piece. Recesses of "the microfluidic structure" may be provided in the bottom side of the through hole piece e.g. with the top side of the bottom piece function as a lid below. Alternatively, the recesses of "the microfluidic structure" may be provided in the top side of the bottom piece e.g. with the through hole piece function as a lid above.

The first and second component may be bonded, e.g. thermally bonded, chemically bonded, or thermo-chemically bonded. Subsequently, a container structure may be bonded thereto, e.g. by laser welded, e.g. through the bottom of the containers. Alternative to laser welding may comprise a connection of the container structure piece with the below structure using adhesives.

The present invention may comprise connection of two pieces using laser welding, the two pieces may e.g. be the base container structure piece and the pieces provided immediately below, e.g. the through hole piece or the bottom piece.

When connecting two pieces using laser welding, one of the two pieces may comprise a laser light absorbing additive, e.g. black or blue colour pigments, while the other pieces may allow the respective laser light to pass without being absorbed or by being absorbed considerably less, e.g. by being clear. The absorbance of one of the two materials may e.g. be at least 10 times higher, such as at least 20 times higher, than the absorbance of the other material.

For instance, laser welding may be carried out through the base container structure piece, wherein the base container structure piece may be clear while the pieces or piece below, e.g. intermediate piece and/or bottom pieces, may contain an additive that absorbs the laser light e.g. black or blue colour pigments. Alternatively: It could be connected from the microfluidic side. In that case the container structure would have to contain an additive that absorbs the laser light e.g. black or blue colour pigments and the entire microfluidic part including the through hole piece would be clear to allow the laser light to pass.

When using laser welding, it may be required that the material of the pieces to be welded must be the same, e.g. with disregard to a laser light absorbing additive in the one piece which may not be provided by the other piece, and/or with disregard to a coating, e.g. provided at the first transfer conduit part or the first collection conduit part.

The base container structure may have height of between 3 mm and 20 mm. Parts, which do not contain a well, may have a height of 0.5 mm to 3 mm.

A capping layer may have a thickness of: 0.1 to 3 mm.

A component comprising the recesses of the microfluidic part may have a thickness of 0.3 to 3 mm.

The term "emulsification zone" may refer to any of the first transfer conduit part and the first collection conduit part. Use of the term "emulsification zone" in the definite form, such as a first emulsification zone, may refer to one of the first transfer conduit part and the first collection conduit part, such as the first collection conduit part.

An emulsification zone may entail a desired minimum length/extension of the respective conduit, wherein the needed physical properties are present. The needed physical properties may comprise surface properties being within a needed range of affinity for water. The needed physical properties may comprise that the respective conduit is of a desired cross-sectional dimension.

Accordingly, the extension of the respective conduit, as provided with the needed/desired properties, may be a compromise between different aspects. If the respective part of the conduit, with the needed properties, is too short, the respective droplets may not form as desired. If the respective part of the conduit, with the needed properties, longer than needed for the respective droplets to form, the resistance of the respective part of the fluid conduit network may be higher than necessary. Accordingly, it may be an object to provide respective conduits with the needed properties extending as long as needed while limiting the excessive length hereof.

Whenever a value, such as a minimum or maximum length/extension, or range of length/extension of any of: the first transfer conduit part; the first collection conduit part; and the first emulsification zone is stated, it may refer to the length/extension of the respective conduit having the desired properties, and not necessarily only the actual zone, where the droplet formation/emulsification takes place.

The first transfer conduit part may have an extension of at least 100 μm. The first transfer conduit part may have an extension of at most 2000 μm.

The length of an emulsification zone may be at least four times longer than the diameter of the respective emulsification zone such as at least 8 times or at least 16 times longer. Accordingly, a respective conduit, e.g. the collection conduit, having desired properties, e.g. hydrophilic and being of a desired cross-sectional dimension, which properties extend for at least as long as the length of the respective emulsification zone, and overlap with respective emulsification zone, may be provided. This may be for facilitating droplets to form.

The length of an emulsification zone may be at most 100 times longer than the diameter of the respective emulsification zone such as at most 50 or at most 25 times longer. Accordingly, a respective conduit, e.g. the collection conduit, having desired properties, e.g. hydrophilic and being of a desired cross-sectional dimension, which properties extend for at most as long as the length of the respective emulsification zone, and overlap with respective emulsification zone, may be provided. This may be to facilitate a low resistance while still allowing the droplets to form as desired.

The desired surface properties of each emulsification zone may be needed on all sides of the respective part of a conduit, e.g. on the top, the bottom, and both sides of a respective part of a conduit.

The cross-sectional area of any one, more or all openings between a respective supply conduit, or a branch thereof, and the corresponding first fluid junction may be smaller than 10000 $\mu m^2$, such as smaller than 800 $\mu m^2$, such as smaller than 300 $\mu m^2$.

The cross-sectional area of any one, more or all openings between a respective supply conduit, or a branch thereof, and the corresponding first fluid junction may be larger than 50 $\mu m^2$, such as larger than 100 $\mu m^2$, such as larger than 200 $\mu m^2$.

It may be desired that the volume of the transfer conduit is between 0.00001 μL and 0.05 μL, such as between 0.00002 μL and 0.001 μL. The desired volume of the transfer conduit is to be seen in correlation with the desired dimensions, i.e. the desired length and the desired cross-sectional area/diameter, in particular of the first transfer conduit part.

If the length of a conduit is too long or the diameter of a conduit is too small, the resistance may be too high, and if the diameter of an emulsification zone is too large, the droplets may be too big or loose alignment.

It may be preferred to provide a device configured for and/or a method for provision of double emulsion droplets comprising an aqueous inner phase and an oil layer being suspended in an outer aqueous carrier phase. Accordingly, it may be preferred that the first transfer conduit part is hydrophobic, and that the first collection conduit part is hydrophilic. Accordingly, if utilizing a substrate having hydrophobic surface properties for provision of the fluid conduit network, a hydrophilic coating may be needed for the first collection conduit part. If utilizing a substrate having hydrophilic surface properties, e.g. such as glass, a hydrophobic coating may be needed for the first transfer conduit part.

Coating may imply a physical coating layer, e.g. being different from the base substrate being coated.

Each fluid conduit network may comprise a transition zone provided between the first transfer conduit part and the first collection conduit part. The transition zone may extend between a first end and a second end thereof, wherein the first end is the end of the transition zone that is closest to the first transfer conduit part, and wherein the second end is the end of the transition zone that is closest to the first collection conduit part. A transition from the first affinity for water to the second affinity for water may be provided within the transition zone. The transition from the first affinity for water to the second affinity for water may be provided within the transition zone in a direction from the first end to the second end of the transition zone.

The transition zone may be defined as the part of the respective fluid conduit network, where a coating starts to form and till the place, where the coating has the same properties on all sides of the conduit, such as thickness, as the first collection conduit part or the first transfer conduit part, depending on the embodiment.

The transition from the first affinity for water to the second affinity for water may comprise a gradual transition from the first affinity for water to the second affinity for water.

The transition zone may have an extension of less than 500 μm between the first end and the second end thereof, such as less than 200 μm, such as less than 100 μm.

A short transition zone may enable provision of a relative shorter transfer conduit which in turn may reduce the resistance and thereby decrease the processing time. The transition zone may per definition be further from the first junction than the length of the first transfer conduit part.

The transition zone may consist of and/or comprise a zone where one or more sides of the conduit have an affinity for water which is different from one or more other sides of the conduit. For instance, one side of the conduit may have the first affinity for water while the three additional sides have another affinity for water. The contact angle of this part of the channel could then be understood as an average of the four sides. For instance, if one side has a contact angle of 15° and the three other sides have a contact angle of 90°, the contact angle of this part could be defined as 71°. Furthermore, the average may be weighted according to the percentage that each side account for of the circumference. For instance, if one side has a contact angle of 15°, and account for 15% of the circumference, and the three other sides have a contact angle of 90°, the contact angle of this part could be defined as 79°.

The microfluidic device may comprise a plurality of components forming the microfluidic section and the container section. The plurality of components may comprise a first component and a second component being fixed to each other. Each fluid conduit network may be formed in part by the first component and in part by the second component. The first component may comprise a first substrate having a first coated zone and a first non-coated zone. The second component may comprise a second substrate having a second coated zone and a second non-coated zone. For each fluid conduit network, one of the first transfer conduit part and the first collection conduit part may be formed in part by a primary part of the first coated zone and in part by a primary part of the second coated zone. The other of the first transfer conduit part and the first collection conduit part may be formed in part by a primary part of the first non-coated zone and in part by a primary part of the second non-coated zone.

Any one or more components, such as the first component and/or the second component, may be provided by a plurality of sub-components, such as 2 or 4 sub-components.

Any one or more substrates, such as the first substrate and/or the second substrate, may be provided by a plurality of sub-substrates, such as 2 or 4 sub-substrates.

The primary part of the first coated zone may comprise the part of a recess forming part of a first emulsification zone. The first primary part of the first coated zone may comprise the bottom of the recess forming part of the first emulsification zone. The primary part of the first coated zone may comprise a second primary part and a third primary part, which may refer to respective sides of the recess forming part of the first emulsification zone. The sides may comprise a thinner coating thickness than the bottom. This may be due to irradiation by UV light.

The primary part of the first coated zone may comprise a first primary part of the first coated zone comprising a first uniform coating thickness being within a range of 5 nm to 500 nm, such as 10 nm to 200 nm, such as 10 nm to 100 nm.

The primary part of the second coated zone may comprise a second uniform coating thickness being within a range of 5 nm to 500 nm, such as 10 nm to 200 nm, such as 10 nm to 100 nm.

A uniform thickness may imply that the surface roughness, e.g. the arithmetic mean, Ra, is below 100 nm, such as below 10 nm.

A uniform thickness may imply that the surface roughness, e.g. the arithmetic mean, Ra, is below four times the coating thickness, such as below two times the coating thickness, such as below one or a half times the coating thickness.

The coating thickness may be defined as the average thickness of the coating or the average apart from protruding parts, e.g. protruding parts forming less than 5% of the surface area, such as less than 2%.

The purity of the coating of the first coated zone and/or the second coated zone, such as the primary part of the first coated zone and/or the primary part of the second coated zone may be above 90%, such as above 95%, such as at least 98%.

The transition zone may comprise a secondary part of the first coated zone and a secondary part of the second coated zone. The secondary part of the first coated zone may extend from a first end to a second end thereof. The second end of the secondary part of the first coated zone may be provided at a first edge of the first coated zone. The secondary part of the first coated zone may comprise a coating thickness being zeroed out from the first end to second end thereof. The secondary part of the second coated zone may extend from a first end to a second end thereof. The second end of the secondary part of the second coated zone may be provided at a second edge of the second coated zone. The secondary part of the second coated zone may comprise a coating thickness being zeroed out from the first end to second end thereof. At least one of the second end of the secondary part of the first coated zone and the second end of the secondary part of the second coated zone may coincide with one of the first end and the second end of the transition zone. At least one of the first end of the secondary part of the first coated zone and the first end of the secondary part of the second coated zone may coincide with the other of the first end and the second end of the transition zone.

The coating thickness at the first end of the secondary part of the first coated zone may correspond to the coating thickness of the primary part of the first coated zone. The coating thickness at the first end of the secondary part of the second coated zone may correspond to the coating thickness of the primary part of the second coated zone.

The secondary part of the first coated zone may have an extension of less than 500 μm between the first end and the second end thereof, such as less than 200 μm, such as less than 100 μm.

The secondary part of the second coated zone may have an extension of less than 500 μm between the first end and the second end thereof, such as less than 200 μm, such as less than 100 μm.

The secondary part of the first coated zone and the secondary part of the second coated zone may not be aligned with each other, i.e. they may be unaligned.

Unaligned coated zones may imply that the second end of the secondary part of the first coated zone is horizontally misaligned in relation to the second end of the secondary part of the second coated zone in a direction along the extension of the transfer conduit.

Being unaligned may imply a horizontal misalignment of more than 2 μm such as of more than 10 μm.

The secondary part of the first coated zone and the secondary part of the second coated zone may be aligned with each other.

The microfluidic device may comprise a circumference at a bottom thereof forming an opening to a device cavity. A top part of the microfluidic device may be configured to be at inserted into the device cavity. This may facilitate stacking of a plurality of microfluidic devices top of each other, such that the height of a plurality of microfluidic devices being stacked is less than the individual combined height of each cartridge.

Each component of the plurality of components may comprise at least one side being configured to face and being configured to be attached to a side of another component of the plurality of components. For each group of containers, one of the plurality of components may accommodate at least the secondary supply container and the tertiary supply container and optionally the primary supply container.

The plurality of components may be assembled such that each component is fixedly attached to at least one other component. The plurality of components may be assembled such that the plurality of components forms a fixedly connected unit. The plurality of components may be assembled such that each fluid conduit network is formed in part by the second component and in part by the first component, and wherein the first component faces the second component.

The method of providing a microfluidic device may comprise providing the plurality of components, such as the first component, the second component, and optionally one or more other components.

The method of providing a microfluidic device may comprise assembling the plurality of components, e.g. such that each component is fixedly attached to at least one other component, and e.g. such that the plurality of components forms a fixedly connected unit, and e.g. such that each fluid conduit network is formed in part by the second component and in part by the first component, and wherein the first component faces the second component, and e.g. wherein the primary part of the first coated zone faces the primary part of the second coated zone.

The method of providing a microfluidic device may comprise applying coating comprising: applying a first coating to at least a first part of the first component; and applying a second coating to at least a first part of the second component. The first and second coating may be the same type of coating. The first and second coating may refer to different areas, which may be intended to face each other during assembly of the first component and the second component.

The first part of the first component may comprise the primary part of the first coated zone, i.e. may include one of a recess and a capping part of an emulsification zone. The primary part of the second coated zone may comprise first part of the second component, i.e. may include the other of the recess and the capping part of an emulsification zone.

The method of providing a microfluidic device and/or the step of applying coating may comprise applying a first type of liquid to at least those one or more parts of the microfluidic device that are to form a first emulsification zone. It may be preferred that the liquid is not applied to any one or more parts of the microfluidic device that are to form the other emulsification zone. For instance, the method of providing a microfluidic device may comprise applying the first type of liquid to respective parts of the device, such as to at least a/the first part of the first component and to at least a/the first part of the second component.

The first liquid may e.g. be applied to an entire surface part of a component. In this case, prior plasma activation and/or subsequent UV light activation may be needed.

Alternatively, the first liquid may be applied only to those part(s) where a coating is desired. In this case, prior plasma activation and/or subsequent UV light activation may be needed and/or desired.

The first type of liquid may comprise Acuwet (Aculon, US), PEG-anthraquinone, or P100/5100 (Joninn, DK). For facilitating that the first type of liquid as applied may provide a coating at the desired area, it may be desired to provide an activation of the substrate and/or the coating using plasma or UV light. It may be desired that PEG-anthraquinone or P100/5100 (Joninn, DK) are activated using plasma or UV light.

Use of one of the first type of liquids, such as Acuwet, PEG anthraquinone, or P100/510, for applying a coating may provide that the first transfer conduit part or the first collection conduit part of each microfluidic unit, depending on which part is provided with a coating, may be configured to retain the respective affinity for water for at least one month of storage from time of provision of the respective conduit parts.

A substrate of e.g. PMMA, polycarbonate, or polystyrene may for instance be utilized in combination with any of the above first type of liquid.

Prior to application of the liquid the respective surface area(s) may be activated using plasma. This may in particular be relevant if utilizing PEG-anthraquinone or P100/5100 (Joninn, DK).

Subsequent to application of the liquid to the desired surface area(s), the liquid may be activated using UV light. This may in particular be relevant when utilizing PEG-anthraquinone or P100/5100 (Joninn, DK). A masking may be utilized for achieving that the UV light only or mainly activates the liquid where a coating is desired. If utilizing directional or semi-directional UV light, it may be assumed that the application of coating depends on the difference in angle between a normal of the surface in question and the direction of UV light irradiance. Accordingly, the sides of a conduit may be provided with a coating of lower thickness than the thickness of a coating to a bottom of the conduit. This may indicate that the coating of the sides of a conduit, such as being provided by a recess, may not have the desired surface properties, however, the inventors have realized that directional coating, such as being applied and/or adhered using UV light, are applicable for the present invention.

The method of providing a microfluidic device and/or the step of applying coating may comprise applying UV light, e.g. via a mask, to at least those one or more parts of the microfluidic device that are to form a first emulsification zone, such as to at least the first part of the first component and to at least the first part of the second component subsequent to the step of applying the first type of liquid. It may be preferred that the method does not comprise applying UV light to the one or more parts of the microfluidic device that are to form the other emulsification zone. Use of a mask when applying the UV light may facilitate that only desired parts of the microfluidic device are exposed to the UV light.

Accordingly, the combination of the step of applying the first type of liquid and the step of applying UV light may imply the steps of: applying a first coating to at least a first part of the first component; and applying a second coating to at least a first part of the second component.

Application of UV light may facilitate that the first type of liquid as applied will form a coating that remains for a desired time and/or remains under desired conditions.

One, more, or all of the components, such as including the first component and the second component, may be at least partly transparent, e.g. for UV light. This may facilitate activation by UV light, in particular for the one or more embodiments, wherein the UV activation is carried out subsequent to the step of assembling the components.

The step of applying the first type of liquid may be carried out prior to the step of assembling.

The step of applying the first type of liquid may be carried out subsequent to the step of assembling. The step of applying the first type of liquid may comprise utilizing an inert liquid for blocking parts of the fluid conduit network not to be coated.

For any method according to the present invention where a coating is applied to the first and second components prior to assembling, it may be needed to apply the coating not just within the recess and the corresponding capping part, but also next to, which is to be sure the coating is applied as desired within the respective conduit or part thereof.

The inventors have observed that the presence of a coating layer may be visible by eye, e.g. in a microscope at 4× magnification, as a difference in colour between coated and uncoated conduit parts, e.g. on a black background of the first and second component when bonded. Accordingly, visual quality control of the assembled microfluidic part and/or fully assembled microfluidic device may reduce the failure rate for the user. A directional coating, such as applied using UV light may provide a sharp boundary between coated and uncoated parts.

Furthermore, coated parts may not bond as well as the uncoated parts and a bonding void may therefore formed at coated areas when bonding two components, such as the first and second component. The bonding voids may appear lighter than the bonded surfaces on a black background.

The pressure differences provided between each of the respective supply containers of the first group of containers and the collection container of the first group of containers may be individual pressure differences between each of the respective supply containers of the first group of containers and the collection container of the first group of containers.

The drawings illustrate the design and utility of embodiments. These drawings are not necessarily drawn to scale. In order to better appreciate how the above-recited and other advantages and objects are obtained, a more particular description of the embodiments will be rendered, which are illustrated in the accompanying drawings. These drawings may only depict typical embodiments and may therefore not be considered limiting of its scope.

FIG. 1 schematically illustrates a microfluidic device 100 according to the first embodiment of the present invention comprising of a microfluidic section 101 and a container section 102. The microfluidic section 101 and the container section 102 each comprise additional parts, as will be illustrated further in the description.

FIG. 2 illustrates a microfluidic device 100 according to the first embodiment of the present invention comprising of at least the parts illustrated further in the description. The microfluidic device 100 comprises of a microfluidic section 101, wherein the microfluidic section 101 comprises of a plurality of microfluidic units 103, 112, 116. Furthermore, the microfluidic device 100 comprises a container section 102, wherein the container section 102 comprises of a plurality of groups of containers 131, 132, 133, 134 and comprising one group of containers for each microfluidic unit 170.

Each microfluidic unit 170 comprises a fluid conduit network 135 comprising at least the following parts:

a plurality of supply conduits, as illustrated on FIG. 3, comprising a primary supply conduit 103, a secondary supply conduit 106, and a tertiary supply conduit 109;

a transfer conduit 112 comprising a first transfer conduit part 115 having a first affinity for water;

a collection conduit 116 comprising a first collection conduit part 119 having a second affinity for water being different from the first affinity for water;

a first fluid junction 120 providing fluid communication between the primary supply conduit 103, the secondary supply conduit 106, and the transfer conduit 112;

a second fluid junction 121 providing fluid communication between the tertiary supply conduit 109, the transfer conduit 112, and the collection conduit 116.

The first transfer conduit 112 part extends from the corresponding first fluid junction 120, and each first collection conduit part 119 extends from the corresponding second fluid junction 121. Each group of containers comprises a plurality of containers comprising a collection container and a plurality of supply containers comprising a primary supply container 131, a secondary supply container 132, and a tertiary supply container 133. Each group of containers has the collection container 134 in fluid communication with the collection conduit 116 of the corresponding microfluidic unit 170. Furthermore, the primary supply container 131 is in fluid communication with the primary supply conduit 103 of the corresponding microfluidic unit 170. Furthermore, the secondary supply container 132 is in fluid communication with the secondary supply conduit 106 of the corresponding microfluidic unit 170 and the tertiary supply container 133 is in fluid communication with the tertiary supply conduit 109 of the corresponding microfluidic unit 170.

With reference to FIG. 3, it is illustrated how the fluid conduit network 135 of the first embodiment operates, in particular the first fluid junction 120 and the second fluid junction 121 is being shown on the drawing. The microfluidic device 170 comprises of a fluid conduit network 135, wherein the fluid conduit network 135 comprises of a primary supply conduit 104, a secondary supply conduit 106, a tertiary supply conduit 109 and a collection conduit 116 connected to each other and connected to a primary supply inlet 104, a secondary supply inlet 107, a tertiary supply inlet 110 and a collection outlet 118, wherein the fluid can be injected through the respective inlets/outlets. Between the respective inlets and conduits, several fluid junctions are provided; namely, the first fluid junction 120 and a second fluid junction 121. The first fluid junction 120 comprises of a primary supply opening 105 linked to a first transfer opening 113. The second fluid junction 121 comprises of a second transfer opening 114 and a collection opening 117. The fluid injected through the respective inlets 104, 107, 110 emulsifies in the junctions 120, 121 and is supplied into the collection outlet 118 through the first collection conduit part 119.

FIG. 4 illustrates the same concept, as was described in FIG. 3, however, the first fluid junction 120 and the second fluid junction 121 are not indicated by dotted lines.

FIG. 5 schematically illustrates a cross-sectional top view of a microfluidic unit 570 of a second embodiment of a microfluidic device (the microfluidic device is only partially illustrated in FIG. 5) according to the present invention. The fluid is supplied through the primary 504, the secondary 507 and the tertiary 510 supply inlets, which through the respective supply conduits, namely the primary supply conduit 503, the secondary supply conduit 506 and the tertiary supply conduit 509 is being supplied to the collection conduit 516 to the collection outlet 518. The liquid coming through the primary supply conduit 504 and the liquid through the secondary supply conduit inlet 507 is mixed through the first fluid junction 520 and further mixed with the liquid supplied through the tertiary supply inlet 510 through the second fluid junction 521.

FIG. 6 illustrates that the cross-sectional area of an opening, e.g. 513, between the first fluid junction 520 and the transfer conduit 512 is between 50% and 100% of the cross-sectional area of an opening, e.g. 517, between the second fluid junction 521 and the collection conduit 516.

FIG. 7 illustrates a method for providing double emulsion droplets. For provision of double emulsion droplets the method comprises use of the microfluidic device according to the present invention. The method may comprise: providing a first fluid to the primary supply container (not illustrated in FIG. 7, a primary supply container 1731 is illustrated in FIG. 16) of a first group of containers; providing, possibly subsequently, a second fluid to the secondary supply container (not illustrated in FIG. 7, a secondary supply container 1732 is illustrated in FIG. 16) of the first group of containers; providing a third fluid to the tertiary supply container (not illustrated in FIG. 7, a tertiary supply container 1733 is illustrated in FIG. 16) of the first group of containers; and providing individual pressure differences between each of the respective supply containers of the first group of containers and the collection container (not illustrated in FIG. 7, a collection container 1734 is illustrated in FIG. 16) of the first group of containers, such that the pressure within each of the individual supply containers of the first group of containers is higher than within the collection container of the first group of containers.

The method for providing double emulsion droplets may comprise: providing a primary flow 522 of a first fluid from the primary supply well or container to the first fluid junction 520, as illustrated on FIGS. 5 and 6, via: the primary supply inlet 504, the primary supply conduit 503, and the primary supply opening 505; and providing a secondary flow 523 of a second fluid from the secondary supply container to the first fluid junction 520 via: the secondary supply inlet 507, the secondary supply conduit 506, and the secondary supply opening 508; wherein the primary flow 522 and the secondary flow 523 provides a transfer flow of the first fluid and the second fluid from the first fluid junction 520 to the second fluid junction 521 via: the first transfer opening 513, the transfer conduit 515, and the second transfer opening 514.

The method for providing double emulsion droplets may comprise: providing a tertiary flow 524 of a third fluid from the tertiary supply container to the second fluid junction 521 via: the tertiary supply inlet 510, the tertiary supply conduit 509, and the tertiary supply opening 511; wherein tertiary flow 524 and the transfer flow provides a collection flow of the first fluid, the second fluid, and the tertiary fluid, to the collection container 534 via: the collection opening 517, the collection conduit 516, and the collection outlet 518.

FIG. 8 schematically illustrates the part of the fluid conduit network illustrated in FIG. 6, indicating areas of the fluid conduit network where the first and second affinity for water, respectively, is required. The first transfer conduit part 515 has the first affinity for water. The first collection conduit part 519 has the second affinity for water.

FIGS. 9*a*, 9*b*, 9*c*, 9*d* and FIGS. 10*a*, 10*b*, 10*c*, 10*d* schematically illustrate various examples for achieving the desired affinity for water at both the desired locations indicated in FIG. 8. The various examples comprise: a first example 956 of a region provided with a coating; a second example 957 of a region provided with a coating; a third example 958 of a region provided with a coating; a fourth example 1059 of a region provided with a coating; a fifth example 1060 of a region provided with a coating; and a sixth example 1061 of a region provided with a coating.

The first, second, and third examples are for a situation where the affinity for water is as desired as provided by the respective substrate for the first transfer conduit part 515. All of the first, second, and third examples comprises coating on the area 519.

The fourth, fifth, and sixth examples are for a situation where the affinity for water is as desired as provided by the respective substrate for the first collection conduit part 519. All of the fourth, fifth, and sixth examples comprises coating on the area 515.

FIG. 11 schematically illustrates an example of a junction, such as a first fluid junction 1120, of a microfluidic device according to the present invention.

FIG. 12 schematically illustrates a cross-sectional top view of a microfluidic unit of a third embodiment of a microfluidic device according to the present invention. The embodiment of FIG. 12 differs from the embodiment of FIG. 5 by comprising filters 1323, 1324, 1325. The microfluidic unit 1370 comprises: a primary filter 1323 at or within the primary supply conduit/the primary supply inlet 1304; a secondary filter 1324 at or within the secondary supply conduit/the secondary supply inlet 1307; and a tertiary filter 1325 at or within the tertiary supply conduit/the tertiary supply inlet 1310.

FIG. 13 schematically illustrates a cross-sectional top view of a plurality of microfluidic units of the third embodiment comprising the microfluidic unit 1370 illustrated in FIG. 12.

FIG. 14 schematically illustrates an isometric sectional view of a part of a conduit of microfluidic device according to the present invention. The illustrated part of the conduit may be applied to any of the embodiments of a microfluidic device according to the present invention.

One or more parts or all of each fluid conduit network of any embodiment of a device according to the present invention may form an acute trapezoidal cross section as illustrated in FIG. 14, wherein the longer base edge is provided by the capping part 1427. The acute trapezoidal cross section may form an isosceles trapezoidal cross section, wherein the side walls 1428 of equal length may have a tapering of at least 5 degrees and/or at most 20 degrees 1429 with respect to a normal of either of the parallel base edges.

The parts 1427 and 1426 are shown slightly exploded for illustrative purposes.

The microfluidic section comprises a first planar surface and a capping piece 1427 comprising a second planar surface, the first planar surface having a plurality of ramified recesses 1430 providing a base part of each fluid conduit network of the microfluidic device. The second planar surface faces the first planar surface and provides a capping part of each fluid conduit network of the microfluidic device.

FIG. 15 schematically illustrates a cross-sectional top view of a supply inlet 1504 of microfluidic device according to the present invention showing a filter 1525 similar to the filters of FIGS. 12 and 13.

FIGS. 16-20 schematically illustrate various views of a fourth embodiment 1700 of a microfluidic device according to the present invention.

FIG. 16 schematically illustrates an isometric and simplified view of a part of a fourth embodiment of a microfluidic device according to the present invention.

FIG. 17 schematically illustrates an exploded view of the simplified part of the fourth embodiment illustrated in FIG. 16.

With reference to FIGS. 16 and 17, there is illustrated a method for manufacturing a microfluidic device according to the present invention. The method comprises fixing the well section 1702 and the microfluidic section 1701 to each other, such that fluid communication is provided between the individual container 1731, 1732, 1733 of each group of containers 1731, 1732, 1733, 1734 via the corresponding respective microfluidic units 1770.

FIG. 18 schematically illustrates an isometric view of the fourth embodiment of a microfluidic device 1700 according to the present invention.

FIG. 19 schematically illustrates a top view of the fourth embodiment illustrated in FIG. 18.

FIG. 20 schematically illustrates a cross-sectional side view of the fourth embodiment illustrated in FIGS. 18 and 19.

FIG. 21 schematically illustrates a cross-sectional side view of a well and a corresponding part of a microfluidic unit of a microfluidic device according to the present invention when connected to a receptor 2142 (cf. 2342 of FIG. 23) of an assembly according to the present invention.

FIG. 22 schematically illustrates an exploded view of the illustration of FIG. 21.

FIG. 23 schematically illustrates a first embodiment of an assembly 2390 according to the present invention.

The assembly 2390 comprises a receptor 2342 and a pressure distribution structure 2399. The receptor 2342 is configured to receive and hold a microfluidic device according to the present invention. The pressure distribution structure 2399 is configured to supply pressure to the microfluidic device when held by the receptor 2342. The pressure distribution structure comprising: a plurality of well manifolds 2353 comprising a primary well manifold and a tertiary well manifold; a plurality of line pressure regulators 2350 comprising a primary line pressure regulator and a tertiary line pressure regulator; and a main manifold 2353. The primary well manifold is configured to be coupled to each primary supply well or container of the microfluidic device. The tertiary well manifold is configured to be coupled to each tertiary supply well or container of the microfluidic device. The primary line pressure regulator is coupled to the primary well manifold. The tertiary line pressure regulator is coupled to the tertiary well manifold. The main manifold is coupled to each well manifold via the respective line pressure regulators.

FIG. 24 shows an image of fluid from a collection well or container of a microfluidic device according to the present invention.

FIG. 25 shows an image of a plurality of collection wells or containers of a microfluidic device according to the present invention.

FIG. 26 schematically illustrates a first embodiment of a kit according to the present invention.

FIGS. 27-29 schematically illustrate various views of a fifth embodiment 1900 of a microfluidic device according to the present invention.

The fifth embodiment mainly differs from the previous embodiments in that the primary supply conduit 1903 comprises a capillary structure 1973 and that the secondary supply conduit 1906 is connected to the primary supply well or container 1931 instead of being connected to a secondary supply well or container (not part of FIGS. 27-29).

The microfluidic device 1900 comprises a microfluidic section 1901 and a well section 1902. The microfluidic section comprises a microfluidic unit 1970. The well section comprises a group of wells or containers 1971. The number of groups of wells corresponds to the number of microfluidic units.

The well section and the microfluidic section forms a fixedly connected unit. The group of wells forms a fixedly connected unit with the corresponding microfluidic unit 1970.

The microfluidic unit 1970 comprises a fluid conduit network 1935 comprising: a plurality of supply conduits 1903, 1906; a transfer conduit 1912; and a first fluid junction 1920.

The plurality of supply conduits comprises a secondary supply conduit 1906 and a primary supply conduit 1903. The primary supply conduit comprises a capillary structure 1973 having a volume of at least 2 μL.

The secondary supply conduit 1906 comprises a first secondary supply conduit 1906*a* and a second secondary supply conduit 1906*b* configured to exert a pinching action of the second fluid on a stream of the first fluid from the first supply conduit 1903 during use.

The primary supply conduit 1903 comprises a connection conduit 1903*a* provided between the capillary structure 1973 and the first fluid junction 1920.

The first fluid junction 1920 provides fluid communication between the primary supply conduit 1903, the secondary supply conduit 1906, and the transfer conduit 1912.

The group of wells 1971 comprises a plurality of wells comprising a collection well or container 1934 and a primary supply well or container 1931. The collection well or container 1934 is in fluid communication with the transfer conduit 1912. The primary supply well or container 1931 is in fluid communication with the primary supply conduit 1903 and the secondary supply conduit 1906.

The primary supply conduit 1903 provides fluid communication between the primary supply well or container 1931 and the first fluid junction 1920.

The secondary supply conduit 1906 provides fluid communication between the primary supply well or container 1931 and the first fluid junction 1920.

The plurality of supply conduits of the fluid conduit network 1935 comprises a tertiary supply conduit 1909.

The tertiary supply conduit 1909 comprises a first tertiary supply conduit 1909*a* and a second tertiary supply conduit 1909*b* configured to exert a pinching action of the third fluid on a stream of the fluid from the transfer conduit 1912 during use.

The microfluidic unit 1970 comprises a collection conduit 1916 and a second fluid junction 1921.

The second fluid junction 1921 provides fluid communication between the tertiary supply conduit 1909, the transfer conduit 1912, and the collection conduit 1916.

The transfer conduit 1912 comprises a first transfer conduit part having a first affinity for water and extending from the first fluid junction 1920.

The collection conduit 1916 comprises a first collection conduit part extending from the second fluid junction 1921 and having a second affinity for water being different from the first affinity for water.

The microfluidic device 1900 comprises one or more supply wells or containers comprising the primary supply well or container 1931 and a tertiary supply well or container 1933. The tertiary supply well or container 1933 is in fluid communication with the tertiary supply conduit 1909.

The collection well or container 1934 is in fluid communication with the transfer conduit 1912 via the collection conduit 1916 and the second fluid junction 1921.

An advantage with the present invention when comprising a capillary structure may be facilitation of a simpler manufacturing process and/or facilitation of usage of less material, e.g. compared to a microfluidic device having more wells than the microfluidic device according to the present invention.

FIG. 30 (including FIGS. 30*a* and 30*b*) schematically illustrates isometric exploded views of the microfluidic device 1700 of the fourth embodiment (according to FIG. 18) of the present invention. FIG. 30*a* shows an exploded view from the top, FIG. 30*b* shows an exploded view from the bottom. It is shown through FIG. 30 that the microfluidic device 1700 comprises several layers/pieces/components, namely a top layer/piece/component 3080, a middle layer/piece/component 3081 and a bottom layer/piece/component 3082.

FIG. 31 schematically illustrates a top exploded view of the fourth embodiment illustrated in FIG. 30. The exploded parts of FIG. 30 are illustrated from top to bottom in FIG. 31. FIG. 31 illustrates a top part 3080*a* of the top layer/piece/component 3080, a top part 3081*a* of the middle layer 3081, and a top part 3082*a* of the bottom layer 3082.

FIG. 32 schematically illustrates a bottom exploded view of the separate parts of the fourth embodiment illustrated in FIG. 30. The exploded parts of FIG. 30 are illustrated side-by-side in FIG. 32. FIG. 32 illustrates a bottom part 3080*b* of the top layer/piece/component 3080, a bottom part 3081*b* of the middle layer 3081, and a bottom part 3082*b* of the bottom layer 3082.

FIG. 33 schematically illustrates a top view of the fourth embodiment 1700 illustrated in FIG. 30. The embodiment 1700 of FIG. 33 illustrates a non-exploded view of the embodiment illustrated in FIGS. 30-32. A group of wells/containers 3071 is encircled by a solid rectangle for illustrative purposes. A cutting line 3083 indicates the cross-sectional view of FIG. 20.

For the fourth embodiment 1700, each microfluidic unit is formed by a ramified recess in the top part 3082*a*, illustrated on FIG. 31, of the bottom layer/component 3082 which is capped by the bottom part 3081*b*, illustrated on FIG. 32, of the middle layer/component 3081.

Figure 34A:
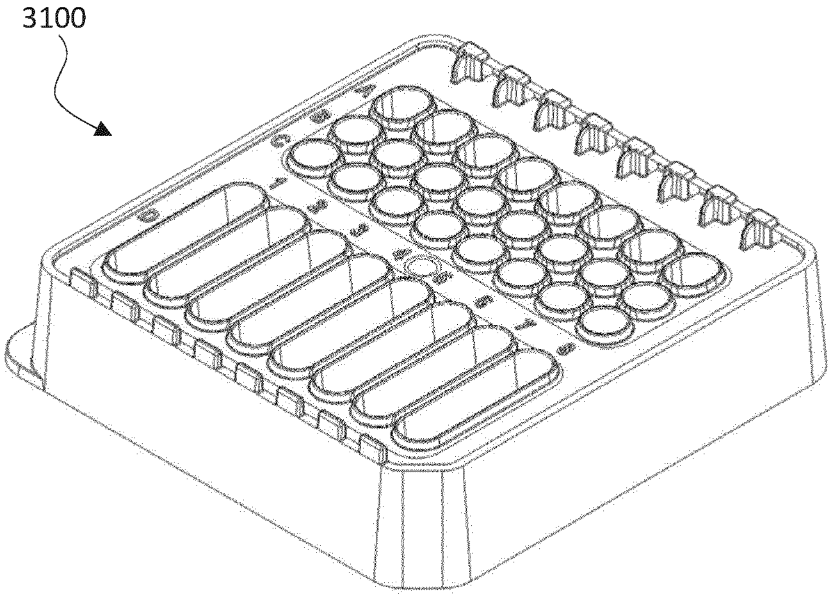
Figure 34B:
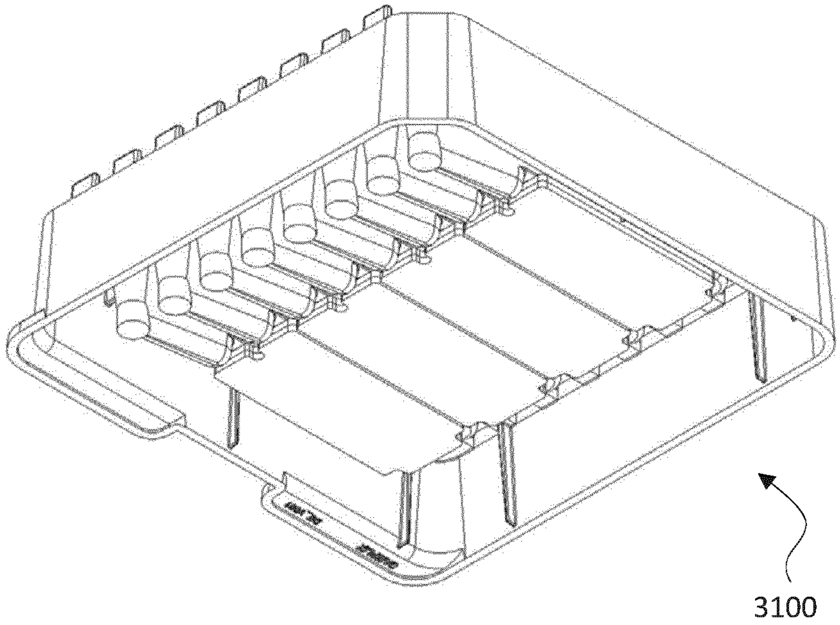

FIG. 34 (including FIGS. 34*a* and 34*b*) schematically illustrates a top isometric view and a bottom isometric view of a microfluidic device 3100 according to a sixth embodiment of the present invention. FIG. 34*a* illustrates the top isometric view and FIG. 34*b* illustrates the bottom isometric view.

FIG. 35 (including FIGS. 35*a* and 35*b*) schematically illustrates a top and a bottom exploded view of the sixth embodiment illustrated in FIG. 34. FIG. 35*a* illustrates the top view and FIG. 35*b* illustrates the bottom view. It is shown through FIG. 35 that the microfluidic device 3100 comprises several layers/pieces/components, namely a top layer/piece/component 3180, a middle layer/piece/component 3181, and a bottom layer/piece/component 3182.

FIG. 36 schematically illustrates a top exploded view of the sixth embodiment illustrated in FIGS. 34 and 35. The exploded parts of FIG. 35*a* are illustrated side-by-side in FIG. 36. FIG. 36 illustrates a top part 3180*a* of the top layer/piece/component 3180, a top part 3181*a* of the middle layer 3181, and a top part 3182*a* of the bottom layer 3182.

FIG. 37 schematically illustrates a bottom exploded view of the sixth embodiment illustrated in FIGS. 34 and 35. The exploded parts of FIG. 35*b* are illustrated from top to bottom in FIG. 37. FIG. 37 illustrates a bottom part 3180*b* of the top layer/piece/component 3180, a bottom part 3181*b* of the middle layer 3181, and a bottom part 3182*b* of the bottom layer 3182.

FIG. 38*a* schematically illustrates a top view of the sixth embodiment illustrated in FIG. 34. A first group of containers 3171 is encircled by a solid rectangle for illustrative purposes. A cutting line 3183 indicates the cross-sectional view of FIG. 38*b*. FIG. 38*b* schematically illustrates a cross-sectional side view of the sixth embodiment illustrated in FIG. 34 and as indicated in FIG. 38*a*. FIG. 38*b* illustrates the first group of containers 3131, 3132, 3133, 3134, corresponding to the group of containers 1731, 1732, 1733, 1734 of FIG. 18. The group of containers 3171 are aligned along a line parallel to the cutting line 3183. The principle of operation of the device illustrated in FIG. 38*b* is similar to the device illustrated in FIG. 20 and will not be repeated in detail.

For the sixth embodiment 3100, each microfluidic unit is formed by a ramified recess in the bottom part 3181*b* of the middle layer/component 3181 which is capped by the top part 3182*a* of the bottom layer/component 3182.

FIG. 39*a* schematically illustrates an isometric top view of a seventh embodiment according to the present invention. FIG. 39*b* schematically illustrates a simplified view of a sample line of the embodiment of FIG. 39*a* schematically illustrating a group of containers 3231, 3232, 3233, 3234 of a top layer/piece/component 3280 and a corresponding microfluidic unit 3270, cf. FIG. 40*a*, primarily formed by a bottom layer/piece/component 3282.

FIG. 40 (including FIGS. 40*a* and 40*b*) schematically illustrates an exploded view of the sample line of FIG. 39*b*. FIG. 40*a* illustrates an exploded view from the top and FIG. 40*b* illustrates an exploded view from the bottom.

FIG. 41*a* schematically illustrates a top view of the top layer/piece/component 3280 showing a top side/top part 3280*a* thereof. FIG. 41*b* schematically illustrates a top view of the bottom layer/piece/component 3282 showing a top side/top part 3282*a* thereof.

FIG. 42*a* schematically illustrates a bottom view of the top layer/piece/component 3280 showing a bottom side/bottom part 3280*b* thereof. FIG. 42*b* schematically illustrates a bottom view of the bottom layer/piece/component 3282 showing a bottom side/bottom part 3282*b* thereof.

FIG. 43*a* schematically illustrates a top view of the part illustrated in FIG. 39*b*. FIG. 43*b* illustrates a cross-sectional side view of the sample line of FIG. 43*a* seen along the cutting line 3283 indicated in FIG. 43*a*.

For the seventh embodiment 3200, each microfluidic unit is formed by a ramified recess in the top part 3282*a* of the bottom layer/component 3282 which is capped by the bottom part 3280*b* of the top layer/component 3280.

For efficiency, the transition zone 3377 and the transition zone 4077 referred to in the following may require aligned coating for embodiments wherein the fluid conduit network is formed by two components, e.g. one providing a ramified recess and another component providing a cover. This may e.g. be achieved by providing the first fluid and the UV radiation subsequent to the assembling, e.g. as disclosed in connection with FIG. 48*a*, or at least by provision of the UV radiation subsequent to the assembling of the components. Alternatively, alignment of the coatings may be achieved by precise assembling of the coated components.

Figure 44A:
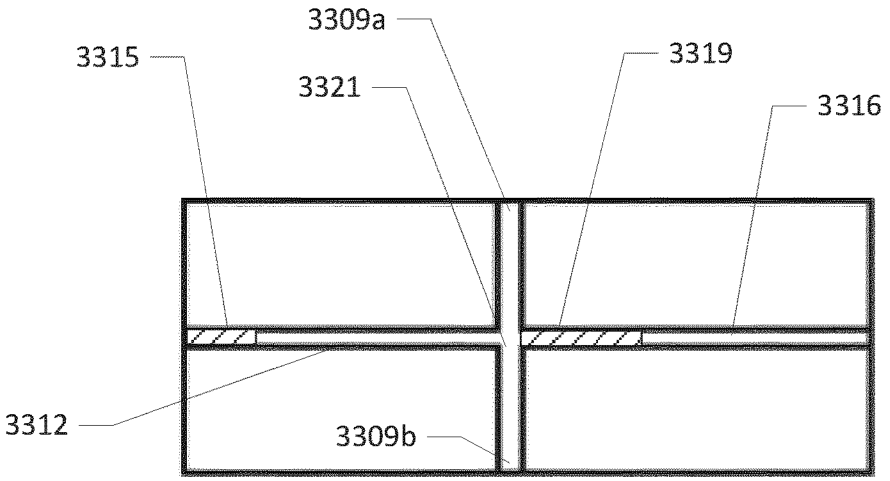
Figure 44B:
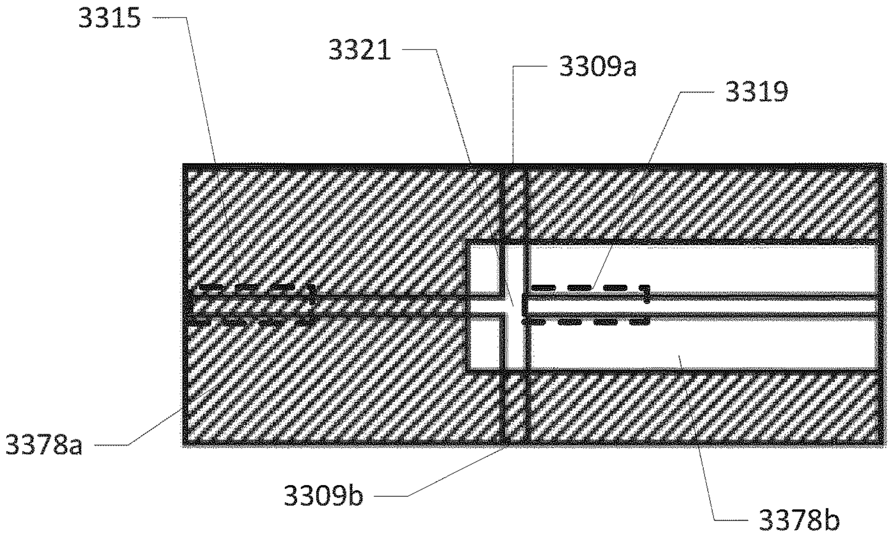
Figure 44C:
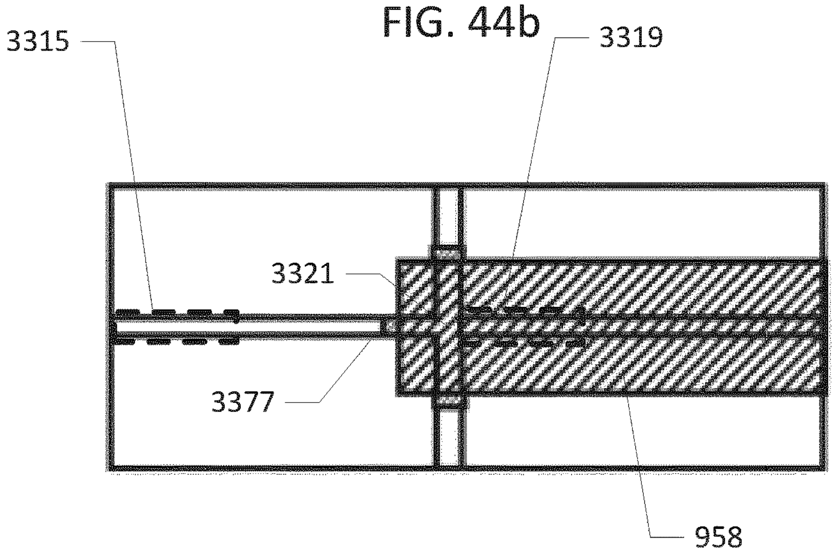

FIG. 44 (including FIGS. 44*a*, 44*b*, and 44*c*) schematically illustrate steps of a method of provision of a microfluidic device according to the present invention. For simplicity, merely a second fluid junction 3321 and the surrounding parts of the fluid conduit network is illustrated by means of FIG. 44. Furthermore, for simplicity, merely a part of a first component is illustrated by means of FIG. 44. The first component of FIG. 44 may e.g. correspond to any of: the bottom layer/piece/component 3082 of the microfluidic device 1700 of the fourth embodiment; the middle layer 3181 of the sixth embodiment of the microfluidic device 3100; and the bottom layer/piece/component 3282 of the seventh embodiment. Accordingly, the component illustrated in part by FIG. 44 form the fluid conduit network by a ramified recess being configured to be capped by a flat surface by another component (not shown in FIG. 44), such as the respective component forming a respective capping part of any of the fourth, sixth, or seventh embodiment.

Capping of the recess is illustrated in greater details by means of FIGS. 50, 51, and 46 in combination and is described further below.

In FIG. 44*a*, the respective part of the fluid conduit network of the microfluidic device is illustrated prior to being coated, wherein the first liquid may be applied to an entire surface part of the component.

Figure 49A:
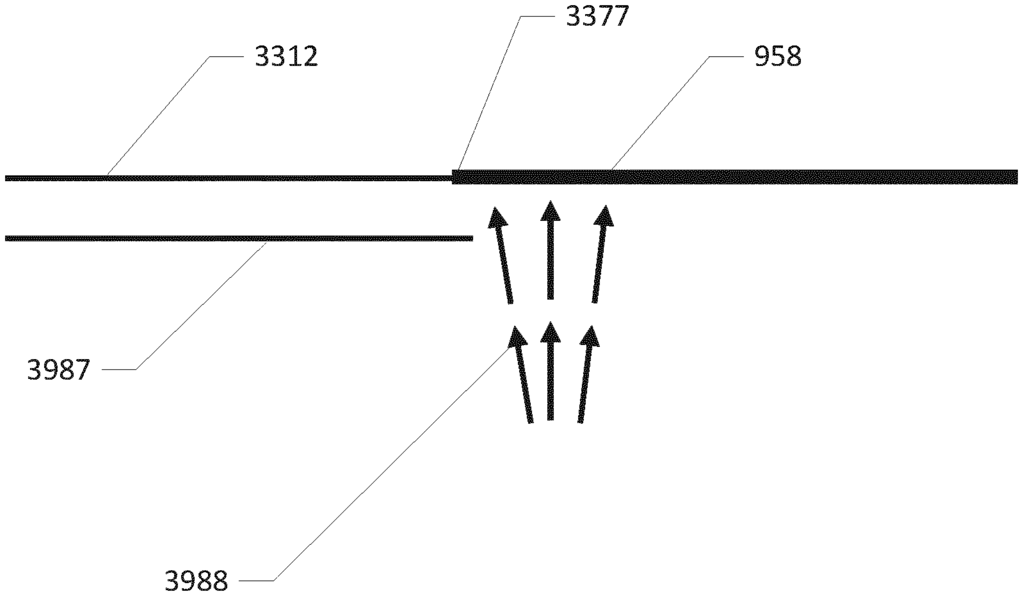
Figure 49B:
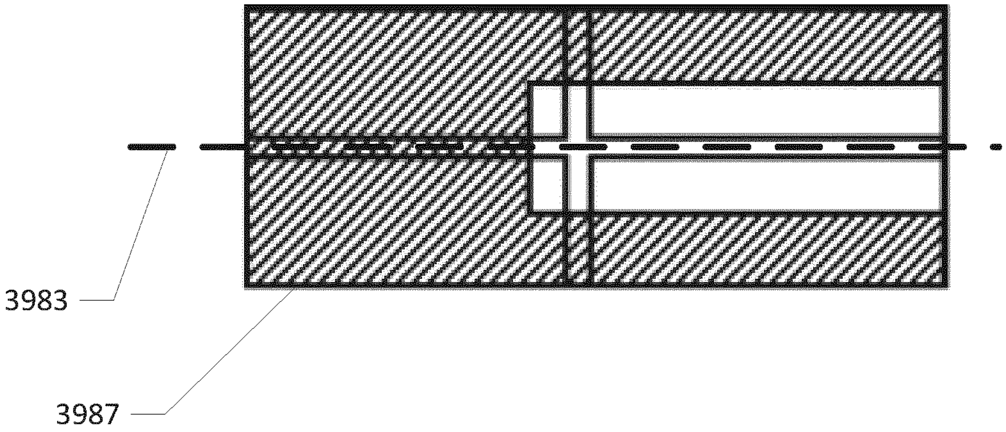

In FIG. 44*b*, the respective part is illustrated with an area 3378*a* to be masked during application of UV light. A mask may be utilized for achieving that UV light only or mainly activates the liquid where a coating is desired. The step of applying UV light is illustrated by means of FIG. 49 (including FIGS. 49*a* and 49*b*). FIG. 49*b* corresponds to FIG. 44*b* and includes a cutting line 3983 showing the location of the cross-sectional view of FIG. 49*a*. FIG. 49*a* schematically illustrates the process of radiation with UV-light 3988 while utilizing a mask 3987 for activating the applied first fluid. The shown result, also indicated by FIG. 49*a*, is a coating corresponding to the third example 958 of a region provided with coating as illustrated FIGS. 9*a* and 9*d* and comprising a transition zone 3377, extending into the transfer conduit 3312. The transition zone 3377 is illustrated in greater detail by means of FIG. 44*c*.

Figure 45A:
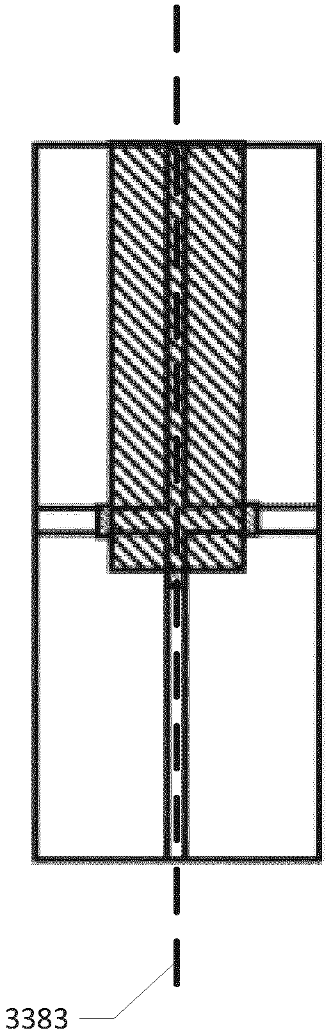
Figure 45B:
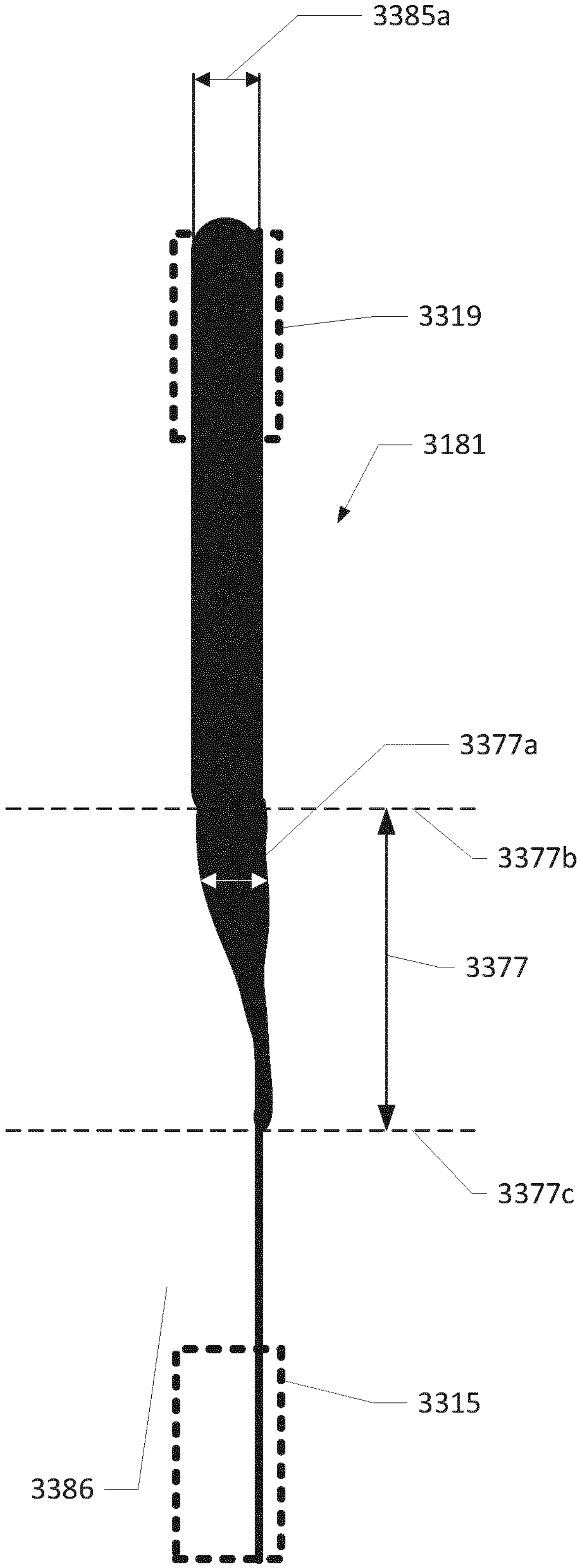
Figure 47A:
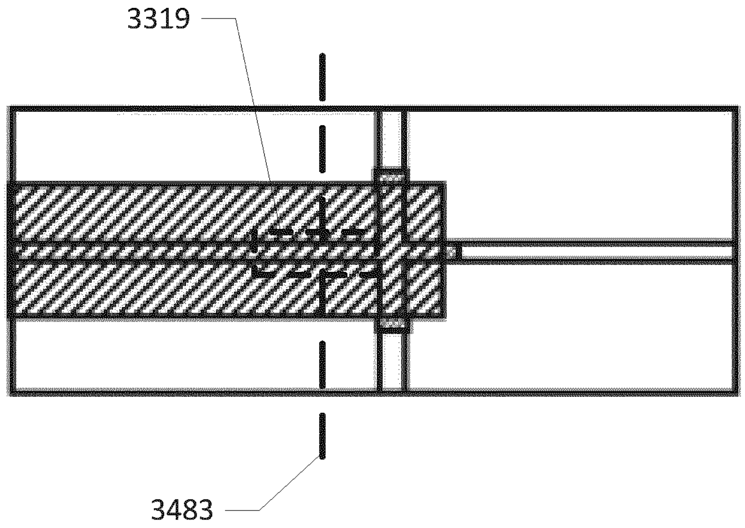
Figure 47B:
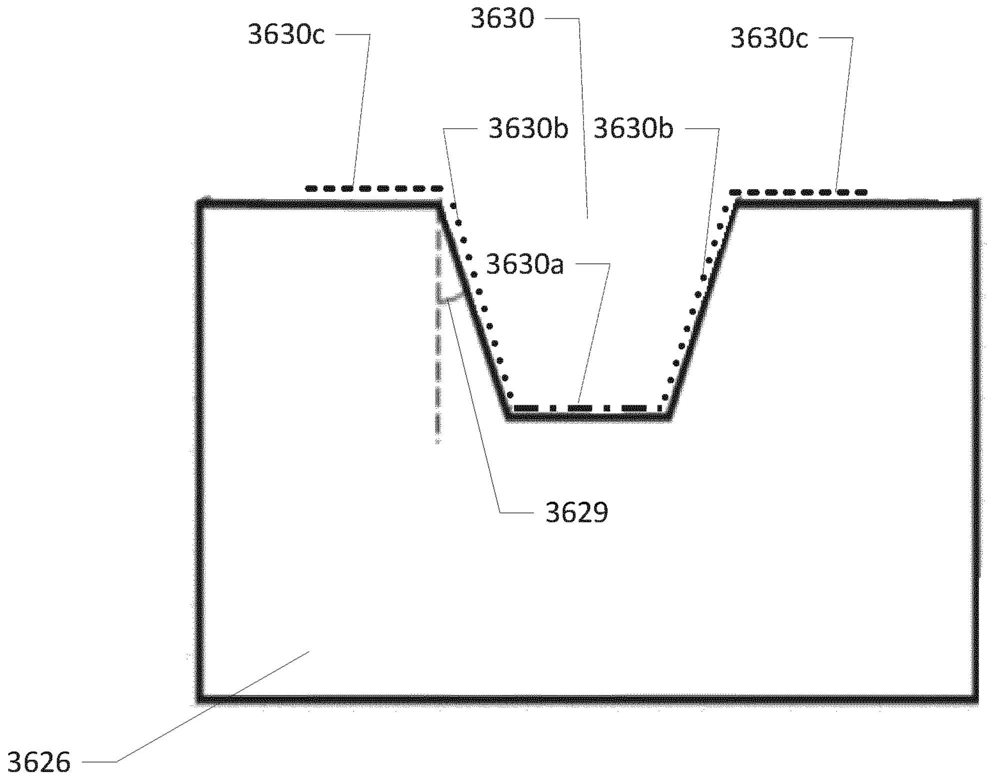

FIG. 44*c* schematically illustrates the result of the coating process described above, indicating the coated area and the transition zone 3377. FIG. 45*a* corresponds to FIG. 44*c* and indicates a cutting line 3383 showing the location of the cross-sectional view of FIG. 45*b*. FIG. 45*b* illustrates that the coating is applied to the first collection conduit part 3319 and comprises a transition zone 3377 between the first collection conduit part 3319 and the first transfer conduit part 3315. At the transition zone 3377, the coating/coating thickness 3377*a* is zeroed out from a second 3377*b* end of the transition zone 3377 towards a first end 3377*c* of the transition zone. FIG. 47*a* corresponds to FIG. 44*c* and includes a cutting line 3483 indicating the location of the cross-sectional view of FIG. 47*b*. FIG. 47*b* schematically illustrates a cross-sectional view the recess 3630 of the fluid conduit network at the first collection conduit part 3319 formed in the substrate 3626 forming the first component of the respective microfluidic device. Due to the difference in inclination (illustrated by the angle 3629 between vertical and the respective side wall 3630*b*) between the side walls 3630*b* and the bottom 3630*a* of the recess 3630, the side walls 3630*b* may be provided with a coating of lower thickness than the thickness of the coating of the bottom 3630*a*. This may be caused by utilizing directional or semi-directional UV light for activating the first fluid, wherein it may be assumed that the application of coating depends on the difference in angle between a normal of the surface in question and the direction of UV light irradiance. Furthermore, as discussed above, when coating of the first substrate prior to connecting with the second substrate, it may be advantageous to also provide coating at the surface 3630*c* next to the respective recess in order to ensure that the relevant part, for the present case the first collection conduit part 3319, is properly coated.

FIG. 44 (including FIGS. 44*a*, 44*b*, and 44*c*) schematically illustrates a part of a fluid conduit network e.g. according to any of the embodiments described previously, more specifically, FIG. 44 illustrates a subset of a microfluidic part. FIG. 44 illustrates: a first tertiary supply conduit 3309*a*, a second tertiary supply conduit 3309*b*, a transfer conduit 3312, a first transfer conduit part 3315, a collection conduit 3316, a first collection conduit part 3319, and a second fluid junction 3321. The progression shown through FIGS. 44*a*, 44*b*, and 44*c* schematically illustrates steps of a method of provision of a device according to the invention. FIG. 44*a* illustrates a subset of the microfluidic part without a masked area. FIG. 44*a* illustrates a pre-coating state, e.g. before or after application of a first fluid. FIG. 44*b* illustrates a masked area 3378*a* and an unmasked area 3378*b* according to an aspect of the application. According to a particular embodiment of the present method, a mask may be e.g. provided over the area 3378*a* e.g. prior to application of UV-radiation and e.g. subsequent to application of the first fluid. FIG. 44*c* illustrates a coated area and a transition zone 3377. The coated area, e.g. exclusive of the transition zone 3377, may correspond to the third example 958 of a region provided with coating as illustrated FIGS. 9*a* and 9*d*. Accordingly, for FIGS. 44*a* and 44*b*, both of the areas indicated as the first transfer conduit part 3315 and the first collection conduit part 3319 may not yet exhibit their respective affinity for water.

FIG. 44*c* shows a part of a fluid conduit network comprising a transition zone 3377 provided between the first transfer conduit part 3315 and the first collection conduit part 3319/the first collection conduit 3316, wherein the transition zone 3377 extends between a first end (cf. FIGS. 50 and 51, ref. 4477*c*) and a second end (cf. FIGS. 50 and 51, ref. 4477*b*), wherein the first end is the end of the transition zone 3377 that is closest to the first transfer conduit part 3315, and wherein the second end is the end of the transition zone 3377 that is closest to the first collection conduit part 3319/the first collection conduit 3316, and wherein a transition from a first affinity for water to a second affinity for water is provided within the transition zone 3377. In some of the embodiments, the transition from the first affinity for water to the second affinity for water comprises a gradual transition from the first affinity for water to the second affinity for water. In some of the embodiments, the transition zone 3377 has an extension of less than 500 μm between the first end and the second end thereof.

FIG. 50*a* schematically illustrates the same features as illustrated and disclosed in connection with FIG. 9*a*. Furthermore, FIG. 50*a* illustrates a transition zone 4077. FIG. 50*b* schematically illustrates an enlargement of FIG. 50*a* illustrating the transition zone 4077. FIG. 50 (including FIGS. 50*a* and 50*b*) schematically illustrates that coated area may comprise a rim zone 4079 at least partially surrounding the third example 958 of a region provided with coating. Within the rim zone 4079, the coating zeros out while extending from the third example 958 of a region provided with coating. As illustrated in FIGS. 50*a* and 50*b*, the rim zone extends into the branches of the tertiary supply conduit 509 and into the transfer conduit 512. The extension of the rim zone into the transfer conduit 512 is referred to as the transition zone 4077.

As described in the present disclosure, the desired affinity for water at both of the first transfer conduit part 515 and the first collection conduit part 519 may be achieved by provision of a substrate having the desired affinity for water for either of the first transfer conduit part 515 or the first collection conduit part 519, and provision of a desired coating at the other part. For the present example illustrated by means of FIG. 50, coating is applied to the first collection conduit part 519 and is avoided to be applied to the first transfer conduit part 515. However, as illustrated and disclosed through out the present disclosure, e.g. in connection with the various embodiments disclosed in connection with FIGS. 30 to 43, the microfluidic device may be provided by provision of a ramified recess in a first component which is capped by a second component. Accordingly, in addition to provision of the coating to the substrate with the ramified recess, e.g. as disclosed in connection with FIG. 50, a similar coating may be provided to the component forming a capping part of the ramified recess for forming the fluid conduit network. FIG. 51*a* schematically illustrates coating of a component forming a capping part, such as the bottom part of the middle layer of the fourth embodiment of the microfluidic device of the present invention. The dashed lines in FIG. 51*a* indicates the intended location of the fluid conduit network when assembled with the component having the ramified recess. Furthermore, the same references are applied for FIG. 51*a* as for FIG. 50*a*. FIG. 51*b* schematically illustrates an enlargement of FIG. 51*a* including the transition zone 4077.

For embodiments, wherein two components forming the fluid transfer network are coated prior to being assembled, the coating may be unaligned upon assembling. Such unalignment may comprise an unalignment of the respective coatings forming the transfer zone. FIG. 46 schematically illustrates an example of such coatings not being aligned, e.g. such as when assembling the component illustrated in FIG. 50 with the component illustrated in FIG. 51.

In FIG. 46, the coating of the right-hand side of the figure corresponds to the coating illustrated in FIG. 45*b*, whereas the coating of the left-hand side schematically illustrates a coating of a cover, wherein the coatings are unaligned.

In embodiments of the present invention, the microfluidic device, e.g. 1700, 3100, comprise a plurality of components forming the microfluidic section and the container section, the plurality of components comprising a first component 3181 and a second component 3182 being fixed to each other, wherein each fluid conduit network is formed in part by the first component and in part by the second component, and wherein the first component 3181 comprises a first substrate having a first coated zone 3186*a* and a first non-coated zone 3186*b*, and wherein the second component 3182 comprises a second substrate having a second coated zone 3189*a* and a second non-coated zone 3189*b*, and wherein, for each fluid conduit network, one of the first transfer conduit part 3315 and the first collection conduit part 3319 is formed in part by a primary part of the first coated zone 3186*a* and in part by a primary part of the second coated zone 3189*a*, and wherein the other of the first transfer conduit part 3315 and the first collection conduit part 3319 is formed in part by a primary part of the first non-coated zone 3186*b* and in part by a primary part of the second non-coated zone 3189*b*.

According to one or more embodiments, the coating starts with the first uniform coated zone starting from the first collection conduit part and extends to a non-uniform second coated zone that extends through the first transition zone and the second transition zone forming a transition length. The side wall extends up to and beyond the first transfer conduit part.

According to one or more embodiments, the microfluidic device may have a primary part of the first coated zone and may comprise a first primary part of the first coated zone comprising a first uniform coating thickness 3385*a* being within a range of 10 nm to 200 nm, and wherein the primary part of the second coated zone comprises a second uniform coating thickness being within a range of 10 nm to 200 nm.

The microfluidic device according to one or more embodiments of the present invention, e.g. as illustrated in part in FIG. 46, may have a transition zone 3577, which comprises a secondary part of the first coated zone 3186*a* and a secondary part of the second coated zone 3189*a*, wherein the secondary part of the first coated zone extends from a first end to a second end 3377*c* provided at a first edge of the first coated zone 3186*a*, and wherein the secondary part of the first coated zone 3186*a* comprises a coating thickness being zeroed out from the first end to second end 3377*c* thereof. Furthermore, the secondary part of the second coated zone 3189*a* may extend from a first end to a second end 3477*c* provided at a second edge of the second coated zone 3189*a*, and wherein the secondary part of the second coated zone comprises a coating thickness being zeroed out from the first end to second end thereof.

In some of the embodiments described herein, the microfluidic device has a coating thickness at the first end of the secondary part of the first coated zone and corresponds to the coating thickness of the primary part of the first coated zone, and wherein the coating thickness at the first end of the secondary part of the second coated zone corresponds to the coating thickness of the primary part of the second coated zone.

In some of the embodiments described herein, the microfluidic device has a secondary part of the first coated zone has an extension of less than 500 μm between the first end and the second end thereof. Furthermore, the secondary part of the second coated zone has an extension of less than 500 μm between the first end and the second end thereof.

According to some of the embodiments described herein, the microfluidic device has a secondary part of the first coated zone and the secondary part of the second coated zone are not aligned with each other.

According to some of the embodiments described herein, the microfluidic device has a secondary part of the first coated zone and the secondary part of the second coated zone are aligned with each other.

FIG. 47*b* schematically illustrates the isometric section of a part of conduit of FIG. 14 without the top cap and with the coatings. FIG. 47*a* illustrates the cross section from which the isometric section was shown.

FIG. 47*b* schematically illustrates an isometric sectional view of a part of a conduit of a microfluidic device according to the present invention. FIG. 47*b* describes a base layer 3626 and a fluid conduit 3630 being positioned between the base layer 3626 under the angle 3629.

FIG. 48 schematically illustrates block diagrams of methods of provision of a device according to the present invention. FIG. 48*a* illustrates a first method and FIG. 48*b* illustrates a second method.

FIG. 48*a* illustrates a method of applying coating according to the embodiments described herein. A method of providing a coating to the previously described embodiments, e.g. microfluidic device 100, 1700, etc. is described. The first method has the following steps:

Step 1: Providing the plurality of components, wherein each component of the plurality of components comprises at least one side being configured to face and being configured to be attached to a side of another component of the plurality of components, and wherein, for each group of containers one of the plurality of components accommodates at least the secondary supply container and the tertiary supply container.

Step 2: Assembling the plurality of components such that each component is fixedly attached to at least one other component, and such that the plurality of components forms a fixedly connected unit, and such that each fluid conduit network is formed in part by the second component and in part by the first component, and wherein the first component faces the second component.

Step 3: Applying a first type of liquid to at least a first part of the first component and to at least a first part of the second component.

Step 4: Applying UV light via a mask to at least the first part of the first component and to at least the first part of the second component subsequent to the step of applying the first type of liquid.

In some of the embodiments, the method of coating of a microfluidic device described herein, has the step of applying the first type of liquid carried out prior to the step of assembling. The concept is described in FIG. 48*b*.

In some of the embodiments described herein, the method of coating of a microfluidic device has the step of applying the first type of liquid carried out subsequent to the step of assembling, and wherein the step of applying the first type of liquid comprises utilizing an inert liquid for blocking parts of the fluid conduit network.

The present method of providing double emulsion droplets is disclosed herein by the above-mentioned embodiments. The method comprising use of any of the previously described microfluidic device (100, 1700, etc.), wherein the method comprises the following steps: Step 1: Providing a first fluid to the primary supply container of a first group of containers. Step 2: Providing a second fluid to the secondary supply container of the first group of containers. Step 3: Providing a third fluid to the tertiary supply container of the first group of containers. Step 4: Providing pressure differences between each of the respective supply containers of the first group of containers and the collection container of the first group of containers, such that the pressure within each of the individual supply containers of the first group of containers is higher than within the collection container of the first group of containers.

The following represents a list of at least some of the references of the drawings, wherein the suffix "X" may refer to any one or more digits, e.g. of the following digits: 1, 5, 11, 13, 14, 15, 17, 18, 19, 20, and 21. For instance, X00 may refer to any one or more of the following references: 100, 500, 1100, 1300, 1400, 1500, 1700, 1800, 1900, 2000, and 2100.

Any relevant part of the above disclosure may be understood in view of the below lists of references in combination with the disclosed drawings.

X00. Microfluidic device
X01. Microfluidic section
X02. Well section
X03. Primary supply conduit
X04. Primary supply inlet and/or area of the capillary structure being in direct communication with the primary through hole

X05. Primary supply opening
X06. Secondary supply conduit
X06*a*. First secondary supply conduit
X06*b*. Second secondary supply conduit
X07. Secondary supply inlet and/or area of the secondary supply conduit being in direct fluid communication with the secondary through hole
X08. Secondary supply opening
X08*a*. First secondary supply opening
X08*a*. Second secondary supply opening
X09. Tertiary supply conduit
X09*a*. First tertiary supply conduit
X09*b*. Second tertiary supply conduit
X10. Tertiary supply inlet and/or area of the tertiary supply conduit being in direct fluid communication with the tertiary supply well or container
X11. Tertiary supply opening
X11*a*. First tertiary supply opening
X11*b*. Second tertiary supply opening
X12. Transfer conduit
X13. First transfer opening
X14. Second transfer opening
X15. First transfer conduit part
X16. Collection conduit
X17. Collection opening
X18. Collection outlet
X19. First collection conduit part
X20. First fluid junction
X21. Second fluid junction
X25. Filter
X26. Base microfluidic piece
X27. Capping piece
X31. Primary supply well or container
X32. Secondary supply well or container
X33. Tertiary supply well or container
X34. Collection well or container
X35. Fluid conduit network
X39. Lower part of collection well or container
X70. Microfluidic unit
Y70*a*. Top part of the microfluidic unit
X71. Group of wells/group of containers
X77. Transition zone
X77*a*. Thickness of a transition zone
X77*b*. Second end of a transition zone
X77*c*. First end of a transition zone
X80. Top layer/piece/component
X80*a*. Top part of the top layer/piece/component
X80*b*. Bottom part of the top layer/piece/component
X81. Middle layer/piece/component
X81*a*. Top part of the middle layer
X81*b*. Bottom part of the middle layer
X82. Bottom layer/piece/component
X82*a*. Top part of the bottom layer
X82*b*. Bottom part of the bottom layer
X83. Cutting line indicating a cross-sectional view
3988. UV light

LIST OF FURTHER REFERENCES

522. Primary flow
523. Secondary flow
524. Tertiary flow
956. First example of region provided with coating
957. Second example of region provided with coating
958. Third example of region provided with coating
1059. Fourth example of region provided with coating
1060. Fifth example of region provided with coating
1061. Sixth example of region provided with coating
1428. Side wall
1429. Draft angle
1430. Fluid conduit
1572. Pillar
1836. Attachment feature for attachment of gasket
1837. Protrusion to facilitate airtight connection
1838. Alignment feature
2040. Assembly feature for assembly of microfluidic units to the groups of wells
2041. Elastomer material between the microfluidic units and the groups of wells
2137. Protrusion to ensure airtight connection
2141. Elastomer material between the microfluidic units and the groups of wells
2142. Receptor configured to receive the microfluidic device
2143. Elastomer material between the microfluidic device and the receptor
2144. Example of a supply well or container
2245. Passage for pressurized air
2342. Receptor configured to receive the microfluidic device
2346. Filter
2347. Pressure generator
2348. Pressure supply structure valve
2349. Pressure sensor
2350. Pressure regulator
2351. Air reservoir
2352. Pressure supply structure
2353. Well manifold
2354. Air inlet
2357. Pressure regulator-to-manifold valve
2358. Well valve
2390. Assembly
2399. Pressure distribution structure
2451. Sample buffer
2452. Oil
2453. Continuous phase buffer
2454. Double emulsion droplet
2455. Single emulsion droplet
2556. Microfluidic device
2859. Sample buffer container
2860. Oil container
2861. Continuous phase buffer container
2862. Kit For any claim enumerating several features, several of these features may be embodied by one and the same device. The mere fact that certain measures are recited in mutually different dependent claims or described in different embodiments does not indicate that a combination of these measures cannot be used to advantage.

Although particular embodiments have been shown and described, it will be understood that they are not intended to limit the claimed invention, and it will be obvious to those skilled in the art that various changes and modifications may be made without departing from the scope of the claimed inventions. The specification and drawings are, accordingly, to be regarded in an illustrative rather than restrictive sense. The claimed invention is intended to cover alternatives, modifications, and equivalents.

It should be emphasized that the term "comprises/comprising" when used in the present disclosure is taken to specify the presence of stated features, integers, steps or components but does not preclude the presence or addition of one or more other features, integers, steps, components or groups thereof.

It will be apparent to those skilled in the art that various modifications and variations can be made to the structure of the present invention without departing from the scope of the invention. In view of the foregoing, it is intended that the present invention cover modifications and variations of this invention provided they fall within the scope of the following claims and their equivalents.

The invention claimed is:

1. A microfluidic device comprising:

a microfluidic section comprising a plurality of microfluidic units; and a container section comprising a plurality of groups of containers comprising one group of containers for each microfluidic unit;

wherein each microfluidic unit comprises a fluid conduit network comprising:

a plurality of supply conduits comprising a primary supply conduit, a secondary supply conduit, and a tertiary supply conduit;

a transfer conduit comprising a first transfer conduit part having a first affinity for water; a collection conduit comprising a first collection conduit part having a second affinity for water being different from the first affinity for water;

a first fluid junction providing fluid communication between the primary supply conduit, the secondary supply conduit, and the transfer conduit; and a second fluid junction providing fluid communication between the tertiary supply conduit, the transfer conduit, and the collection conduit;

wherein each fluid conduit network is formed in part by a first component and in part by a second component, and wherein the first component comprises a first substrate having a first coated zone and a first non-coated zone, and wherein the second component comprises a second substrate having a second coated zone and a second non-coated zone, and wherein, for each fluid conduit network, one of the first transfer conduit part and the first collection conduit part is formed in part by a primary part of the first coated zone and in part by a primary part of the second coated zone, and wherein the other of the first transfer conduit part and the first collection conduit part is formed in part by a primary part of the first non-coated zone and in part by a primary part of the second non-coated zone;

wherein each first transfer conduit part extends from the corresponding first fluid junction, and wherein each first collection conduit part extends from the corresponding second fluid junction, and wherein each group of containers comprises a plurality of containers comprising a collection container and a plurality of supply containers comprising a primary supply container, a secondary supply container, and a tertiary supply container, wherein for each group of containers: the collection container is in fluid communication with the collection conduit of the corresponding microfluidic unit;

the primary supply container is in fluid communication with the primary supply conduit of the corresponding microfluidic unit;

the secondary supply container is in fluid communication with the secondary supply conduit of the corresponding microfluidic unit; and the tertiary supply container is in fluid communication with the tertiary supply conduit of the corresponding microfluidic unit.

2. The microfluidic device according to claim 1, wherein each fluid conduit network comprises a transition zone provided between the first transfer conduit part and the first collection conduit part, wherein the transition zone extends between a first end and a second end thereof, wherein the first end is the end of the transition zone that is closest to the first transfer conduit part, and wherein the second end is the end of the transition zone that is closest to the first collection conduit part, and wherein a transition from the first affinity for water to the second affinity for water is provided within the transition zone.

3. The microfluidic device according to claim 2, wherein the transition from the first affinity for water to the second affinity for water comprises a gradual transition from the first affinity for water to the second affinity for water.

4. The microfluidic device according to claim 2, wherein the transition zone has an extension of less than 500 μm between the first end and the second end thereof.

5. The microfluidic device according to claim 2, wherein the microfluidic device comprises a plurality of components forming the microfluidic section and the container section, the plurality of components comprising the first component and the second component being fixed to each other.

6. The microfluidic device according to claim 5, wherein the primary part of the first coated zone comprises a first primary part of the first coated zone comprising a first uniform coating thickness being within a range of 10 nm to 200 nm, and wherein the primary part of the second coated zone comprises a second uniform coating thickness being within a range of 10 nm to 200 nm.

7. The microfluidic device according to claim 5, wherein the transition zone extends between a first end and a second end thereof, wherein the first end is the end of the transition zone that is closest to the first transfer conduit part, and wherein the second end is the end of the transition zone that is closest to the first collection conduit part, and wherein a transition from the first affinity for water to the second affinity for water is provided within the transition zone, wherein the transition zone comprises a secondary part of the first coated zone and a secondary part of the second coated zone, wherein the secondary part of the first coated zone extends from a first end to a second end thereof, the second end of the secondary part of the first coated zone being provided at a first edge of the first coated zone, and wherein the secondary part of the first coated zone comprises a coating thickness being zeroed out from the first end to second end thereof, and wherein the secondary part of the second coated zone extends from a first end to a second end thereof, the second end of the secondary part of the second coated zone being provided at a second edge of the second coated zone, and wherein the secondary part of the second coated zone comprises a coating thickness being zeroed out from the first end to second end thereof, and wherein at least one of the second end of the secondary part of the first coated zone and the second end of the secondary part of the second coated zone coincide with one of the first end and the second end of the transition zone, and wherein at least one of the first end of the secondary part of the first coated zone and the first end of the secondary part of the second coated zone coincide with the other of the first end and the second end of the transition zone.

8. The microfluidic device according to claim 7, wherein the coating thickness at the first end of the secondary part of the first coated zone corresponds to the coating thickness of the primary part of the first coated zone, and wherein the coating thickness at the first end of the secondary part of the second coated zone corresponds to the coating thickness of the primary part of the second coated zone.

9. The microfluidic device according to claim 7, wherein the secondary part of the first coated zone has an extension of less than 500 μm between the first end and the second end thereof, and wherein the secondary part of the second coated zone has an extension of less than 500 μm between the first end and the second end thereof.

10. The microfluidic device according to claim 7, wherein the secondary part of the first coated zone and the secondary part of the second coated zone are not aligned with each other.

11. The microfluidic device according to claim 1, wherein the secondary part of the first coated zone and the secondary part of the second coated zone are aligned with each other.

12. A kit comprising:

one or more of the microfluidic devices according to claim 1; and a plurality of fluids configured for use with the microfluidic device;

the plurality of fluids comprising: a sample buffer; an oil; and a continuous phase buffer;

the kit comprising an enzyme and nucleotides.

13. An assembly comprising:

the microfluidic device according claim 1;

a receptor; and a pressure distribution structure;

the receptor being configured to receive and hold the microfluidic device, the pressure distribution structure being configured to supply pressure to the microfluidic device when held by the receptor, the pressure distribution structure comprising:

a plurality of container manifolds comprising a secondary container manifold and a tertiary container manifold;

a plurality of line pressure regulators comprising a secondary line pressure regulator and a tertiary line pressure regulator; and a main manifold;

the secondary container manifold being configured to be coupled to each secondary supply container of the microfluidic device, the tertiary container manifold being configured to be coupled to each tertiary supply container of the microfluidic device, the secondary line pressure regulator being coupled to the secondary container manifold, the tertiary line pressure regulator being coupled to the tertiary container manifold, the main manifold being coupled to each container manifold via the respective line pressure regulators.

14. A method of providing a microfluidic device according to claim 5, the method comprising:

providing the plurality of components, wherein each component of the plurality of components comprises at least one side being configured to face and being configured to be attached to a side of another component of the plurality of components, and wherein, for each group of containers, one of the plurality of components accommodates at least the secondary supply container and the tertiary supply container;

assembling the plurality of components such that each component is fixedly attached to at least one other component, and such that the plurality of components forms a fixedly connected unit, and such that each fluid conduit network is formed in part by the second component and in part by the first component, and wherein the first component faces the second component; and applying coating comprising: applying a first coating to at least a first part of the first component; and applying a second coating to at least a first part of the second component.

15. The method according to claim 14, wherein the step of applying coating comprises:

applying a first type of liquid to at least the first part of the first component and to at least the first part of the second component; and applying UV light via a mask to at least the first part of the first component and to at least the first part of the second component subsequent to the step of applying the first type of liquid;

and wherein the step of applying the first type of liquid is carried out prior to the step of assembling.

16. The method according to claim 14, wherein the step of applying coating comprises:

applying a first type of liquid to at least the first part of the first component and to at least the first part of the second component; and applying UV light via a mask to at least the first part of the first component and to at least the first part of the second component subsequent to the step of applying the first type of liquid;

and wherein the step of applying the first type of liquid is carried out subsequent to the step of assembling, and wherein the step of applying the first type of liquid comprises utilizing an inert liquid for blocking parts of the fluid conduit network.

17. A method of providing double emulsion droplets, the method comprising use of:

the microfluidic device according to claim 1, the method comprising:

providing a first fluid to the primary supply container of a first group of containers.

* * * * *